US012692817B2

(12) United States Patent     (10) Patent No.:   US 12,692,817 B2

Sibbach et al.     (45) Date of Patent:     Jul. 28, 2026

(54) PROPULSION SYSTEM INCLUDING A TURBINE ENGINE

(71) Applicant: General Electric Company, Evendale, OH (US)

(72) Inventors: Arthur W. Sibbach, Boxford, MA (US); Erich Alois Krammer, West Chester, OH (US); Brandon W. Miller, Middletown, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/830,090

(22) Filed: Sep. 10, 2024

(65) Prior Publication Data

US 2026/0071575 A1     Mar. 12, 2026

(51) Int. Cl.
    *B64D 27/33*     (2024.01)
    *F02C 7/36*     (2006.01)

(52) U.S. Cl.
    CPC .............. *F02C 7/36* (2013.01); *B64D 27/33* (2024.01); *F05D 2220/323* (2013.01); *F05D 2260/98* (2013.01)

(58) Field of Classification Search
    CPC .... F01D 25/20; F02C 7/06; F02C 7/36; F05D 2220/323; F05D 2260/98; B64D 27/33
    See application file for complete search history.

(56) References Cited

U.S. PATENT DOCUMENTS

| | | | |
|---|---|---|---|
| 3,850,388 A | 11/1974 | Olcott et al. | |
| 4,170,873 A * | 10/1979 | Milo ....................... | F01D 25/20 |
| | | | 60/39.08 |
| 4,856,273 A | 8/1989 | Murray | |
| 4,887,424 A | 12/1989 | Geidel et al. | |
| 6,142,418 A | 11/2000 | Weber et al. | |
| 6,171,055 B1 | 1/2001 | Vos et al. | |
| 8,226,351 B2 | 7/2012 | Shashank et al. | |
| 8,459,038 B1 | 6/2013 | Lickfold et al. | |
| 8,534,044 B2 | 9/2013 | Smith | |
| 8,566,000 B2 | 10/2013 | Lickfold et al. | |
| 8,740,549 B2 | 6/2014 | Shashank et al. | |

(Continued)

FOREIGN PATENT DOCUMENTS

| | | |
|---|---|---|
| CA | 3013727 A1 | 2/2019 |
| EP | 3726012 A1 | 10/2020 |

(Continued)

*Primary Examiner* — Rodolphe Andre Chabreyrie

(74) *Attorney, Agent, or Firm* — Venable LLP; Duarte Y Ho; Michele V. Frank

(57) ABSTRACT

A propulsion system and a method of operating the propulsion system. The propulsion system includes a turbine engine, an electric power supply, and a lubrication system. The turbine engine includes a turbo-engine having a low-pressure shaft and one or more engine bearings, a propulsor having a propulsor shaft, a gearbox assembly having a gear assembly, and an electric machine. The propulsor shaft is drivingly coupled to the low-pressure shaft through the gear assembly. The electric machine powers the propulsor when the turbo-engine is shut down. The lubrication system supplies a lubricant to at least one of the one or more engine bearings or the gear assembly. The electric power supply powers the lubrication system when the turbo-engine is shut down.

18 Claims, 22 Drawing Sheets

(56) References Cited

U.S. PATENT DOCUMENTS

| | | | |
|---|---|---|---|
| 9,008,943 B2 | 4/2015 | Lickfold et al. | |
| 9,157,377 B2 | 10/2015 | Lickfold et al. | |
| 9,932,120 B2 | 4/2018 | Fisher et al. | |
| 10,059,432 B1 | 8/2018 | Lisio | |
| 10,176,648 B2 | 1/2019 | Descubes et al. | |
| 10,435,167 B2 | 10/2019 | Thiriet et al. | |
| 10,634,053 B2 | 4/2020 | Schwarz et al. | |
| 10,800,514 B2 | 10/2020 | Lisio | |
| 10,816,085 B2 | 10/2020 | Olson et al. | |
| 11,073,200 B2 | 7/2021 | Gebhard et al. | |
| 11,085,521 B2 | 8/2021 | Edwards et al. | |
| 11,268,453 B1 | 3/2022 | Desjardins et al. | |
| 11,808,208 B2 | 11/2023 | De Bellis et al. | |
| 11,828,247 B2 | 11/2023 | Eddy | |
| 11,852,232 B1 | 12/2023 | Speller et al. | |
| 11,988,159 B2 | 5/2024 | Detweiler et al. | |
| 2005/0034924 A1* | 2/2005 | James | F01D 21/14 |
| | | | 184/6.4 |
| 2006/0054406 A1 | 3/2006 | Delaloye | |
| 2010/0061855 A1 | 3/2010 | Shashank et al. | |
| 2013/0047608 A1 | 2/2013 | Shashank et al. | |
| 2013/0098058 A1* | 4/2013 | Sheridan | F01D 25/18 |
| | | | 60/783 |
| 2014/0001307 A1 | 1/2014 | Ehinger et al. | |
| 2015/0361811 A1 | 12/2015 | Schwarz et al. | |
| 2015/0369082 A1 | 12/2015 | Schwarz et al. | |
| 2017/0211477 A1* | 7/2017 | Menheere | F02C 7/32 |
| 2017/0314469 A1* | 11/2017 | Roever | F02C 7/36 |
| 2018/0050811 A1 | 2/2018 | Niergarth et al. | |
| 2018/0086474 A1 | 3/2018 | Gutz | |
| 2018/0093778 A1 | 4/2018 | Spack et al. | |
| 2018/0370646 A1* | 12/2018 | Hon | F01D 21/003 |
| 2019/0322379 A1 | 10/2019 | Mackin | |
| 2019/0323597 A1 | 10/2019 | Sheridan | |
| 2020/0332715 A1* | 10/2020 | Ribarov | F02C 7/14 |
| 2022/0063792 A1 | 3/2022 | Freely et al. | |
| 2023/0349302 A1 | 11/2023 | Gebhard et al. | |
| 2023/0349326 A1 | 11/2023 | Turnquist et al. | |
| 2023/0415883 A1 | 12/2023 | Freely et al. | |
| 2025/0042567 A1* | 2/2025 | Mark | B64D 35/025 |

FOREIGN PATENT DOCUMENTS

| | | | |
|---|---|---|---|
| EP | 4421295 A1 | 8/2024 | |
| FR | 3127269 A1 | 3/2023 | |
| FR | 3130896 A1 | 6/2023 | |
| FR | 3130897 A1 | 6/2023 | |
| FR | 3133367 A1 | 9/2023 | |
| FR | 3133368 A1 | 9/2023 | |
| WO | 2024/018137 A1 | 1/2024 | |

* cited by examiner

PROPULSION SYSTEM INCLUDING A TURBINE ENGINE

TECHNICAL FIELD

The present disclosure relates generally to propulsion systems, and, particularly, to propulsion systems including turbine engines.

BACKGROUND

Turbine engines, particularly, turboprop engines, generally include a propulsor, such as a propeller, and a turbo-engine arranged in flow communication with one another. The turbo-engine includes a compressor, a combustor, and a turbine section. Some turbine engines include an electric machine to provide power to the propulsor.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
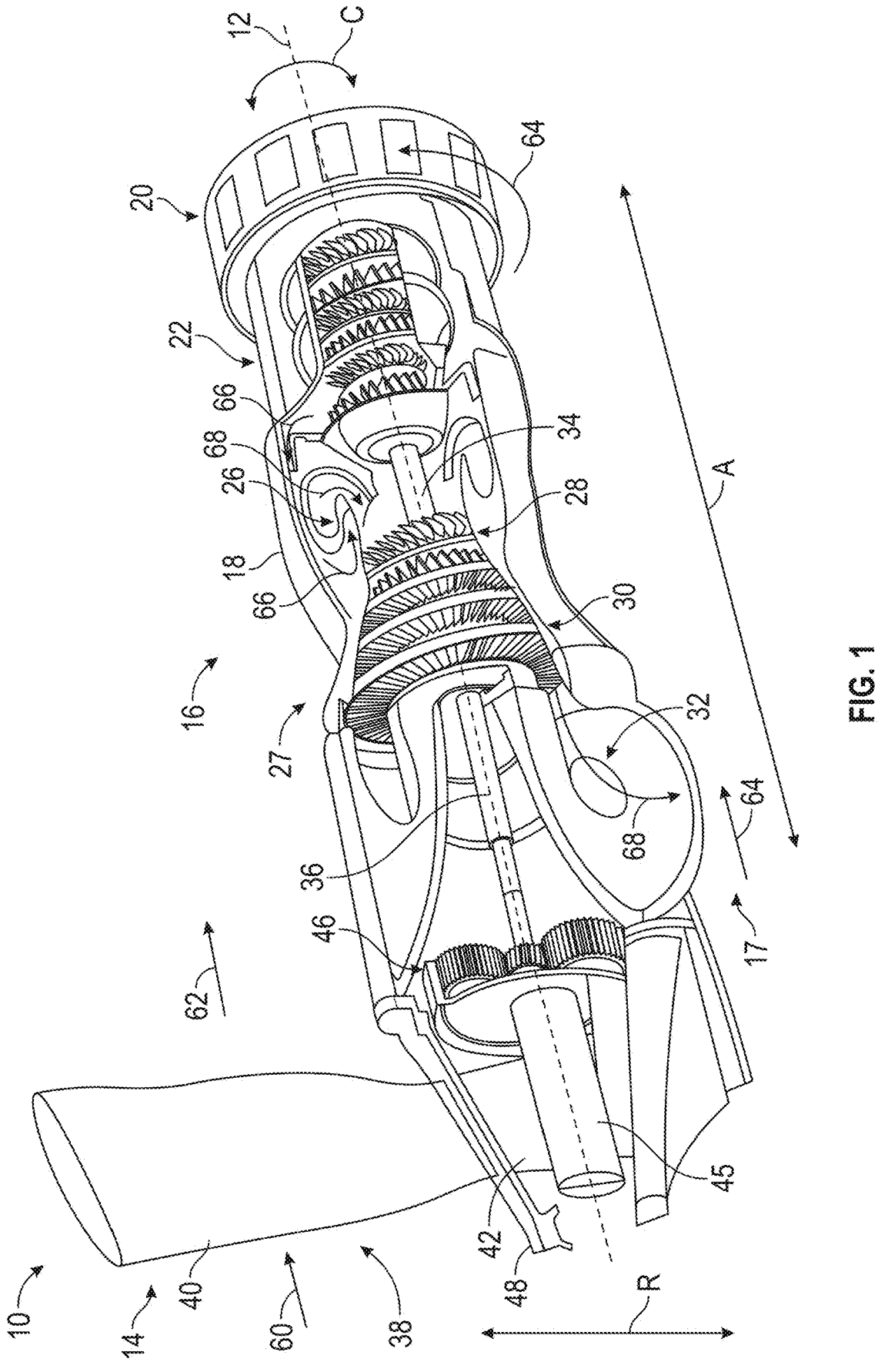
FIG. 1 is a schematic partial cutaway view of a turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle (e.g., an aircraft) with respect to a direction of travel. For example, with regard to a turbine engine, forward refers to a position on the turbine engine that is closer to the propulsor and aft refers to a position on the turbine engine that is further away from the propulsor. When the turbine engine is configured in a pusher configuration, the propulsor is positioned on an aft side of the turbine engine such that forward refers to a position that is further away from the propulsor and aft refers to a position that is closer to the propulsor.

As used herein, "below" refers to a component being radially below another component in the orientation of the turbine engine shown in FIG. 1.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "top" refers to a highest or uppermost point, portion, or surface of a component in the orientations shown in the figures.

As used herein, "bottom" refers to a lowest or lowermost point, portion, or surface of a component in the orientations shown in the figures.

As used herein, "remote" or a "remote" component means a component that is discrete from a first component such that the component is free from mechanical coupling (e.g., direct or indirect) to the first component. For example, a remote propulsor is a propulsor that is discrete from a first propulsor such that the remote propulsor can be mounted at a location on the aircraft that is different than the location of the first propulsor. The remote component may be communicatively or electrically coupled to the first component.

As used herein, a "propulsor" is a component that rotates and generates thrust. The propulsor can be a propeller. For example, the propulsor can be a propeller of a turboprop engine that is drivingly coupled to the turbo-engine such that rotation of the components of the turbo-engine causes the propulsor to rotate and to generate thrust. The propulsor can be an electric propulsor (e.g., propeller) that is remote from the turbine engine and is drivingly coupled to an electric machine such that the electric machine causes the propulsor to rotate and to generate thrust.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

As noted above, turbine engines include a turbo-engine that provides power for rotating a propulsor (e.g., a propeller). The turbo-engine burns air and fuel to generate an exhaust gas flow that drives an aerodynamically-coupled power turbine, or low-pressure turbine, that is further coupled to a set of propulsor blades of the propulsor via a propulsor shaft. In this sense, a speed of the turbo-engine indirectly affects a speed of the power turbine by providing torque to drive the propulsor, thus providing thrust.

The pitch of the propulsor blades can also be rotated on the propulsor shaft to provide additional thrust at the expense of increasing the torque demand of the turbine shaft. For instance, if the pitch of the propulsor blades is reduced, each propulsor blade rotates on the propulsor shaft such that the air resistance of the propulsor blade as the propulsor blade rotates about the propulsor shaft decreases, and, thus, reduces the torque demand for the propulsor shaft. In the instance when the turbo-engine speed is constant, the reduced torque demand of the propulsor results in increased propulsor shaft rotational speed (RPM). Conversely, if the pitch of the propulsor blades is increased, each propulsor blade rotates on the propulsor shaft such that the air resistance of the propulsor blade as the propulsor blade rotates about the propulsor shaft increases, and, thus, increases the torque demand for the propulsor shaft. In the instance when the turbo-engine speed is constant, the increased torque demand of the propulsor results in decreased propulsor shaft speed.

The present disclosure provides for a propulsion system including a turbine engine (e.g., a turboprop engine) with a propulsor, and a remote propulsor that is remote from the turbine engine. The turbine engine includes an electric machine and the remote propulsor includes an electric machine. In this way, the propulsor of the turbine engine can be powered electrically by the electric machine. Similarly, the remote propulsor can be powered electrically by the electric machine. In some embodiments, the remote propulsor is coupled to a remote turbine engine such that the remote turbine engine powers the remote propulsor.

Turbine engine control systems typically employ dual throttle levers used by the pilot to adjust, respectively, the turbo-engine speed demand, i.e., the speed of the turbo-engine, and the propulsor speed demand, i.e., via the pitch of the propulsor blades. In some instances, the dual throttle levers include a first throttle lever that controls the turbine engine and a second throttle lever that controls the remote propulsor. This dual-lever turbine engine control system allows for variation of aircraft speed and torque demand during, for instance, takeoff, cruise, or reverse thrust operations. Typically, small turboprop aircraft include one lever for the core engine speed (power or fuel flow), and a second lever for controlling the pitch of the propulsor blades. The propulsor is designed to operate at a constant speed, so a pilot would need to first adjust the core engine speed to increase/decrease power, and then adjust the propulsor blade pitch to maintain the proper propulsor speed. The propulsor is driven by a free turbine downstream of the core engine, so when the core speed increases, if the propulsor pitch remains constant, then the propulsor speed increases. The pilot needs to change the pitch to counter the change in speed resulting from the core engine change. This results in an increased workload for the pilot.

The present disclosure provides for an improved turbine engine control system that receives a single throttle lever input, and controls the turbine engine speed and the propulsor speed and the propulsor pitch angle based on the single throttle lever input. The turbine engine control system can also control the remote propulsor speed and the remote propulsor pitch angle based on the single throttle lever input. Thus, the turbine engine control system can control the turbine engine and the remote propulsor based on the single throttle lever input. In this way, the propulsion system of the present disclosure requires only a single throttle lever to be actuated by the pilot to control both the turbine engine and the remote propulsor, thus, reducing pilot workload, allowing the pilot to better focus attention on other needs. The remote propulsor can include at least one of an electrical propulsor (e.g., powered by an electric machine) or a second turbine engine (e.g., turboprop engine). The present disclosure provides for communication between the turbine engine and the remote propulsor via a data communication bus using at least one of wireless (e.g., 5G), the aircraft communication bus (e.g., ARINC), or a dedicated wire harness between the turbine engine and the remote propulsor.

The propulsion system disclosed herein is a hybrid electric propulsion system in which the turbine engine (e.g., turboprop engine) includes the electric machine and the propulsor can be electrically powered by the electric machine. The remote propulsor can also be powered by an electric machine. The electric machines in the propulsion system can operate at a high-speed requiring a reduction gearbox between the electric machine and the propulsors.

For example, the propulsor of the turbine engine and the remote propulsor both include a reduction gearbox between the electric machine of the respective propulsor and the propulsor.

The reduction gearbox requires lubrication when the propulsor (e.g., the propulsor of the turbine engine and/or the remote propulsor) is operated, with the local turbine engine in a shutdown/standby condition, such that the lubrication system of the local turbine engine is not functional. In particular, in current turbine engines, a pump of the lubrication system is powered by the turbine shaft (e.g., the LP shaft or the HP shaft), and, thus, the lubrication system is unable to provide lubricant to the gearbox when the turbine engine is shut down (the turbine shaft stops rotating). Therefore, the present disclosure also provides for a hybrid electric turbine engine system that incorporates a reduction gearbox with a gearbox lubrication system that is separate from the engine lubrication system. The gearbox lubrication system comprises a pump and a lubricant reservoir (e.g., a sump). In some embodiments, the gearbox lubrication system includes a heat exchanger, a pressure sensor, or a level sensor. The pressure sensor and level sensor output signals can be communicated to the remote propulsor either by discrete outputs or by a digital data bus via the turbine engine control system. In one embodiment, the lubrication system supplies the lubricant to one or more engine bearings from the propulsor gearbox lubrication system, while the turbine engine is shut down, and the propulsor is electrically driven. The gearbox lubrication system is powered by a pump that is drivingly coupled to at least one of the propulsor shaft, the turbine shaft, or the gears of the gearbox. In this way, the lubrication system is a mechanically driven lubrication system.

The present disclosure also provides for an electrically driven lubrication system. The lubrication system allows the turbo-engine to be shut down, while still providing lubrication to the propulsor. The lubrication system can be powered by aircraft power or by electric power from the remote turbine engine, when the remote turbine engine is in control. The lubrication system can include lubricant sensors that provide data to the remote turbine engine as well as to the local turbine engine, so as to allow for safe control by the remote turbine engine.

The present disclose further provides a plurality of lubricant sensors (e.g., temperature sensors, pressure sensors, level sensors, or flow rate sensors) associated with the lubrication system that enable fault monitoring by the remote turbine engine. The turbine engine control system identifies failure modes of the lubricant sensors and operates the remote turbine engine at a reduced power or shutting down the propulsor based on the failure modes.

Referring now to the drawings, FIG. 1 is a schematic partial cutaway view of a turbine engine 10, according to an embodiment of the present disclosure. As shown in FIG. 1, the turbine engine 10 has a longitudinal centerline axis 12 and defines an axial direction A (extending parallel to the longitudinal centerline axis 12 provided for reference), a radial direction R that is normal to the axial direction A, and a circumferential direction C disposed about the axial direction A. In general, the turbine engine 10 is a turboprop engine that includes a propulsor section 14 and a turbo-engine 16 disposed downstream from the propulsor section 14. The propulsor section 14 is driven by the turbo-engine 16, as detailed further below.

The turbine engine 10 includes an air intake 17 aft of the propulsor section 14 and forward of the turbo-engine 16. The air intake 17 is a scoop inlet positioned radially outward from the longitudinal centerline axis 12. In the embodiment of FIG. 1, the air intake 17 is positioned at a radially bottom portion of the turbine engine 10 (e.g., below the longitudinal centerline axis 12 in the orientation shown in FIG. 1). For example, the air intake 17 is positioned below the propulsor section 14. The air intake 17 can be positioned at any radial position of the turbine engine 10 (e.g., on a side of the turbine engine 10 or on a radially top portion of the turbine engine 10). The air intake 17 directs air from the propulsor section 14 into the turbo-engine 16, as detailed further below.

The turbo-engine 16 includes, in serial flow relationship, a compressor 22, a combustor 26, and a turbine section 27. The turbo-engine 16 is substantially enclosed within an outer casing 18 that is substantially tubular and defines a radial inlet 20 at an axially aft end of the turbo-engine 16. As depicted schematically in FIG. 1, the combustor 26 is downstream of the compressor 22. The turbine section 27 is downstream of the combustor 26 and includes a high-pressure (HP) turbine 28 followed downstream by a low-pressure (LP) turbine 30. The turbo-engine 16 further includes an exhaust section 32 that is downstream of the turbine section 27, a high-pressure (HP) shaft 34 or a spool, and a low-pressure (LP) shaft 36. The HP shaft 34 drivingly connects the HP turbine 28 to the compressor 22. The HP turbine 28 and the compressor 22 rotate in unison through the HP shaft 34. The LP shaft 36 drivingly connects the LP turbine 30 to the propulsor section 14. The LP turbine 30 and the propulsor section 14 rotate in unison through the LP shaft 36. The compressor 22, the combustor 26, the turbine section 27, and the exhaust section 32 together define a core air flow path of the turbine engine 10.

The propulsor section 14 includes a propulsor 38 having a plurality of propulsor blades 40 (only one shown in FIG. 1) coupled to a disk 42 in a spaced apart manner. The propulsor 38 is a propeller. The propulsor blades 40 extend outwardly from the disk 42 generally along the radial direction R. The propulsor blades 40 and the disk 42 are together rotatable about the longitudinal centerline axis 12 via a propulsor shaft 45 that is powered by the LP shaft 36 across a power gearbox, also referred to as a gearbox assembly 46. In this way, the propulsor 38 is drivingly coupled to the turbo-engine 16 (e.g., to the LP turbine 30). The gearbox assembly 46 includes a plurality of gears for adjusting the rotational speed of the propulsor shaft 45 and, thus, the propulsor 38 relative to the LP shaft 36. In some embodiments, the propulsor 38 is a variable pitch propulsor such that each propulsor blade 40 is rotatable relative to the disk 42 about a pitch axis by virtue of the propulsor blades 40 being operatively coupled to an actuator configured to collectively vary the pitch of the propulsor blades 40 in unison. The disk 42 is covered by a rotatable propulsor hub 48 aerodynamically contoured to promote an airflow through the plurality of propulsor blades 40.

During operation of the turbine engine 10, a volume of air 60 passes through the propulsor blades 40 of the propulsor 38. As the volume of air 60 passes across the plurality of propulsor blades 40, a first portion of air, referred to as bypass air 62, is directed outside of the turbo-engine 16, and a second portion of air, referred to as core air 64, is directed into the air intake 17. The air intake 17 directs the core air 64 axially aftward towards the turbo-engine 16 and into the radial inlet 20.

The turbo-engine 16 is a reverse flow engine such that the core air 64 flows through the turbo-engine 16 from an aft end of the turbo-engine 16 to a forward end of the turbo-engine 16. In this way, the turbine engine 10 is referred to as a reverse flow turbine engine. The radial inlet 20 directs the core air 64 downstream to the compressor 22. In the compressor 22, a pressure of the core air 64 is increased, generating compressed air 66, and the compressed air 66 is routed into the combustor 26, where the compressed air 66 is mixed with fuel and burned to generate combustion gases 68. In the embodiment of FIG. 1, the combustor 26 is a reverse flow combustor such that the compressed air 66 flows from the compressor 22, around the combustor 26, and enters the combustor 26 at a forward end of the combustor 26. In this way, the compressed air 66 flows aftward within the combustor 26 and the combustion gases 68 are then directed from the combustor 26 forward to the turbine section 27.

In the turbine section 27, the combustion gases 68 are routed into the HP turbine 28 and expanded through the HP turbine 28 where a portion of thermal energy and kinetic energy from the combustion gases 68 is extracted via one or more stages of HP turbine stator vanes and HP turbine rotor blades that are coupled to the HP shaft 34. This causes the HP shaft 34 to rotate, supporting operation of the compressor 22 (self-sustaining cycle). In this way, the combustion gases 68 do work on the HP turbine 28. The combustion gases 68 are then routed into the LP turbine 30 and expanded through the LP turbine 30. Here, a second portion of the thermal energy and kinetic energy is extracted from the combustion gases 68 via one or more stages of LP turbine stator vanes and LP turbine rotor blades that are coupled to the LP shaft 36. This causes the LP shaft 36 to rotate, causing the propulsor 38 to rotate (self-sustaining cycle) via the gearbox assembly 46. In this way, the combustion gases 68 do work on the LP turbine 30. The combustion gases 68 are subsequently routed through the exhaust section 32 and out of the turbo-engine 16 to provide propulsive thrust.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In certain exemplary embodiments, the turbine engine 10 of FIG. 1 may be utilized to drive a propeller of a helicopter, or may be utilized in aeroderivative applications. Additionally, in other exemplary embodiments, the turbine engine 10 may include any other suitable type of combustor, and may not include the exemplary reverse flow combustor depicted.

Figure 2:
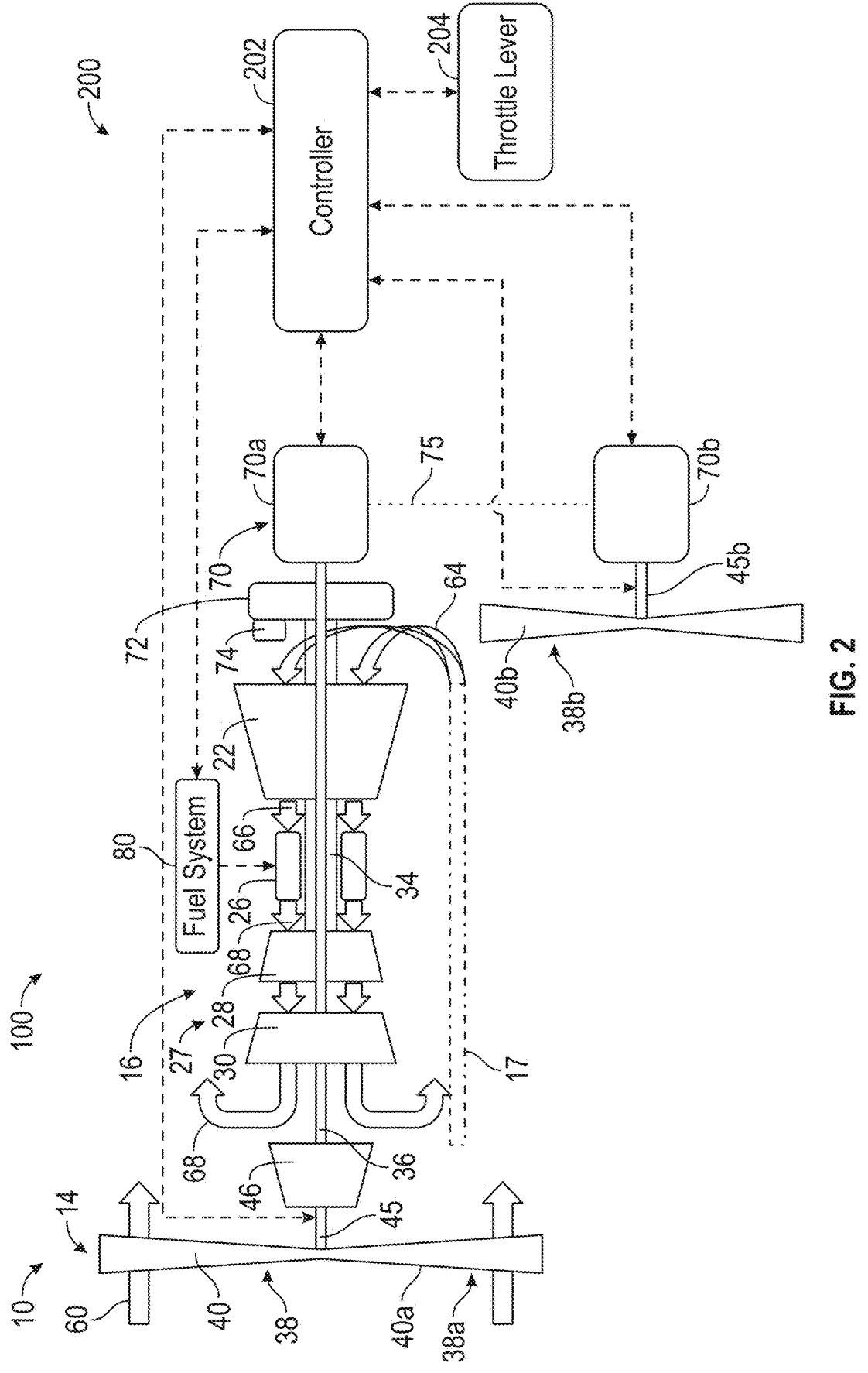
FIG. 2 is a schematic view of a propulsion system having a turbine engine control system, according to the present disclosure.

FIG. 2 is a schematic view of a propulsion system 100 having a turbine engine control system 200, according to the present disclosure. The propulsion system 100 includes the turbine engine 10. As shown in FIG. 2, the turbine engine 10 includes an electric machine 70 that is drivingly coupled to the LP shaft 36. In this way, the turbine engine 10 is a hybrid electric turbine engine. The electric machine 70 is positioned at an aft end of the turbine engine 10. The electric machine 70 may be positioned anywhere on the turbine engine 10. In some embodiments, the electric machine 70 is coupled to the LP shaft 36 via an electric machine gearbox (not shown in this view).

The electric machine 70 can be used in many different power configurations. In one form, the electric machine is configured to extract power from the LP shaft 36 when the electric machine 70 operates as a generator. The extraction of mechanical power from the LP shaft 36 and conversion to electric power can be used to charge an on-board power storage device such as a battery, or alternatively, to provide power to another electrical device (e.g., an electric motor, an electrical accessory on an aircraft, etc.). In other forms, the electric machine 70 can be used as a motor to provide power to the LP shaft 36 to supplement power extracted by the LP turbine 30 from the combustion gases 68. In these forms, the electric machine 70 can be configured to provide a minimum of 10% of supplemental thrust to the turbine engine 10, a minimum of 20% of supplemental thrust to the turbine engine 10, and up to 40% of supplemental thrust to the turbine engine 10 in various embodiments. In still other forms, the electric machine 70 can be configured to power to drive 100% of thrust from the propulsor section 14. A scenario in which the electric machine 70 provides all power to the propulsor section 14 can include shutdown of the turbine engine 10. In one non-limiting example of the turbine engine 10 being shut down, upon or near landing, the turbine engine 10 can be commanded to shut down and the electric machine 70 used to drive further propulsor thrust requirements, such as, for example, power when the propulsor section 14 is configured in reverse pitch to aid in slowing the aircraft.

A battery or other secondary power source (e.g., a fuel cell) can be used to provide power to the electric machine 70 when the electric machine 70 is operated as a motor. The supplementation of power by the electric machine 70 to the LP shaft 36 in this manner can be transitory or steady state, depending on the control requirements requested of the turbine engine 10. For example, in those operating conditions in which power output of the turbine engine 10 lags behind a commanded power, the electric machine 70 can provide near instantaneous supplemental power to the LP shaft 36 to provide on-condition power output until the turbine engine 10 achieves a steady state operating condition at the higher output power. In still further forms, the electric machine 70 can be operated as a motor in some portions of operation of the turbine engine 10, and as a generator in other portions of operation of the turbine engine 10, along the lines of any of the variations discussed herein.

The embodiment of FIG. 2 includes an accessory gearbox (AGB) 72 located aft of the compressor 22 and is coupled to a starter motor 74. The starter motor 74 is coupled to the HP shaft 34 via the AGB 72 such that, during a start sequence of the turbine engine 10, the starter motor 74 can be used to impart rotational power via the AGB 72 to the HP shaft 34. In the illustrated embodiment, the AGB 72 is depicted as being co-axial with the HP shaft 34 and the LP shaft 36 (the AGB 72 is drivingly coupled to the HP shaft 34, but not otherwise drivingly coupled with the LP shaft 36). To provide such a coaxial relationship between the HP shaft 34 and the AGB 72, in one form, the AGB 72 is a planetary gear system in which the HP shaft 34 is coupled to a sun gear of the planetary gear system. In other forms, a central gear of the AGB 72 is coupled via one or more idler gears to the starter motor 74. Other forms are also contemplated to permit a co-axial relationship between the AGB 72 and the HP shaft 34. In other forms, however, the AGB 72 need not be co-axial with the HP shaft 34.

The turbine engine 10 also includes a fuel system 80 for providing the fuel to the combustor 26. For example, the fuel system 80 can include a fuel tank for storing the fuel, one or more fuel lines in flow communication with the fuel tank and the combustor 26, and a fuel pump for delivering the fuel from the fuel tank to the combustor 26 through the one or more fuel lines. The turbine engine 10 includes a first propulsor 38*a* having a plurality of first propulsor blades 40*a* and a first propulsor shaft 45*a*, and a first electric machine 70*a*.

The propulsion system 100 also includes a second propulsor 38*b* having a plurality of second propulsor blades 40*b*. The second propulsor 38*b* is remote (e.g., separate) from the turbine engine 10. The second propulsor 38*b* includes a second propulsor shaft 45*b* that is drivingly coupled to a second electric machine 70*b*. The second electric machine 70*b* is in electrical communication with the first electric machine 70*a* via a power conduit 75. In this way, the first electric machine 70*a* provides power to the second electric machine 70*b* via the power conduit 75. In some embodiments, the second electric machine 70*b* provides power to the first electric machine 70*a* via the power conduit 75. In some embodiments, the first electric machine 70*a* and the second electric machine 70*b* exchange power via a common energy storage device (e.g., one or more batteries). The second electric machine 70*b* is operated as a motor and drives the plurality of second propulsor blades 40*b*. The second electric machine 70*b* can be used to provide additional thrust output beyond that provided by the plurality of first propulsor blades 40*a* driven by the turbine engine 10.

The turbine engine control system 200 includes a controller 202 and a single input device, also referred to as a single throttle lever 204. The controller 202 is in two-way communication with the propulsion system 100 (e.g., the turbine engine 10, the second propulsor 38*b*, and the single throttle lever 204) for controlling aspects of the propulsion system 100 (e.g., the turbine engine 10, the second propulsor 38*b*, and the single throttle lever 204). The controller 202, or components thereof, may be located onboard the turbine engine 10, onboard the aircraft, or can be located remote from each of the turbine engine 10 and the aircraft (e.g., on the ground or on a remote propulsor). The controller 202 can be a Full Authority Digital Engine Control (FADEC) that controls aspects of the turbine engine 10.

The controller 202 may be a standalone controller or may be part of an engine controller to operate various systems of the turbine engine 10. In this embodiment, the controller 202 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 202 to perform operations. The controller 202 and, more specifically, the one or more processors are programmed or configured to perform these operations, such as the operations discussed further below. In some embodiments, the instructions can be executed by the one or more processors to cause the one or more processors to complete any of the operations and functions for which the controller 202 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The single throttle lever 204 is a single, pilot-controllable, power control lever for controlling a power level of the turbine engine 10 and the second propulsor 38*b*. In this way, the turbine engine control system 200 includes a single throttle lever 204 (e.g., one throttle lever) for controlling aspects of both the turbine engine 10 and the second propulsor 38*b*. The single throttle lever 204 may be a pilot-accessible mechanical lever, for instance, located in a cockpit or a flight deck of an aircraft, that allows the pilot to provide input to control the turbine engine control system 200 by physically moving the single throttle lever 204 through a predetermined physical range of motion corresponding to the operation range of the turbine engine control system 200. The single throttle lever 204 physical range of motion may additionally include a first portion or a first range, wherein moving the single throttle lever 204 into the first portion corresponds to a forward movement of the aircraft, and a second portion or a second range, wherein moving the single throttle lever 204 into the second portion corresponds to a rearward movement of the aircraft.

The single throttle lever 204 can include a positional sensor that detects or converts the position of the single throttle lever 204, relative to the operational range of the single throttle lever 204 motion (in both the first position and the second position), and generate an output signal (e.g., a control signal) indicative of the position of the single throttle lever 204. For example, the single throttle lever 204 can include a lever anchored at a lever pivot, and rotatable over 88°, wherein the foremost 44° of rotation (relative to the pilot) may provide the first portion in the range of motion, while the rearmost 44° may provide the second portion, or reverse, range of motion. The positional sensor, in turn, generates a control signal that ranges from −44° to +44°. The 0° to 44° range defines the first position (corresponding to forward movement) and the 0° to −44° range defines the second position (corresponding to rearward movement). The single throttle lever 204 can be rotatable over any range, as desired, for generating a control signal for controlling the turbine engine 10 or portions thereof. While a lever is described for the single throttle lever 204, additional input devices allowing for pilot input can be used, such as a dial or a knob. Further, the single throttle lever 204 may be remote from the aircraft (e.g., remote controlled). Additionally, particular positions of the single throttle lever 204 may define different flight regimes, such as taxi, cruise, and takeoff. For example, a position of the single throttle lever 204 between 0 degrees and 20 degrees represents a taxi operation, a position of the single throttle lever 204 between 21 degrees and 30 degrees represents a cruise operation, and a position of the single throttle lever 204 at 44° represents a takeoff operation.

In operation, the turbine engine control system 200 receives an input (e.g., the control signal) from the single throttle lever 204 and controls the turbine engine 10 (e.g., at least one of the turbo-engine 16 or the first propulsor 38*a*) and the second propulsor 38*b* based on the input from the single throttle lever 204. In particular, the turbine engine control system 200 controls a rotational speed of the turbo-engine 16 and at least one of a rotational speed of the first propulsor 38*a*, a pitch of the plurality of first propulsor blades 40*a*, or a torque of the first propulsor 38*a*. The turbine engine control system 200 also controls at least one of a rotational speed of the second propulsor 38*b*, a pitch of the plurality of second propulsor blades 40*b*, or a torque of the second propulsor 38*b*. In some embodiments, the turbine engine control system 200 controls the fuel system 80 to increase or to decrease a fuel flow rate of the fuel to the combustor 26 to control the rotational speed of the turbo-engine 16. In some embodiments, the turbine engine control system 200 controls the first electric machine 70*a* to control the first propulsor 38*a*. For example, the controller 202 controls the first electric machine 70*a* and the second electric machine 70*b* to increase or to decrease an amount of power from the first electric machine 70*a* to the first propulsor 38*a* for controlling the rotational speed or the torque of the first propulsor 38*a*. The turbine engine control system 200 similarly controls the second electric machine 70*b* to control the second propulsor 38*b*.

To control the turbine engine 10, the first propulsor 38*a*, and the second propulsor 38*b*, the controller 202 receives a position input from the single throttle lever 204. The controller 202 then converts the position input into at least one of a turbine engine setting or a first propulsor setting, and a second propulsor setting. The turbine engine setting includes a rotational speed of the turbo-engine 16. The first propulsor setting includes at least one of a rotational speed of the first propulsor 38*a*, a pitch of the plurality of first propulsor blades 40*a*, or a torque of the first propulsor 38*a*. The second propulsor setting includes at least one of a rotational speed of the second propulsor 38*b*, a pitch of the plurality of second propulsor blades 40*b*, or a torque of the second propulsor 38*b*. The controller 202 then controls at least one of a rotational speed of the turbo-engine 16, a rotational speed of the first propulsor 38*a*, a pitch of the plurality of first propulsor blades 40*a*, or a torque of the first propulsor 38*a*, and at least one of a rotational speed of the second propulsor 38*b*, a pitch of the plurality of second propulsor blades 40*b*, or a torque of the second propulsor 38*b* based on the at least one of the turbine engine setting or the first propulsor setting, and the second propulsor setting. For example, the controller 202 controls the rotational speed of the turbo-engine 16 based on the turbine engine setting. The controller 202 controls at least one of the rotational speed of the first propulsor 38*a*, the pitch of the plurality of first propulsor blades 40*a*, or the torque of the first propulsor 38*a* based on the first propulsor setting. The controller 202 controls at least one of the rotational speed of the second propulsor 38*b*, the pitch of the plurality of second propulsor blades 40*b*, or the torque of the second propulsor 38*b* based on the second propulsor setting.

In one embodiment, the controller 202 determines the turbine engine setting, the first propulsor setting, and the second propulsor setting based on one or more speed maps. For example, the controller 202 includes a turbo-engine speed map, a first propulsor speed map, and a second propulsor speed map. The turbine engine speed map, the first propulsor speed map, and the second propulsor speed map each operates as a demand map, or a look-up table, and may be configured with predetermined or dynamic profiles or setting values, for instance, via an implementation of an algorithm. In particular, the speed maps correlate various position inputs from the single throttle lever 204 to the turbine engine setting, the first propulsor setting, and the second propulsor setting. Each of the turbine engine speed map, the first propulsor speed map, and the second propulsor speed map may additionally define limitations to aircraft operation. For example, the turbine engine speed map, the first propulsor speed map, and the second propulsor speed map may provide limited maximum or minimum thrust or speed utilized during taxi, cruise, or takeoff. In another example, the turbine engine speed map, the first propulsor speed map, and the second propulsor speed map may define a maximum or a minimum turbine engine 10 speed, first propulsor 38*a* speed and pitch, or second propulsor 38*b* speed and pitch utilized during ground idle. In another example, the first propulsor speed map and the second propulsor speed map may define a constant propulsor speed with an adjusting propulsor blade pitch value. Alternatively, the first propulsor speed map and the second propulsor speed map may provide a constant propulsor blade pitch value with a varying propulsor speed. In yet another example, the first propulsor speed map and the second propulsor speed map may provide a varied speed or a varied pitch in either a forward thrust operation or a reverse thrust operation. In even yet another example, the first propulsor speed map and the second propulsor speed map may employ multiple maps, wherein, for instance, a forward control signal utilizes a forward propulsor speed map while a reverse control signal utilizes a reverse propulsor speed map. In even yet another example, the turbine engine speed map, the first propulsor speed map, and the second propulsor speed map may be configured to prevent excess or undesirable temperature conditions on the turbo-engine 16 and over-torque or over-speed on the first propulsor 38*a* and the second propulsor 38*b*, respectively.

The turbine engine speed map, the first propulsor speed map, and the second propulsor speed map may additionally define profiles of operation, wherein, for example, the turbine engine speed map, the first propulsor speed map, and the second propulsor speed map are configured to provide setting values for optimal aircraft efficiency, turbine engine efficiency, or propulsor efficiency. For example, the first propulsor speed map and the second propulsor speed map may be configured to provide an optimized propulsor speed for a corresponding turbine engine speed map value. The optimized profiles may additionally take into account additional sensor values, for instance, relating to air speed, altitude, etc., to provide an optimal turbine engine 10 speed, an optimal first propulsor 38*a* speed and first propulsor blade 40*a* pitch, and an optimal second propulsor 38*b* speed and second propulsor blade 40*b* pitch, for example, for an optimized fuel efficiency profile, an optimized thrust profile, an optimized audible profile (i.e., by controlling pitch of the first propulsor blades 40*a* or the second propulsor blades 40*b*), or an optimized flight time efficiency profile. The optimization profiles may be further delineated by a given control signal from the single throttle lever 204. The optimized profiles may be user-selectable by the pilot.

Additionally, or alternatively, at least one of the turbine engine speed map, the first propulsor speed map, or the second propulsor speed map may be configured to provide for a linear thrust response, that is, a linear thrust relative to the position of the single throttle lever 204. The thrust response may be linear in a forward thrust operation or a reverse thrust operation. In this sense, "linear" may refer to the overall thrust which, as explained above, is affected by the configurations of the turbine engine 10, the first propulsor 38a, the first propulsor blades 40a, the second propulsor 38b, and the second propulsor blades 40b. Thus, a linear thrust may not be proportionally related to, for example, only a change in one component (e.g., the turbo-engine 16, the first propulsor 38a, the first propulsor blades 40a, the second propulsor 38b, or the second propulsor blades 40b) of the configuration. Additionally, "linear" may define a maximum allowable change in setting values, regardless of how much change or how quickly a change was requested via the single throttle lever 204. In this instance, a "linear" thrust response may only allow for a 1% increase in turbine engine power per second. In another sense, "linear" may define a feedback response from a perspective of the pilot. For instance, a pilot may define a feeling of "linear" thrust response as, for example, a 1% increase in thrust for one second, followed by a 2% increase in thrust for three seconds. Further, this thrust response may be different depending on the status, or flight regime, of the aircraft (e.g., taxi, cruise, takeoff, etc.).

Each of the turbine engine speed map, the first propulsor speed map, or the second propulsor speed map receive the control signal from the single throttle lever 204, and the controller 202 determines the turbine engine setting (e.g., the turbo-engine setting and the first propulsor setting) and the second propulsor setting in response to, or as a function of, the received input. In some embodiments, the controller 202 determines a desired turbine engine setting (e.g., a desired turbo-engine setting and a desired first propulsor setting) and a desired second propulsor setting based on the received input from the single throttle lever 204. The controller 202 then compares the desired turbine engine setting and the desired second propulsor setting to an actual turbine engine setting and an actual second propulsor setting. For example, the controller 202 determines the actual rotational speed of the turbo-engine 16, the actual rotational speed of the first propulsor 38a and the second propulsor 38b, the actual pitch of the first propulsor blades 40a and the second propulsor blades 40b, and the actual torque of the first propulsor 38a and the second propulsor 38b. The controller 202 then controls the turbo-engine 16, the first propulsor 38a, and the second propulsor 38b based on the comparison. For example, to speed up the first propulsor 38a or the second propulsor 38b, the controller 202 generates a positive value, that in turn, decreases the first propulsor 38a pitch or the second propulsor 38b pitch, thus increasing the rotational speed of the first propulsor 38a or the second propulsor 38b. Likewise, to slow down the first propulsor 38a or the second propulsor 38b, the controller 202 generates a negative value, that in turn, increases the first propulsor 38a pitch or the second propulsor 38b pitch, thus decreasing the rotational speed of the first propulsor 38a or the second propulsor 38b. In instances when the control signal is static, the operation of speeding up and/or slowing down of the first propulsor 38a or the second propulsor 38b will ultimately equalize at a point wherein the controller 202 generates a neutral value, at which the pitch of the first propulsor 38a or the second propulsor 38b is neither increased nor decreased. The controller 202 can similarly control the turbo-engine 16, the first propulsor 38a, and the second propulsor 38b during a reverse thrust operation.

Figure 3:
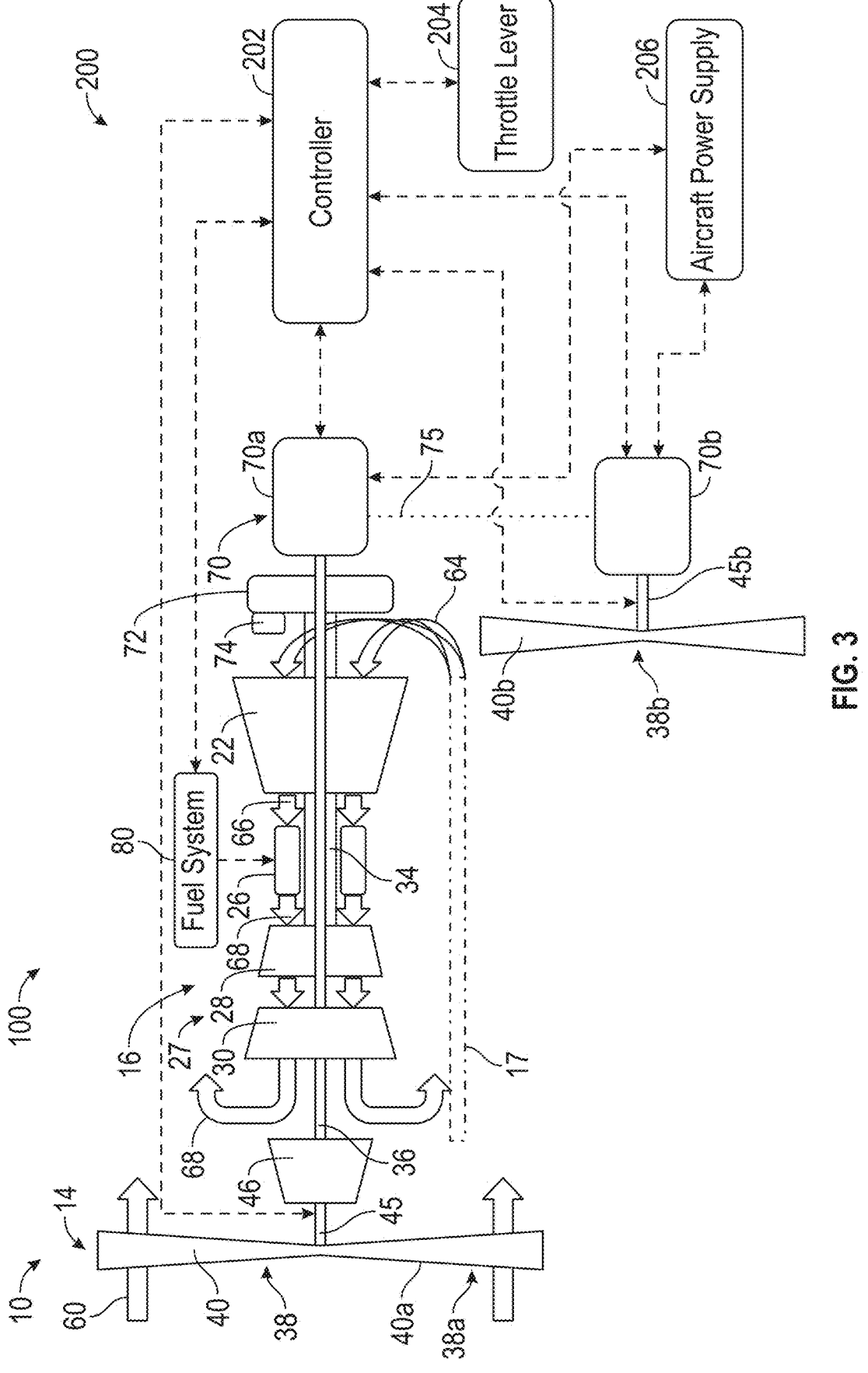
FIG. 3 is a schematic view of the propulsion system of FIG. 2 having the turbine engine control system, according to the present disclosure.

FIG. 3 is a schematic view of the propulsion system 100 having the turbine engine control system 200, according to the present disclosure. As shown in FIG. 3, the turbine engine control system 200 further includes an aircraft power supply 206 for powering the second electric machine 70b. The aircraft power supply 206 includes at least one of a fuel cell, one or more batteries, or an auxiliary power unit (APU) of the aircraft. The aircraft power supply 206 can also power the first electric machine 70a. In some embodiments, the second electric machine 70b receives power from both the first electric machine 70a and the aircraft power supply 206. For example, the aircraft power supply 206 supplies the power during takeoff or landing, and the first electric machine 70a supplies the power during cruise.

Figure 4:
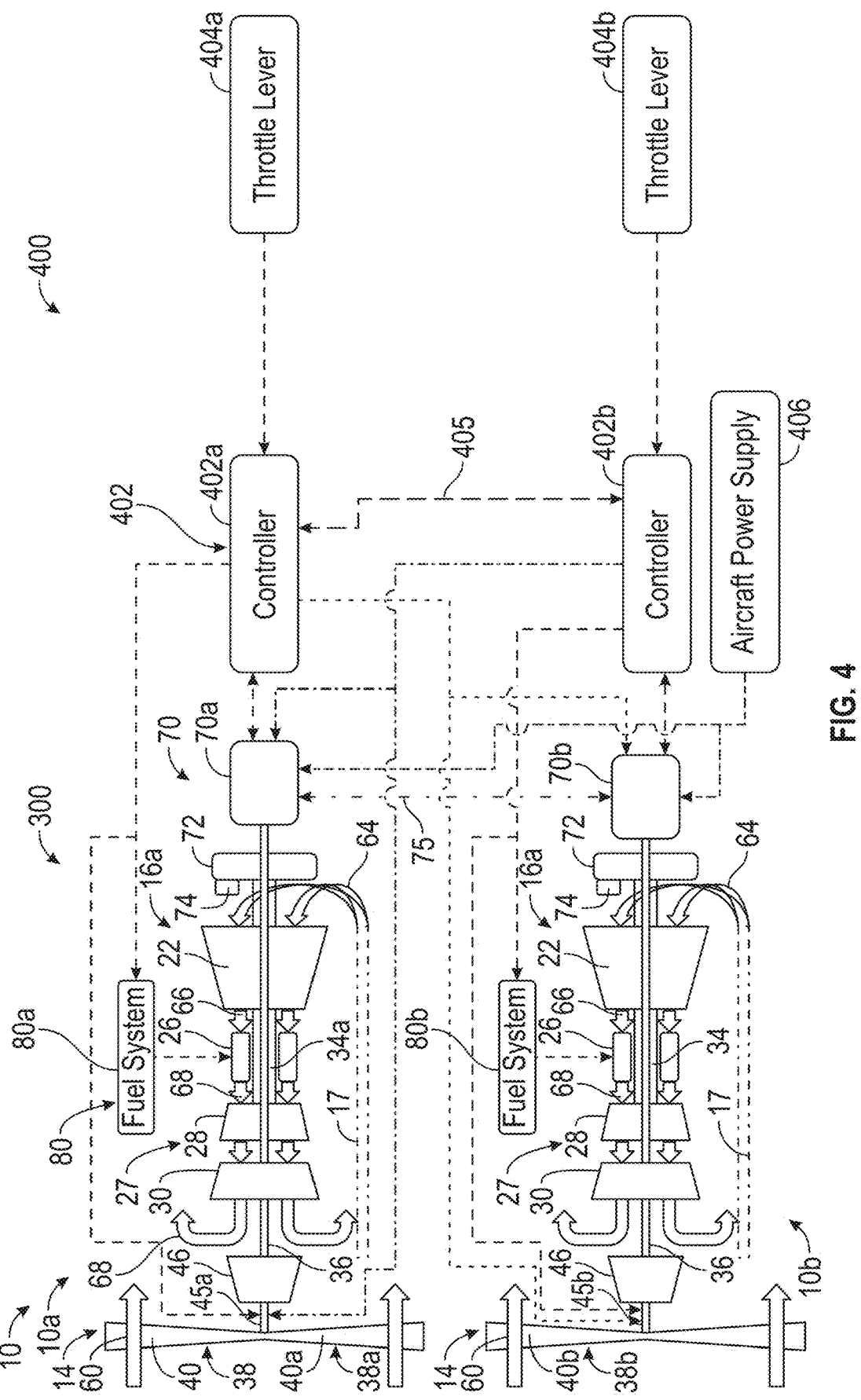
FIG. 4 is a schematic view of a propulsion system having a turbine engine control system, according to another embodiment.

FIG. 4 is a schematic view of a propulsion system 300 having a turbine engine control system 400, according to another embodiment. The turbine engine control system 400 is substantially similar to the turbine engine control system 200 of FIGS. 2 and 3. The same or similar reference numerals will be used for components of the turbine engine control system 400 that are the same as or similar to the components of the turbine engine control system 200 discussed above, unless stated otherwise. The description of these components above also applies to this embodiment, and a detailed description of these components is omitted here.

The propulsion system 300 includes a plurality of turbine engines 10 including a first turbine engine 10a and a second turbine engine 10b. The first turbine engine 10a has a first turbo-engine 16a and the second turbine engine 10b has a second turbo-engine 16b. The second propulsor 38b is drivingly coupled to the second turbo-engine 16b (e.g., via the LP shaft 36 of the second turbo-engine 16b) such that the second turbine engine 10b includes the second propulsor 38b. In this way, the second turbo-engine 16b powers the second propulsor 38b. The first turbine engine 10a includes a first fuel system 80a and the second turbine engine 10b includes a second fuel system 80b.

The turbine engine control system 400 includes one or more controllers 402 and one or more single throttle levers 404 including a first single throttle lever 404a and a second single throttle lever 404b. The turbine engine control system 400 also includes an aircraft power supply 406. The one or more controllers 402 include a first controller 402a for controlling the first turbine engine 10a and a second controller 402b for controlling the second turbine engine 10b. The first single throttle lever 404a is in communication with the first controller 402a. The second single throttle lever 404b is in communication with the second controller 402b. In this way, the first single throttle lever 404a controls the first turbine engine 10a and the second single throttle lever 404b controls the second turbine engine 10b. The turbine engine control system 400 also includes a data communication bus 405 for providing communication between the first controller 402a and the second controller 402b. The data communication bus 405 can include wired communication (e.g., a wire harness, an aircraft data bus, such as ARINC, etc.) or wireless communication (e.g., Wi-Fi®, Bluetooth®, cellular communication, such as 5G, etc.). In this way, the first controller 402a can control aspects of the second turbine engine 10b and the second controller 402b can control aspects of the first turbine engine 10a, under certain operating conditions, as detailed further below.

In operation, the turbine engine control system 400 is substantially similar to the turbine engine control system 200 of FIG. 2. The first controller 402a controls the first turbine engine 10a (e.g., the first turbo-engine 16a and the first propulsor 38a) based on the input from the first single throttle lever 404a. The second controller 402b controls the second turbine engine 10*b* (e.g., the second turbo-engine 16*b* and the second propulsor 38*b*) based on the input from the second single throttle lever 404*b*.

The first controller 402*a* receives operating mode signals indicative of an operating mode of the second turbine engine 10*b* from the second controller 402*b*. In some instances, the second turbine engine 10*b* enters a standby operating mode or a failure mode occurs. For example, the rotational speed of the second turbo-engine 16*b* reduces to less than a speed threshold for the current flight condition, or the first controller 402*a* loses communication with the second controller 402*b*. The standby operating mode can comprise at least one of a normal idling mode, an assisted idling mode, a banking mode, or a stopping mode. The normal idling mode occurs when the combustor 26 is operating (e.g., ignited) and the LP shaft 36 rotates at a rotational speed in a range of 45% to 70% of a nominal speed of the LP shaft 36. The nominal speed is a speed of the LP shaft 36 at a maximum cruise condition of the second turbine engine 10*b* (or the first turbine engine 10*a*). The assisted idling mode occurs when the combustor 26 is operating and the LP shaft 36 rotates in a mechanically-assisted manner (e.g., via the starter motor 74) at a rotational speed in a range of 20% to 60% of the nominal speed. The banking mode occurs when the combustor 26 is shut down (e.g., extinguished) and the LP shaft 36 rotates in a mechanically-assisted manner at a rotational speed in a range of 5% to 30% of the nominal speed. The stopping mode occurs when the combustor 26 is shut down and the LP shaft 36 stops rotating or windmills due to airflow through the turbine engine 10.

The first controller 402*a* detects that the second turbine engine 10*b* is in the standby operating mode (e.g., based on the operating mode signals) and provides electrical power from the first turbine engine 10*a* (e.g., the first electric machine 70*a*) to the second turbine engine 10*b* (e.g., the second electric machine 70*b*) such that the first turbine engine 10*a* powers the second turbine engine 10*b*. During the standby operating mode of the second turbine engine 10*b*, the first controller 402*a* controls the second turbine engine 10*b* and the second propulsor 38*b* based on the input from the first single throttle lever 404*a*. In this way, the first controller 402*a* controls the rotational speed of the first turbo-engine 16*a* and the second turbo-engine 16*b*, the rotational speed and the torque of the first propulsor 38*a* and the second propulsor 38*b*, and the pitch of the first propulsor blades 40*a* and the second propulsor blades 40*b* based on the input from the first single throttle lever 404*a*. In some embodiments, the first controller 402*a* controls the second turbine engine 10*b* based on a predetermined position or a positional threshold of the first single throttle lever 404*a*. For example, the pilot could move the first single throttle lever 404*a* into the predetermined position or beyond the positional threshold during any operating mode to control the second turbine engine 10*b* with the first controller 402*a* based on the first single throttle lever 404*a*.

Figure 5:
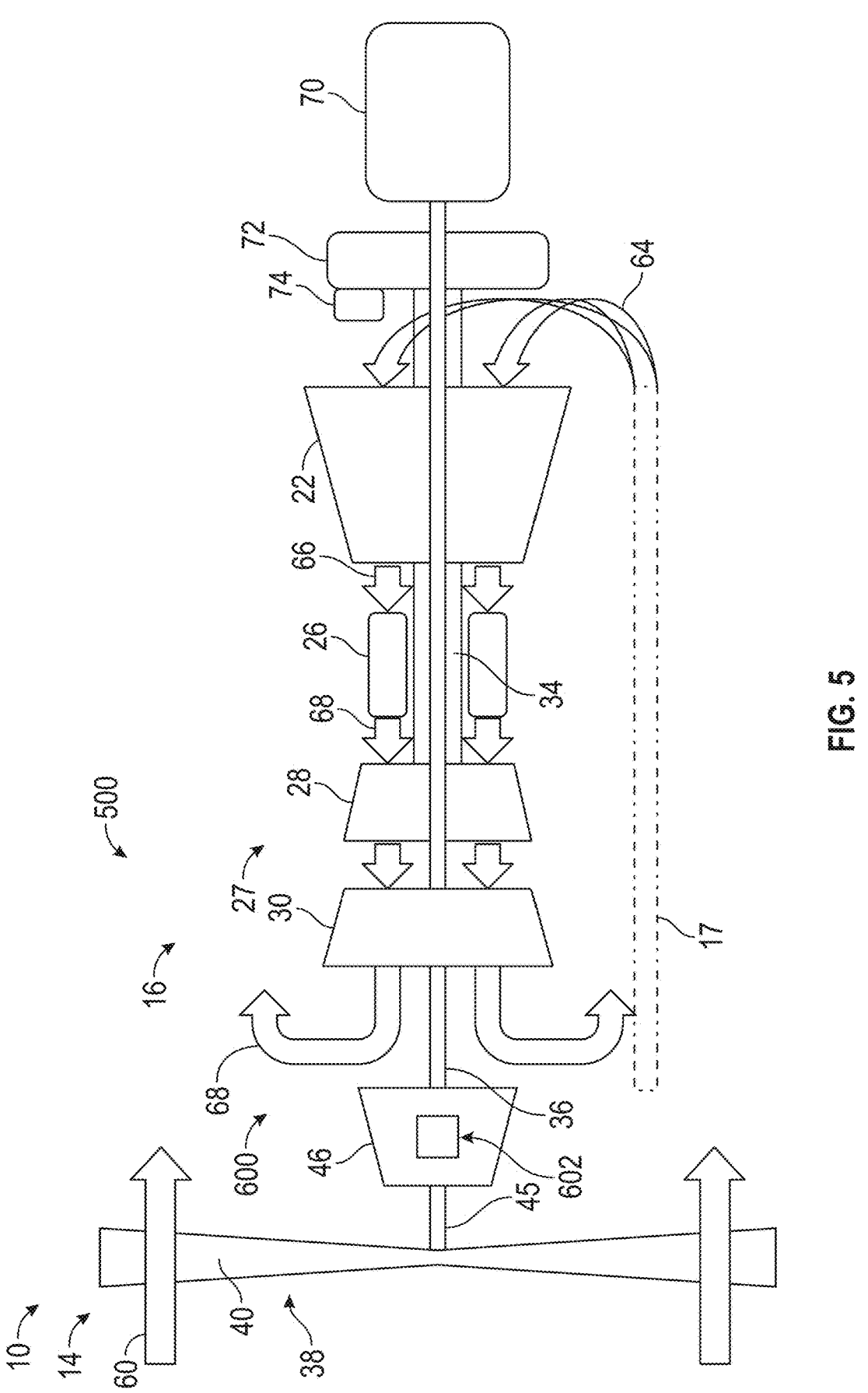
FIG. 5 is a schematic view of a propulsion system, according to another embodiment.

FIG. 5 is a schematic view of a propulsion system 500, according to another embodiment. The propulsion system 500 includes the turbine engine 10. The turbine engine 10 includes a lubrication system 600 having a gearbox lubrication system 602 for the gearbox assembly 46. The gearbox lubrication system 602 is entirely contained within the gearbox assembly 46, as detailed further below.

Figure 6:
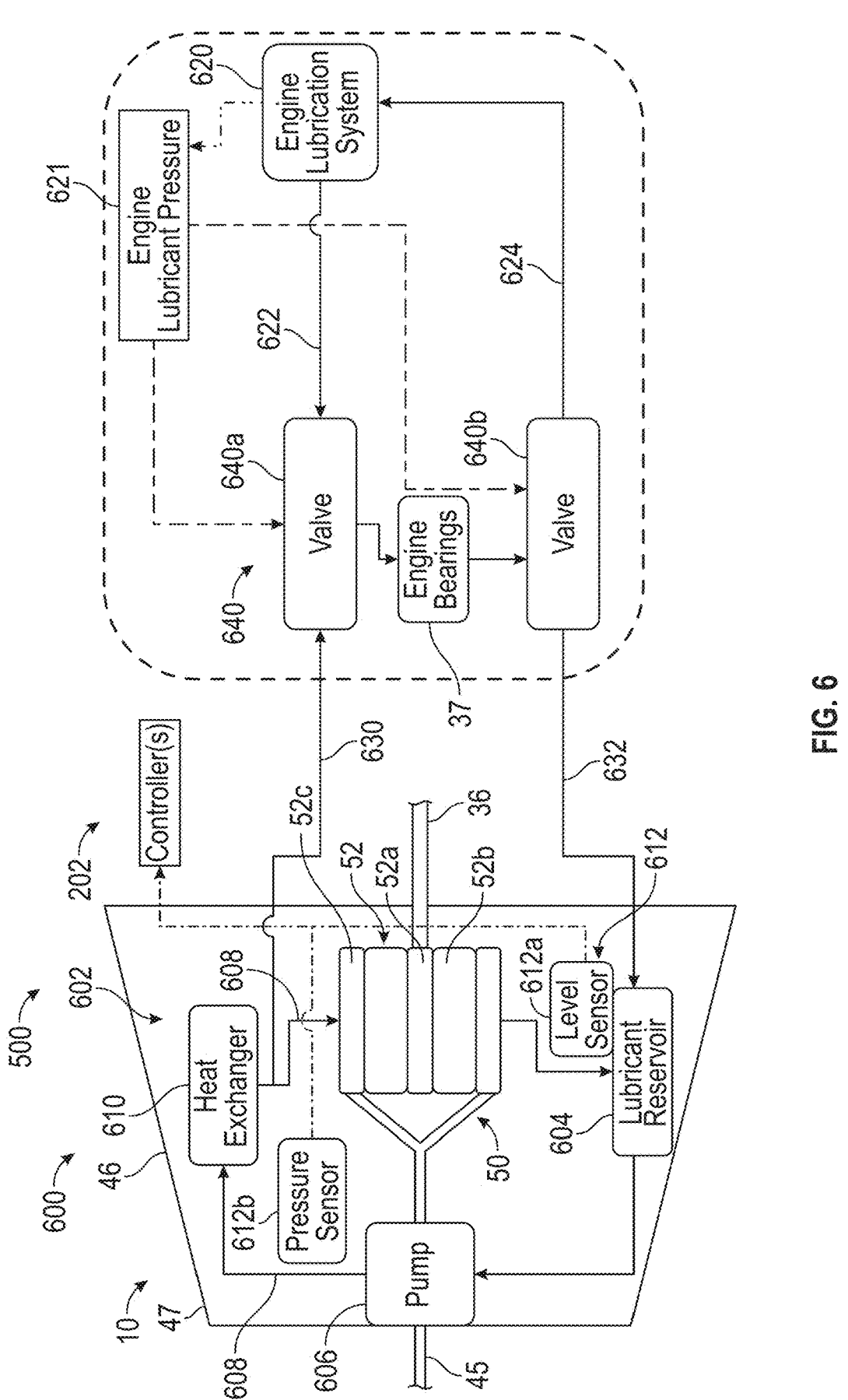
FIG. 6 is an enlarged schematic view of a lubrication system for the propulsion system of FIG. 5, according to the present disclosure.

FIG. 6 is an enlarged schematic view of the lubrication system 600 for the propulsion system 500, according to the present disclosure. As shown in FIG. 6, the turbine engine 10 includes one or more engine bearings 37 that support rotation of the HP shaft 34, the LP shaft 36, or other rotating components of the turbine engine 10. The gearbox assembly 46 includes a gearbox housing 47 and a gear assembly 50 disposed within the gearbox housing 47. The propulsor shaft 45 is drivingly coupled to the LP shaft 36 through the gear assembly 50. The gear assembly 50 includes one or more gears 52. In FIG. 6, the gear assembly 50 is a planetary gear assembly that includes a first gear 52*a*, one or more second gears 52*b*, and a third gear 52*c*. The first gear 52*a* is a sun gear, the one or more second gears 52*b* are planet gears, and the third gear 52*c* is a ring gear. The LP shaft 36 is coupled to the first gear 52*a* and the propulsor shaft 45 is coupled to the third gear 52*c*. The gear assembly 50 can include any number of gears 52 in any configuration for transmitting power from the LP shaft 36 to the propulsor shaft 45, as desired.

The gearbox lubrication system 602 includes a gearbox lubricant reservoir 604, a pump 606, and a gearbox lubricant supply line 608. The gearbox lubricant reservoir 604 stores a lubricant therein. The lubricant can include any type of lubricant for lubricating the gearbox assembly 46. For example, the lubricant is oil, or the like. The gearbox lubricant reservoir 604 includes at least one of a lubricant tank or a sump. The sump collects the lubricant that drains from the gear assembly 50. The gearbox lubricant supply line 608 is in fluid communication with the gearbox lubricant reservoir 604 and the gear assembly 50 for supplying the lubricant from the gearbox lubricant reservoir 604 to the gear assembly 50. The pump 606 is in fluid communication with the gearbox lubricant supply line 608 to pump the lubricant from the gearbox lubricant reservoir 604 to the gear assembly 50 through the gearbox lubricant supply line 608. The pump 606 is drivingly coupled to the propulsor shaft 45. In this way, the pump 606 pumps the lubricant from the gearbox lubricant reservoir 604 when the propulsor shaft 45 rotates. Thus, the lubrication system 600 is a mechanically-driven lubrication system. In some embodiments, the pump 606 is drivingly coupled to the LP shaft 36. In some embodiments, the pump 606 is drivingly coupled to at least one of the plurality of gears 52 of the gear assembly 50. Thus, the pump 606 is drivingly coupled to at least one of the propulsor shaft 45, the LP shaft 36, or the gear assembly 50. The gearbox lubrication system 602 also includes a heat exchanger 610 in fluid communication with the gearbox lubricant supply line 608. The heat exchanger 610 cools the lubricant as the lubricant flows through the gearbox lubricant supply line 608 before being supplied to the gear assembly 50.

The gearbox lubrication system 602 also includes one or more lubricant sensors 612 for sensing information about the lubricant in the gearbox lubrication system 602. The one or more lubricant sensors 612 are in communication with the controller 202 for sending the information about the lubricant to the controller 202. For the propulsion system 300 (FIG. 4), the one or more lubricant sensors 612 send the information about the lubricant to the first controller 402*a* (FIG. 4) of the first turbine engine 10*a* (FIG. 4) and to the second controller 402*b* (FIG. 4) of the second turbine engine 10*b* (FIG. 4). In this way, both the local engine (e.g., the first turbine engine 10*a*) and the remote engine (e.g., the second turbine engine 10*b*) receive the information about the lubricant from the one or more lubricant sensors 612 of each of the turbine engines 10*a*, 10*b*.

The one or more lubricant sensors 612 include a lubricant level sensor 612*a* and a lubricant pressure sensor 612*b*. The lubricant level sensor 612*a* senses a level of the lubricant in the gearbox lubricant reservoir 604. The lubricant pressure sensor 612*b* senses a pressure of the lubricant in the gearbox lubricant supply line 608. The lubricant sensors 612 can also include a lubricant temperature sensor for sensing a temperature of the lubricant, and a lubricant flow sensor for sensing a flow rate of the lubricant. The propulsion system 500 can utilize the information from the sensors to detect a failure mode of the lubrication system 600 and to control the turbine engine 10 in response to the failure mode, as detailed further below.

The lubrication system 600 also includes an engine lubrication system 620 that supplies lubricant to the one or more engine bearings 37. The gearbox lubrication system 602 is fluidly separate from the engine lubrication system 620. In this way, the gearbox lubrication system 602 lubricates the gear assembly 50 without receiving lubricant from the engine lubrication system 620. The engine lubrication system 620 includes an engine lubricant supply line 622 and an engine lubricant return line 624. Although not shown, the engine lubrication system 620 also includes a pump and a gearbox lubricant reservoir. The engine lubricant supply line 622 is in fluid communication with the engine bearings 37 for supplying the lubricant to the engine bearings 37 through the engine lubricant supply line 622. The engine lubricant return line 624 is in fluid communication with the engine bearings 37 for returning the lubricant from the engine bearings 37 back to the engine lubrication system 620.

The lubrication system 600 includes a gearbox engine bearing supply line 630 and a gearbox engine bearing return line 632. The gearbox engine bearing supply line 630 is in fluid communication with the gearbox lubricant supply line 608 and the engine bearings 37 for supplying the lubricant from the gearbox lubrication system 602 to the engine bearings 37. The gearbox engine bearing return line 632 is in fluid communication with the engine bearings 37 and the gearbox lubricant reservoir 604 for returning the lubricant from the engine bearings 37 to the gearbox lubricant reservoir 604.

The lubrication system further includes one or more valves 640 in fluid communication with the engine lubricant supply line 622, the gearbox engine bearing supply line 630, the engine lubricant return line 624, and the gearbox engine bearing return line 632. The one or more valves 640 can be shuttle valves for allowing the lubricant to flow, or preventing the lubricant from flowing, through the engine lubricant supply line 622, the gearbox engine bearing supply line 630, the engine lubricant return line 624, and the gearbox engine bearing return line 632. The one or more valves 640 can include any type of valve, such as, for example, check valves, for allowing the lubricant to flow, or preventing the lubricant from flowing, through the engine lubricant supply line 622, the gearbox engine bearing supply line 630, the engine lubricant return line 624, and the gearbox engine bearing return line 632. The one or more valves 640 include a first valve 640a in fluid communication with the engine lubricant supply line 622 and the gearbox engine bearing supply line 630. The first valve 640a allows the lubricant to flow, or prevents the lubricant from flowing, through the engine lubricant supply line 622 and the gearbox engine bearing supply line 630. The one or more valves 640 include a second valve 640b in fluid communication with the engine lubricant return line 624 and the gearbox engine bearing return line 632. The second valve 640b allows the lubricant to flow, or prevents the lubricant from flowing, through the engine lubricant return line 624 and the gearbox engine bearing return line 632.

The engine lubrication system 620 communicates an engine lubricant pressure signal 621 to the one or more valves 640 for actuating the one or more valves 640, as detailed further below. In some embodiments, the one or more valves 640 are electrically actuated by the turbine engine control system 400. For example, the controller 202 controls the one or more valves 640 to actuate the one or more valves 640.

In operation, the gearbox lubrication system 602 supplies the lubricant to the gear assembly 50 to lubricate the gear assembly 50. The gearbox lubrication system 602 is a standalone lubrication system that operates to supply the lubricant to the gear assembly 50 entirely separate from the engine lubrication system 620. In particular, the pump 606 pumps the lubricant from the gearbox lubricant reservoir 604 to the gear assembly 50 through the gearbox lubricant supply line 608. The heat exchanger 610 cools the lubricant in the gearbox lubricant supply line 608 as the lubricant flows through the gearbox lubricant supply line 608 and to the gear assembly 50. After lubricating the gear assembly 50 (e.g., the plurality of gears 52), the lubricant drains into the gearbox lubricant reservoir 604 (e.g., the sump). The lubricant is then re-circulated through the gearbox lubrication system 602. Thus, the gearbox lubrication system 602 is a self-contained lubrication system for supplying the lubricant to the gear assembly 50 without the use of the engine lubrication system 620. In this way, the gearbox lubrication system 602 can operate even if the turbo-engine 16 (FIG. 5) shuts down.

During normal operation, the engine lubrication system 620 supplies the lubricant to the engine bearings 37 through the engine lubricant supply line 622. During the normal operation, the pressure of the lubricant in the engine lubrication system 620 (e.g., the engine lubricant supply line 622) is greater than the pressure of the lubricant in the gearbox lubrication system 602 (e.g., the gearbox engine bearing supply line 630). Thus, the first valve 640a opens the engine lubricant supply line 622 and closes the gearbox engine bearing supply line 630. In this way, the lubricant flows through the engine lubricant supply line 622 to the engine bearings 37 for lubricating the engine bearings 37, and the first valve 640a prevents the lubricant in the gearbox lubrication system 602 from flowing to the engine bearings 37. After lubricating the engine bearings 37, the engine lubricant return line 624 directs the lubricant back through the engine lubrication system 620. In particular, the second valve 640b opens the engine lubricant return line 624 and closes the gearbox engine bearing return line 632. In this way, the lubricant flows from the engine bearings 37 to the engine lubrication system 620 through the engine lubricant return line 624 to recirculate the lubricant to the engine bearings 37.

The gearbox lubrication system 602 supplies the lubricant to the engine bearings 37 when the turbine engine 10 is shut down. The engine lubrication system 620 reduces the supply, or stops the supply, of the lubricant to the engine bearings 37 when the turbine engine 10 is shut down such that the pressure of the lubricant in the engine lubrication system 620 reduces. Accordingly, the pressure of the lubricant in the gearbox lubrication system 602 is greater than the pressure of lubricant in the engine lubrication system 620 when the turbine engine 10 is shut down. The first valve 640a closes the engine lubricant supply line 622 and opens the gearbox engine bearing supply line 630. In this way, the lubricant from the gearbox lubrication system 602 flows through the gearbox engine bearing supply line 630 to the engine bearings 37 to lubricate the engine bearings 37. After lubricating the engine bearings 37, the gearbox engine bearing return line 632 directs the lubricant back through the gearbox lubrication system 602. In particular, the second valve 640b opens the gearbox engine bearing return line 632 and closes the engine lubricant return line 624. In this way, the lubricant flows from the engine bearings 37 to the gearbox lubricant reservoir 604 to recirculate the lubricant through the gearbox lubrication system 602.

Figure 7:
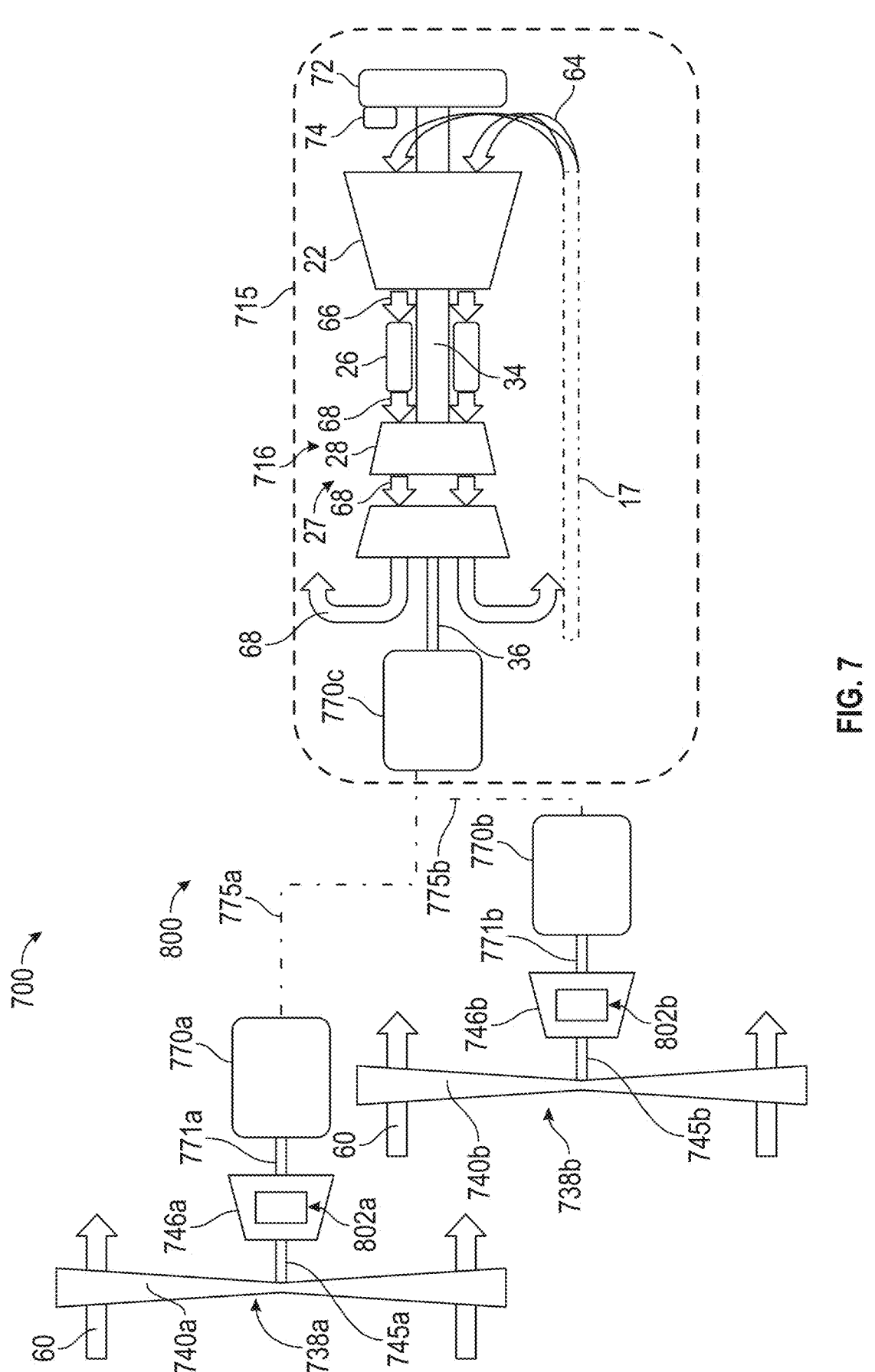
FIG. 7 is a schematic view of a propulsion system having a lubrication system, according to another embodiment.

FIG. 7 is a schematic view of a propulsion system 700 having a lubrication system 800, according to another embodiment. The lubrication system 800 is substantially similar to the lubrication system 600 of FIGS. 5 and 6. The same or similar reference numerals will be used for components of the lubrication system 800 that are the same as or similar to the components of the lubrication system 600 discussed above, unless stated otherwise. The description of these components above also applies to this embodiment, and a detailed description of these components is omitted here.

The propulsion system 700 includes a first propulsor 738a, a second propulsor 738b, and an electric power supply 715. The first propulsor 738a includes a plurality of first propulsor blades 740a and a first propulsor shaft 745a that is drivingly coupled to a first electric machine 770a. In particular, the first electric machine 770a includes a first electric machine shaft 771a, and the first propulsor shaft 745a is drivingly coupled to the first electric machine shaft 771a. The first propulsor 738a also includes a first gearbox assembly 746a, and the first propulsor shaft 745a is drivingly coupled to the first electric machine shaft 771a through the first gearbox assembly 746a. The first gearbox assembly 746a includes a first gearbox lubrication system 802a that is a self-contained lubrication system similar to the gearbox lubrication system 602 of FIGS. 5 and 6. In some embodiments, the first electric machine 770a includes an electric machine lubrication system, such as the electric machine lubrication system 1200, detailed below with respect to FIGS. 9 and 10.

The second propulsor 738b includes a plurality of second propulsor blades 740b and a second propulsor shaft 745b that is drivingly coupled to a second electric machine 770b. In particular, the second electric machine 770b includes a second electric machine shaft 771b, and the second propulsor shaft 745b is drivingly coupled to the second electric machine shaft 771b. The second propulsor 738b also includes a second gearbox assembly 746b, and the second propulsor shaft 745b is drivingly coupled to the second electric machine shaft 771b through the second gearbox assembly 746b. The second gearbox assembly 746b includes a second gearbox lubrication system 802b that is a self-contained lubrication system similar to the gearbox lubrication system 602 of FIGS. 5 and 6. In some embodiments, the second electric machine 770b includes an electric machine lubrication system, such as the electric machine lubrication system 1200, detailed below with respect to FIGS. 9 and 10.

The electric power supply 715 includes a turbo-engine 716. The turbo-engine 716 includes a third electric machine 770c that is drivingly coupled to the LP shaft 36. In this way, the turbo-engine 716 supplies mechanical power to the third electric machine 770c, and the third electric machine 770c converts the mechanical power into electric power. The electric power supply 715 is in electrical communication with the first electric machine 770a via a first electric conduit 775a, and with the second electric machine 770b via a second electric conduit 775b. In this way, the electric power supply 715 supplies electric power to the first electric machine 770a and to the second electric machine 770b for powering the first propulsor 738a and the second propulsor 738b, respectively. In particular, the first electric machine 770a and the second electric machine 770b are in electrical communication with the third electric machine 770c, and the third electric machine 770c supplies the electric power to the first electric machine 770a and to the second electric machine 770b. In some embodiments, the electric power supply 715 includes a fuel cell, a battery, or an APU of the aircraft. In this way, the electric power supply 715 includes at least one of the turbo-engine 716, a fuel cell, a battery, or an APU.

Figure 8:
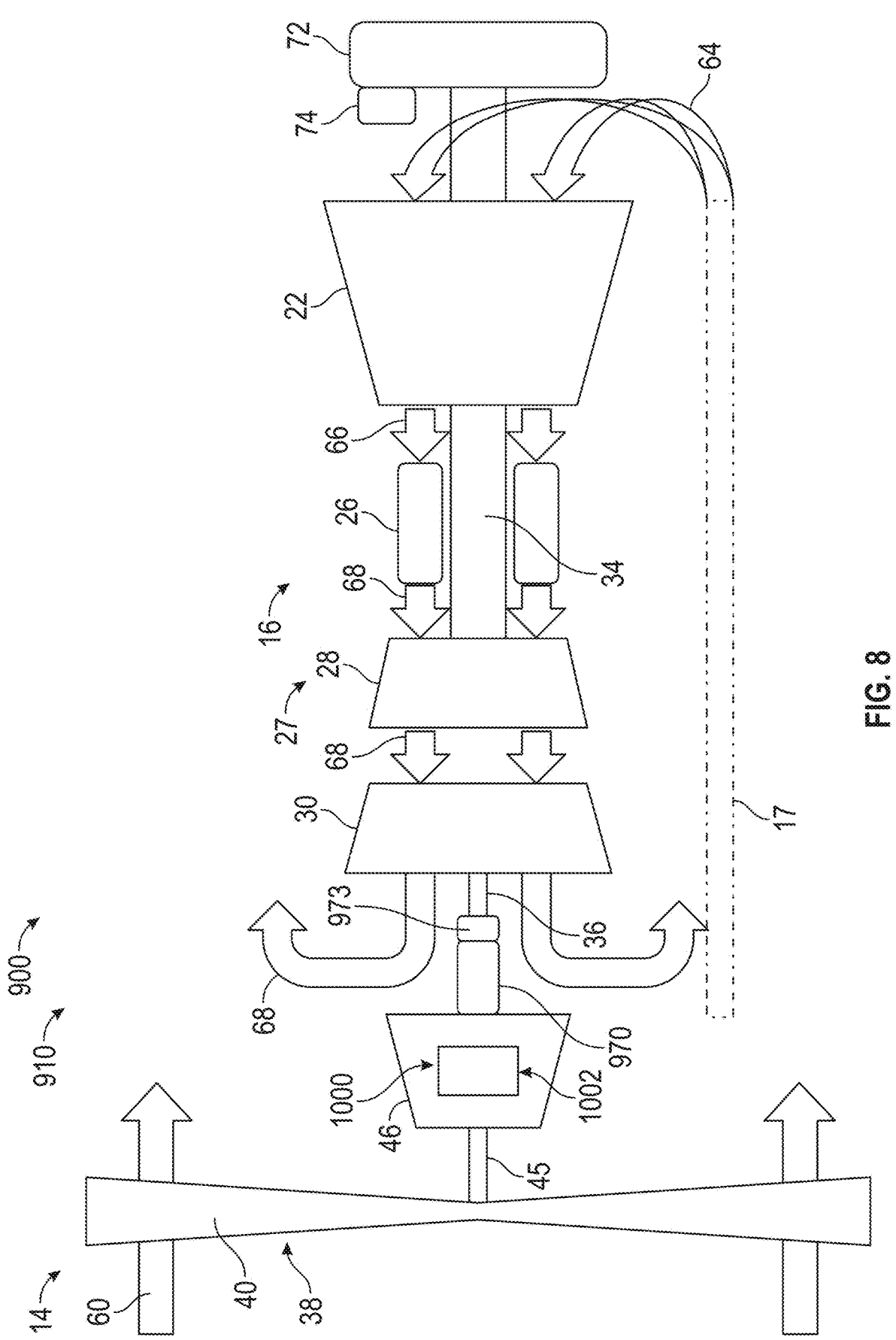
FIG. 8 is a schematic view of a propulsion system, according to another embodiment.

FIG. 8 is a schematic view of a propulsion system 900, according to another embodiment. The propulsion system 900 includes a turbine engine 910 including a lubrication system 1000 having a gearbox lubrication system 1002. The turbine engine 910 includes an electric machine 970 drivingly coupled to the LP shaft 36. The electric machine 970 is positioned forward of the turbine section 27, and, particularly, is positioned forward of the LP turbine 30. In this way, the electric machine 970 is positioned axially between the gearbox assembly 46 and the turbine section 27. The turbine engine 910 also includes a clutch 973 that engages the electric machine 970 to the LP shaft 36 and disengages the electric machine 970 from the LP shaft 36. In particular, the clutch 973 engages the electric machine 970 to the LP shaft 36 when the electric machine 970 operates in an electric generator mode to generate electric power. The clutch 973 disengages the electric machine 970 from the LP shaft 36 when the electric machine 970 operates in an electric motor mode to supply the electric power to the propulsor 38 (e.g., through the gearbox assembly 46).

Figure 9:
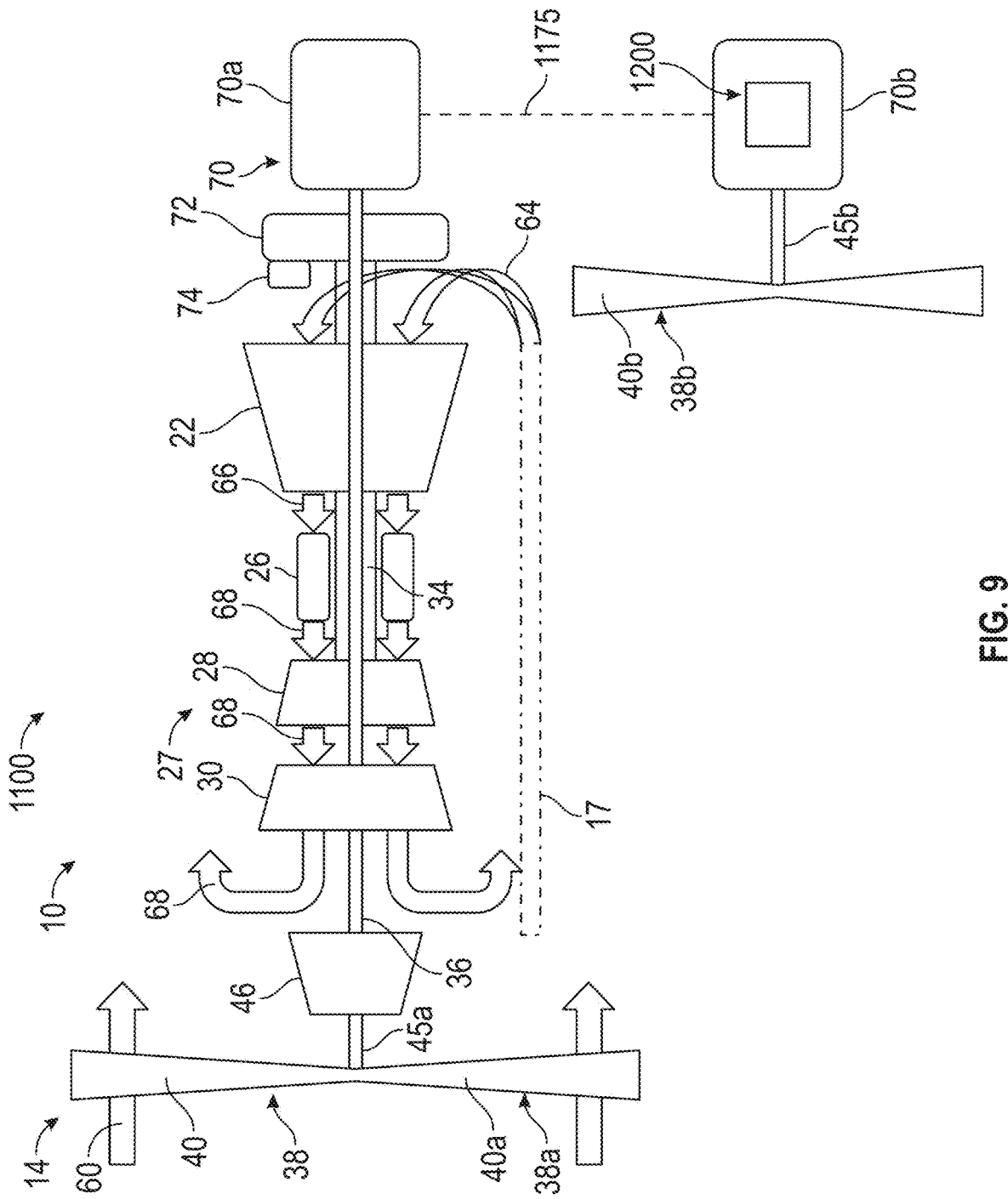
FIG. 9 is a schematic view of a propulsion system, according to another embodiment.

FIG. 9 is a schematic view of a propulsion system 1100, according to another embodiment. The propulsion system 1100 includes the turbine engine 10, the first propulsor 38a, and the second propulsor 38b. The propulsion system 1100 includes an electric machine lubrication system 1200 for the second electric machine 70b. The electric machine lubrication system 1200 is entirely contained within the second electric machine 70b, as detailed further below. In some embodiments, the propulsion system 1100 includes a fluid conduit 1175 that fluidly couples the second electric machine 70b with the first electric machine 70a. In such embodiments, the electric machine lubrication system 1200 supplies the lubricant from the second electric machine 70b to the first electric machine 70a via the fluid conduit 1175. In some embodiments, the second electric machine 70b receives the lubricant from the first electric machine 70a. In some embodiments, the first electric machine 70a includes the electric machine lubrication system 1200.

Figure 10:
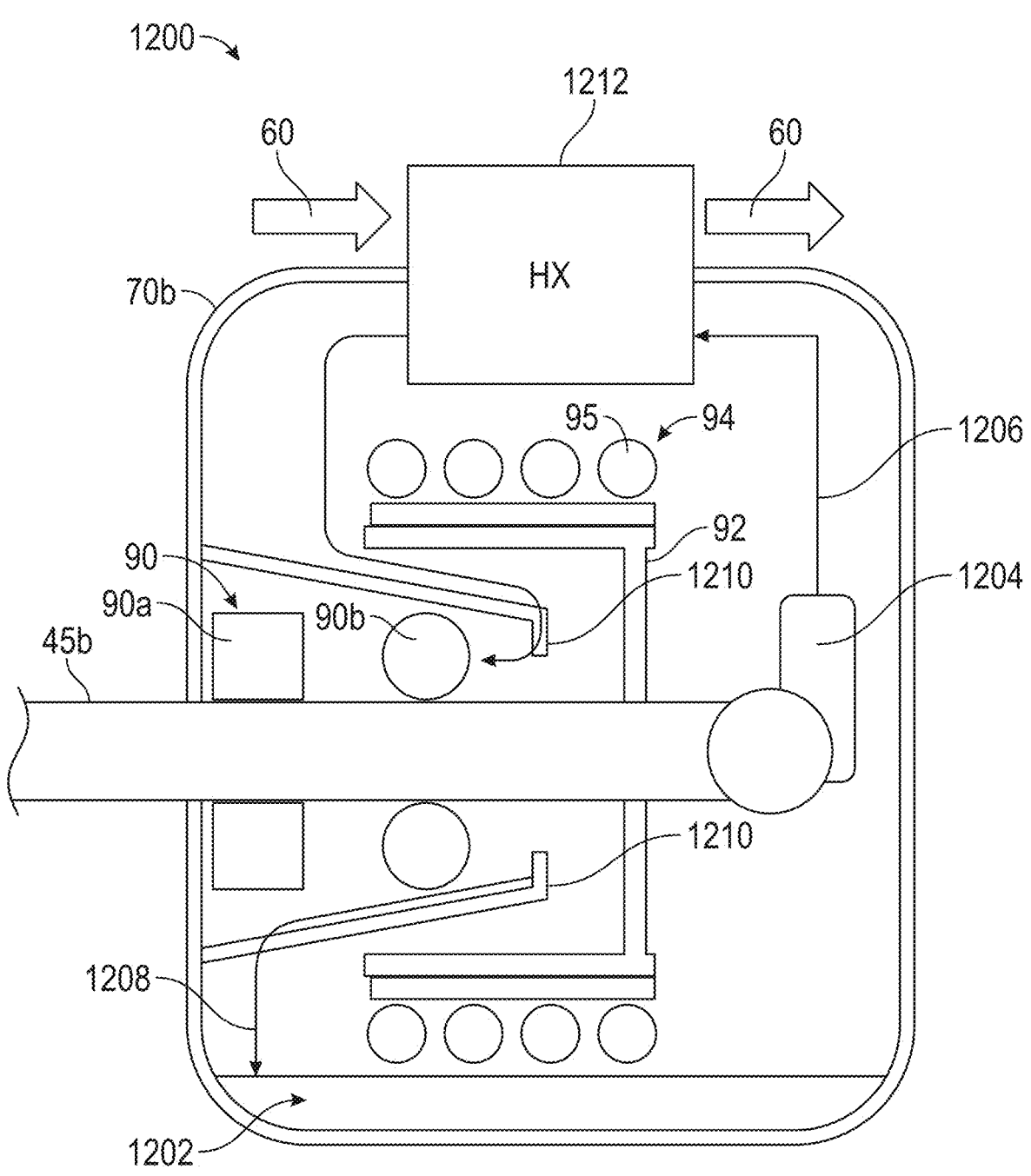
FIG. 10 is an enlarged schematic internal view of an electric machine having an electric machine lubrication system, according to the present disclosure.

FIG. 10 is an enlarged schematic internal view of the second electric machine 70b having the electric machine lubrication system 1200, according to the present disclosure. As shown in FIG. 10, the second electric machine 70b includes one or more electric machine bearings 90 that support rotation of the second propulsor shaft 45b. The one or more electric machine bearings 90 include one or more first electric machine bearings 90a and one or more second electric machine bearings 90b. The second electric machine 70b includes a rotor 92 and a stator 94. The rotor 92 is coupled to the second propulsor shaft 45b and rotates with rotation of the second propulsor shaft 45b. In this way, the rotor 92 rotates with respect to the stator 94, generating electrical power. The stator 94 includes one or more electrical coils 95. When the second electric machine 70b operates as an electric generator, the second electric machine 70b generates electric power due to a movement of the rotor 92 relative to the stator 94 (e.g., the electric coils 95) in a first direction. When the second electric machine 70b operates as a motor, the second electric machine 70b applies a torque on the second propulsor shaft 45*b* due to the movement of the rotor 92 relative to the stator 94 in a second direction that is opposite the first direction.

The electric machine lubrication system 1200 includes a lubricant reservoir 1202, an electric machine pump 1204, a lubricant supply line 1206, a lubricant return line 1208, one or more lubricant injectors 1210, and a heat exchanger 1212. The lubricant reservoir 1202 stores the lubricant therein. In some embodiments, the lubricant reservoir 1202 is a sump within the second electric machine 70*b*. The electric machine pump 1204 is drivingly coupled to the second propulsor shaft 45*b*. The lubricant supply line 1206 is in fluid communication with the electric machine pump 1204 and the one or more lubricant injectors 1210. The heat exchanger 1212 is in fluid communication with the lubricant supply line 1206 for cooling the lubricant in the lubricant supply line 1206. The lubricant return line 1208 is in fluid communication with the one or more electric machine bearings 90 and the lubricant reservoir 1202 for returning the lubricant from the electric machine bearings 90 to the lubricant reservoir 1202.

In operation, the electric machine pump 1204 pumps the lubricant from the lubricant reservoir 1202 to the one or more electric machine bearings 90 through the lubricant supply line 1206. In particular, the one or more lubricant injectors 1210 inject the lubricant from the lubricant supply line 1206 to the one or more electric machine bearings 90. The heat exchanger 1212 cools the lubricant in the lubricant supply line 1206 as the lubricant flows through the heat exchanger 1212. In particular, the volume of air 60 (e.g., cold air) flows through the heat exchanger and heat from the lubricant in the heat exchanger 1212 is transferred to the volume of air 60 as the lubricant flows through the heat exchanger 1212. The lubricant then drains through the lubricant return line 1208 into the lubricant reservoir 1202 such that the electric machine lubrication system 1200 recirculates the lubricant through the electric machine lubrication system 1200.

Figure 11:
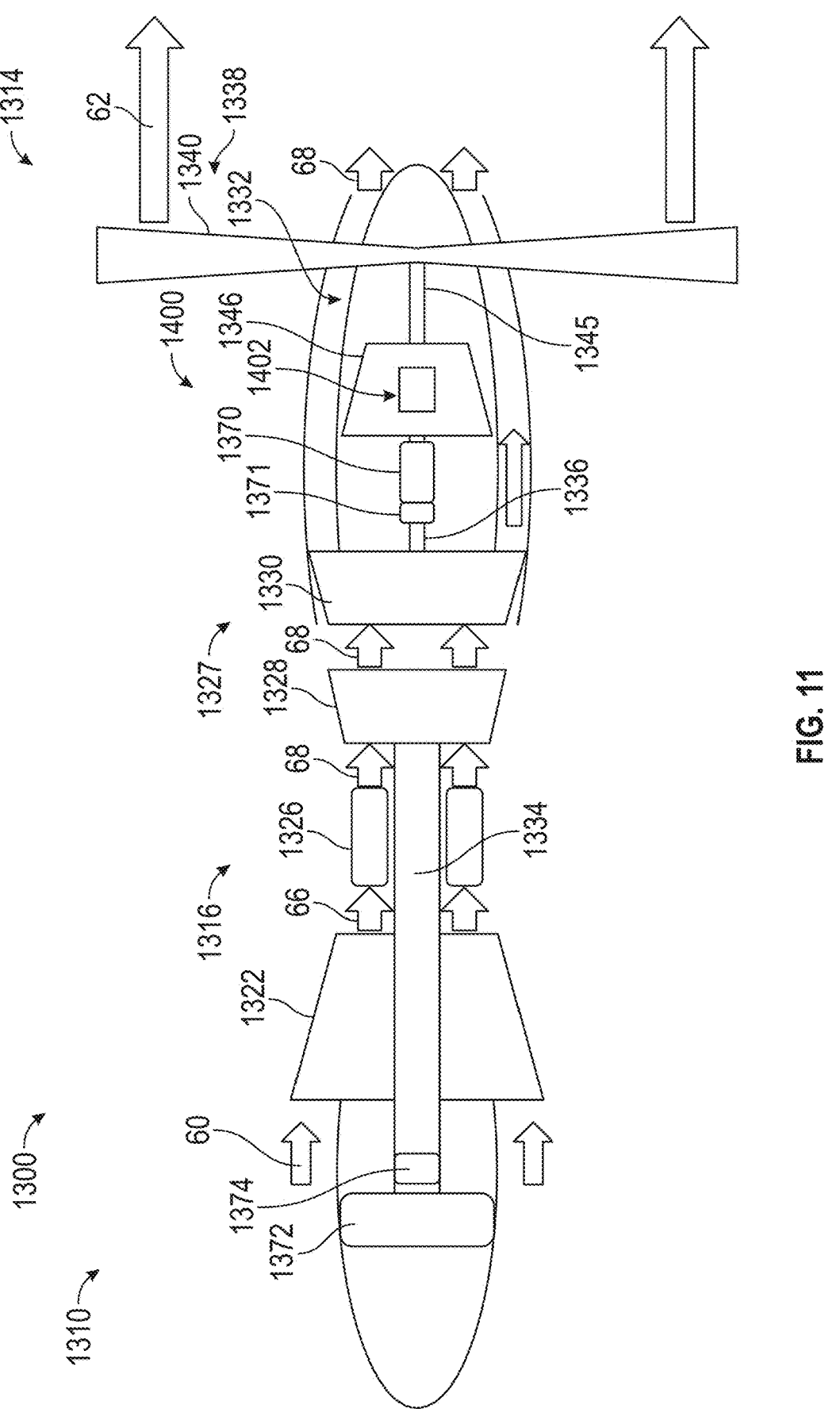
FIG. 11 is a schematic view of a propulsion system, according to another embodiment.

FIG. 11 is a schematic view of a propulsion system 1300, according to another embodiment. The propulsion system 1300 is substantially similar to the propulsion system 500 of FIG. 5. The same or similar reference numerals will be used for components of the propulsion system 1300 that are the same as or similar to the components of the propulsion system 500 discussed above, unless stated otherwise. The description of these components above also applies to this embodiment, and a detailed description of these components is omitted here.

The propulsion system 1300 includes a turbine engine 1310. The turbine engine 1310 is a turboprop engine in a pusher configuration. The turbine engine 1310 includes a propulsor section 1314, a turbo-engine 1316, and an exhaust section 1332. The turbo-engine 1316 includes a compressor 1322, a combustor 1326, and a turbine section 1327 having an HP turbine 1328 and an LP turbine 1330. The turbine engine 1310 also includes an HP shaft 1334 and an LP shaft 1336. The propulsor section 1314 is arranged aft of the turbo-engine 1316 in the pusher configuration. The propulsor section 1314 includes a propulsor 1338 having a plurality of propulsor blades 1340 coupled to a propulsor shaft 1345. The propulsor shaft 1345 is drivingly coupled to the LP shaft 1336 through a gearbox assembly 1346. The turbine engine 1310 includes a lubrication system 1400. The gearbox assembly 1346 includes a gearbox lubrication system 1402.

The turbine engine 1310 also includes an electric machine 1370 that is drivingly coupled to the LP shaft 1336 through a clutch 1371. The turbine engine 1310 further includes an accessory gearbox 1372 and a starter motor 1374. The turbine engine 1310 operates substantially similar to the turbine engine 10. The combustion gases 68 flow through the exhaust section 1332 under the propulsor 1338.

Figure 12:
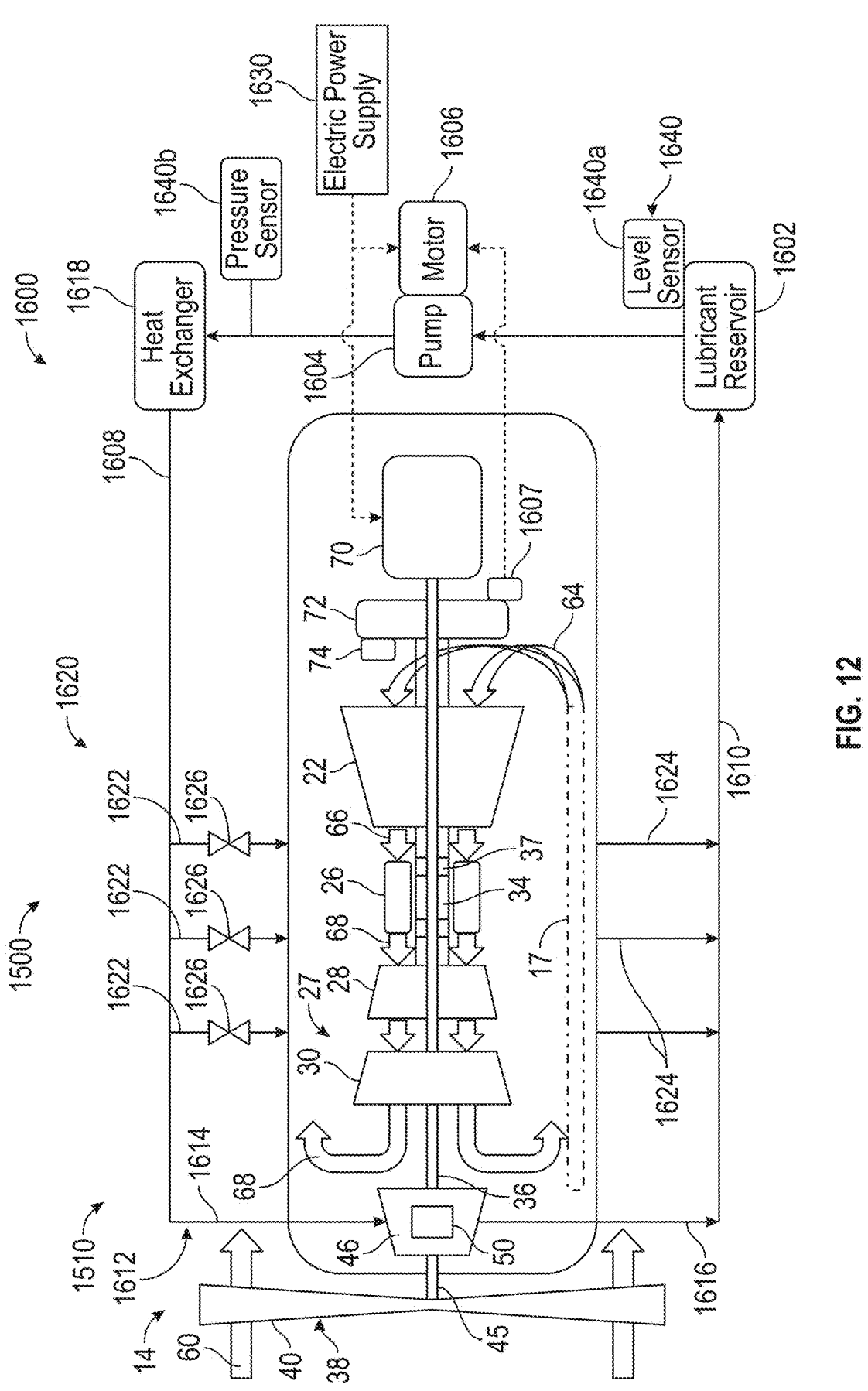
FIG. 12 is a schematic view of a propulsion system, according to another embodiment.

FIG. 12 is a schematic view of a propulsion system 1500, according to another embodiment. The propulsion system 1500 includes a turbine engine 1510 and a lubrication system 1600 for the turbine engine 1510. The lubrication system 1600 includes a lubricant reservoir 1602, a pump 1604 powered by a motor 1606, a lubricant supply line 1608, and a lubricant return line 1610. The lubricant reservoir 1602 includes at least one of a sump or a tank, and stores the lubricant therein. The lubricant supply line 1608 is in fluid communication with the lubricant reservoir 1602, the gearbox assembly 46, and the one or more engine bearings 37 for supplying the lubricant from the lubricant reservoir 1602 to at least one of the gearbox assembly 46 or the one or more engine bearings 37. The pump 1604 is in fluid communication with the lubricant reservoir 1602 and the lubricant supply line 1608 to pump. The lubrication system 1600 also includes a heat exchanger 1618 in fluid communication with the lubricant supply line 1608. The heat exchanger 1618 cools the lubricant as the lubricant flows through the lubricant supply line 1608 before being supplied to the gearbox assembly 46 or the turbine engine 10.

The lubrication system 1600 includes a gearbox lubrication system 1612 and an engine lubrication system 1620. The gearbox lubrication system 1612 includes a gearbox lubricant supply line 1614 and a gearbox lubricant return line 1616. The engine lubrication system 1620 includes one or more engine lubricant supply lines 1622 and one or more engine lubricant return lines 1624. The one or more engine lubricant supply lines 1622 each includes a valve 1626 that open to allow the lubricant to flow through the engine lubricant supply lines 1622 and close to prevent the lubricant from flowing through the engine lubricant supply lines 1622.

The pump 1604 is in fluid communication with the lubricant supply line 1608 to pump the lubricant from the lubricant reservoir 1602 to the at least one of the gearbox assembly 46 or the engine bearings 37 through the lubricant supply line 1608. The pump 1604 is drivingly coupled to the motor 1606. The motor 1606 is an electric motor that converts electric power into mechanical power through a motor shaft for powering the pump 1604. In some embodiments, the motor 1606 is drivingly coupled to accessory gearbox assembly 72 (e.g., through a motor gear assembly 1607) for generating electric power. In some embodiments, the motor 1606 receives electric power from an electric power supply 1630. The electric power supply 1630 includes at least one of the aircraft (e.g., batteries, APU, fuel cell, etc.) or a second turbine engine (e.g., the second turbine engine 10*b* of FIG. 4). Thus, the motor 1606 receives electric power from at least one of the turbine engine 1510 (e.g., through the accessory gearbox assembly 72), the aircraft, or the second turbine engine 10*b*. In this way, the lubrication system 1600 is an electrically-driven lubrication system. The lubrication system 1600 also includes one or more lubricant sensors 1640 including a lubricant level sensor 1640*a* and a lubricant pressure sensor 1640*b*. The lubricant sensors 1640 can also include a lubricant temperature sensor for sensing a temperature of the lubricant, and a lubricant flow sensor for sensing a flow rate of the lubricant.

In operation, the lubrication system 1600 supplies the lubricant to the gearbox assembly 46 to lubricate the gear assembly 50. In particular, the pump 1604 pumps the lubricant from the lubricant reservoir 1602 to the gearbox assembly 46 through the lubricant supply line 1608 and through the gearbox lubricant supply line 1614. The heat exchanger 1618 cools the lubricant in the lubricant supply line 1608 as the lubricant flows through the lubricant supply line 1608 and to the gearbox assembly 46. After lubricating the gear assembly 50, the lubricant drains into the lubricant reservoir 1602 (e.g., the sump) through the lubricant return line 1610 and the gearbox lubricant return line 1616. The lubricant is then re-circulated through the lubrication system 1600. As discussed above, the pump 1604 is electrically driven by the motor 1606. In this way, the lubrication system 1600 can operate to lubricate the gear assembly 50 even if the turbo-engine 16 shuts down or is operating in the standby operating mode and the propulsor 38 is electrically driven (e.g., by the electric machine 70 or by the second electric machine 70b of FIG. 4).

The lubrication system 1600 can also supply the lubricant to the engine bearings 37 through the engine lubricant supply lines 1622. In particular, the lubrication system 1600 supplies the lubricant to the engine bearings 37 when the turbine engine 1510 is shut down or in the standby operating mode. The valve 1626 of each engine lubricant supply line 1622 opens to allow the lubricant to flow to the engine bearings 37 through the engine lubricant supply lines 1622. After lubricating the engine bearings 37, the engine lubricant return line 1624 directs the lubricant to the lubricant reservoir 1602 through the lubricant return line 1610. In this way, the lubrication system 1600 recirculates the lubricant through the lubrication system 1600. The valve 1626 of each engine lubricant supply line 1622 opens and closes based on a pressure of the lubricant in the engine lubrication system 1620. In some embodiments, a controller (the controller 202 of FIG. 2) controls the valve 1626 to open and to close the valve 1626.

Figure 13:
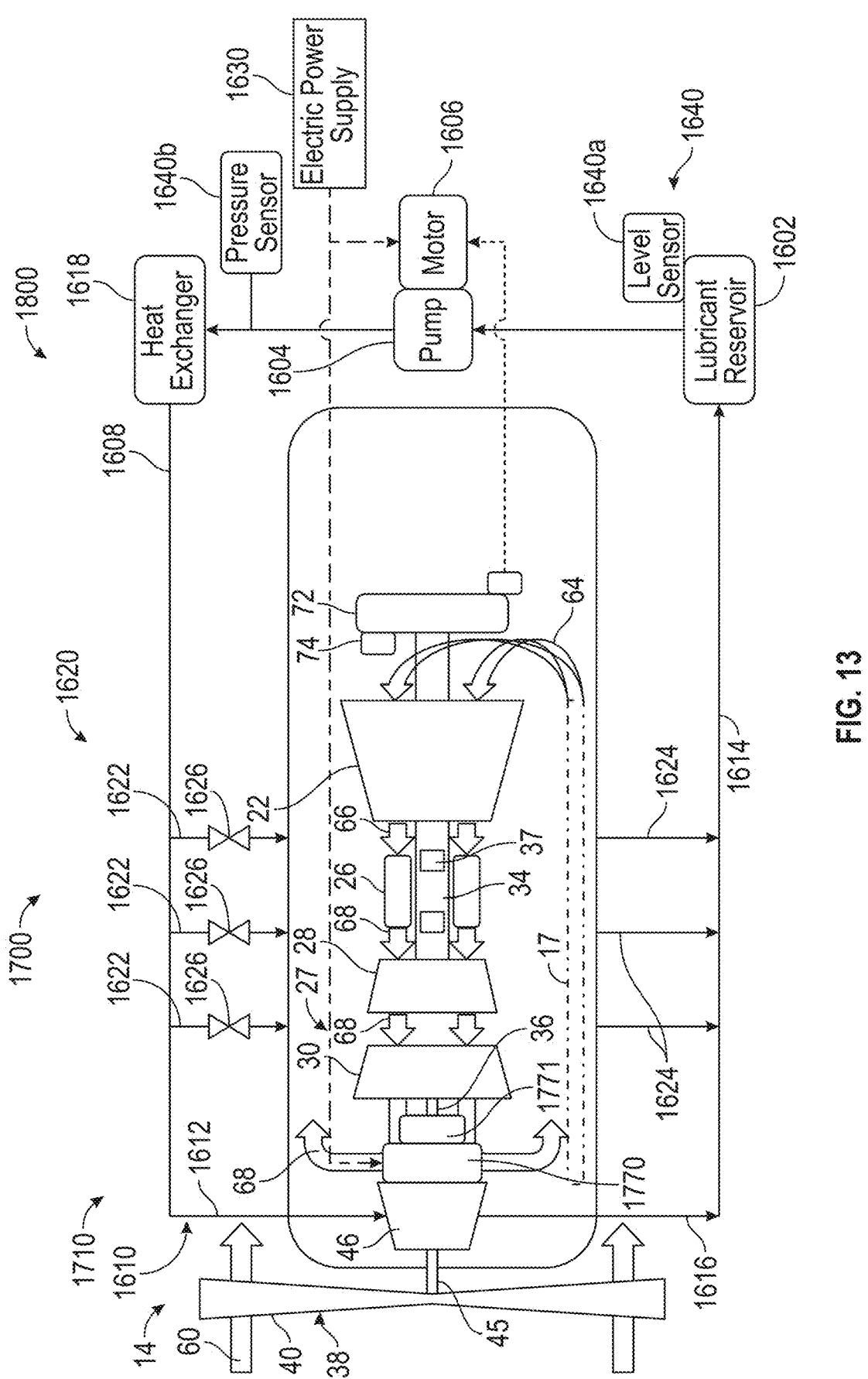
FIG. 13 is a schematic view of a propulsion system, according to another embodiment.

FIG. 13 is a schematic view of a propulsion system 1700, according to another embodiment. The propulsion system 1700 is substantially similar to the propulsion system 1500 of FIG. 12. The same or similar reference numerals will be used for components of the propulsion system 1700 that are the same as or similar to the components of the propulsion system 1500 discussed above, unless stated otherwise. The description of these components above also applies to this embodiment, and a detailed description of these components is omitted here.

The propulsion system 1700 includes a turbine engine 1710 that is substantially similar to the turbine engine 10 (FIG. 1). The turbine engine 1710 includes an electric machine 1770 that is drivingly coupled to the LP shaft 36 via a clutch 1771. The electric machine 1770 is positioned forward of the turbo-engine 16, and is between the gearbox assembly 46 and the turbine section 27 (e.g., the LP turbine 30). The propulsion system 1700 also includes a lubrication system 1800 that is substantially similar to the lubrication system 1600 of FIG. 12.

Figure 14:
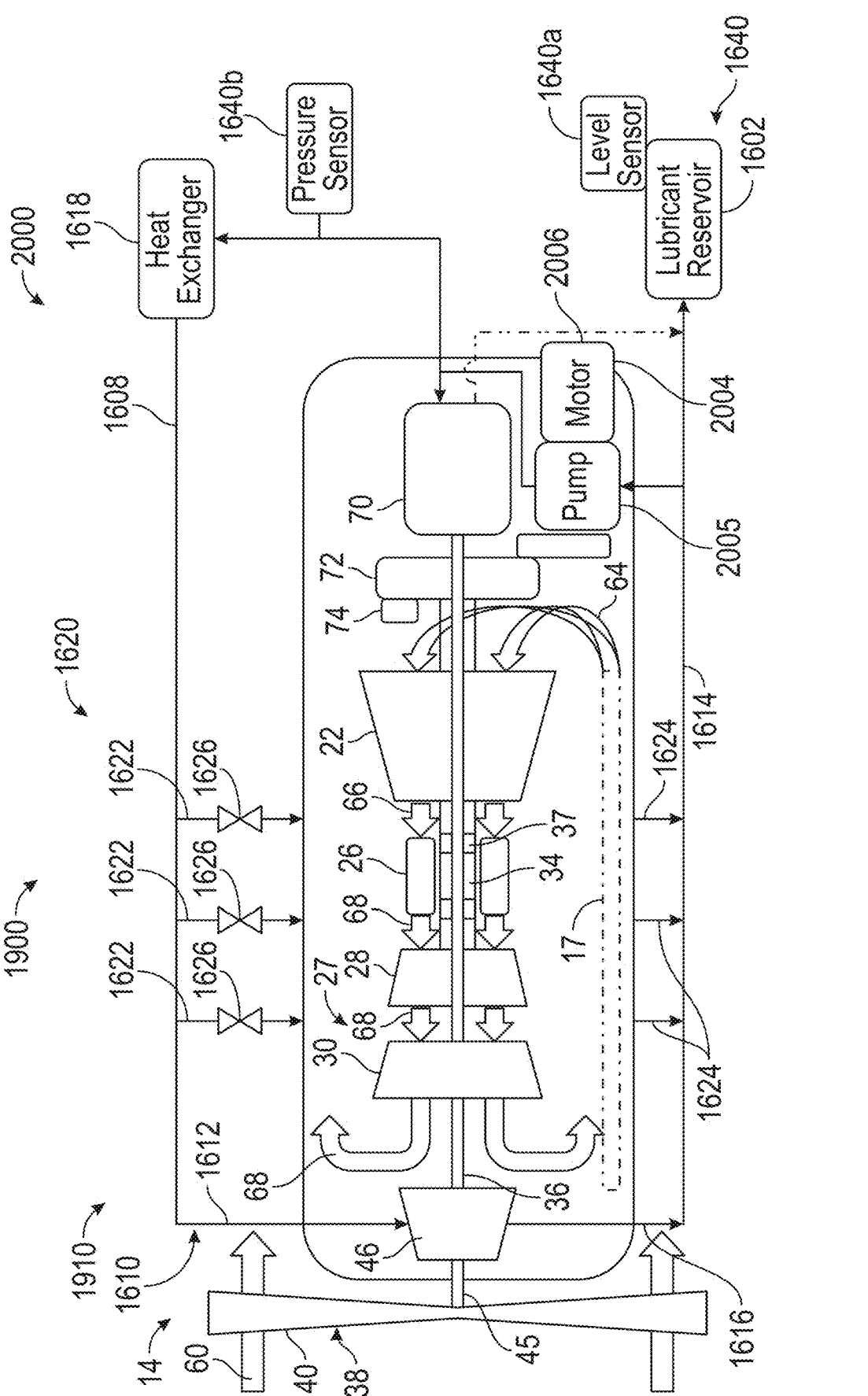
FIG. 14 is a schematic view of a propulsion system, according to another embodiment.

FIG. 14 is a schematic view of a propulsion system 1900, according to another embodiment. The propulsion system 1900 is substantially similar to the propulsion system 1500 of FIG. 12. The same or similar reference numerals will be used for components of the propulsion system 1900 that are the same as or similar to the components of the propulsion system 1500 discussed above, unless stated otherwise. The description of these components above also applies to this embodiment, and a detailed description of these components is omitted here.

The propulsion system 1900 includes a turbine engine 1910 that is substantially similar to the turbine engine 10 (FIG. 1). The propulsion system 1900 also includes a lubrication system 2000 that is substantially similar to the lubrication system 1600 of FIG. 12. The lubrication system 2000 includes a pump 2004 that is coupled to the accessory gearbox assembly 72 through a clutch 2005. The pump 2004 is powered by a motor 2006. The pump 2004 and the motor 2006 are disposed within the outer casing 18 (FIG. 1) of the turbine engine 1910. The clutch 2005 engages the pump 2004 to the accessory gearbox assembly 72 when the turbo-engine 16 is operating to reduce the electrical demand from the motor 2006 in powering the pump 2004. In this way, the turbo-engine 16 powers the pump 2004 while the turbo-engine 16 is operating. The clutch 2005 disengages the pump 2004 from the accessory gearbox assembly 72 when the turbo-engine 16 is shut down. In this way, the motor 2006 powers the pump 2004 when the turbo-engine 16 is shut down, and the propulsor 38 is powered by the electric machine 70.

Figure 15:
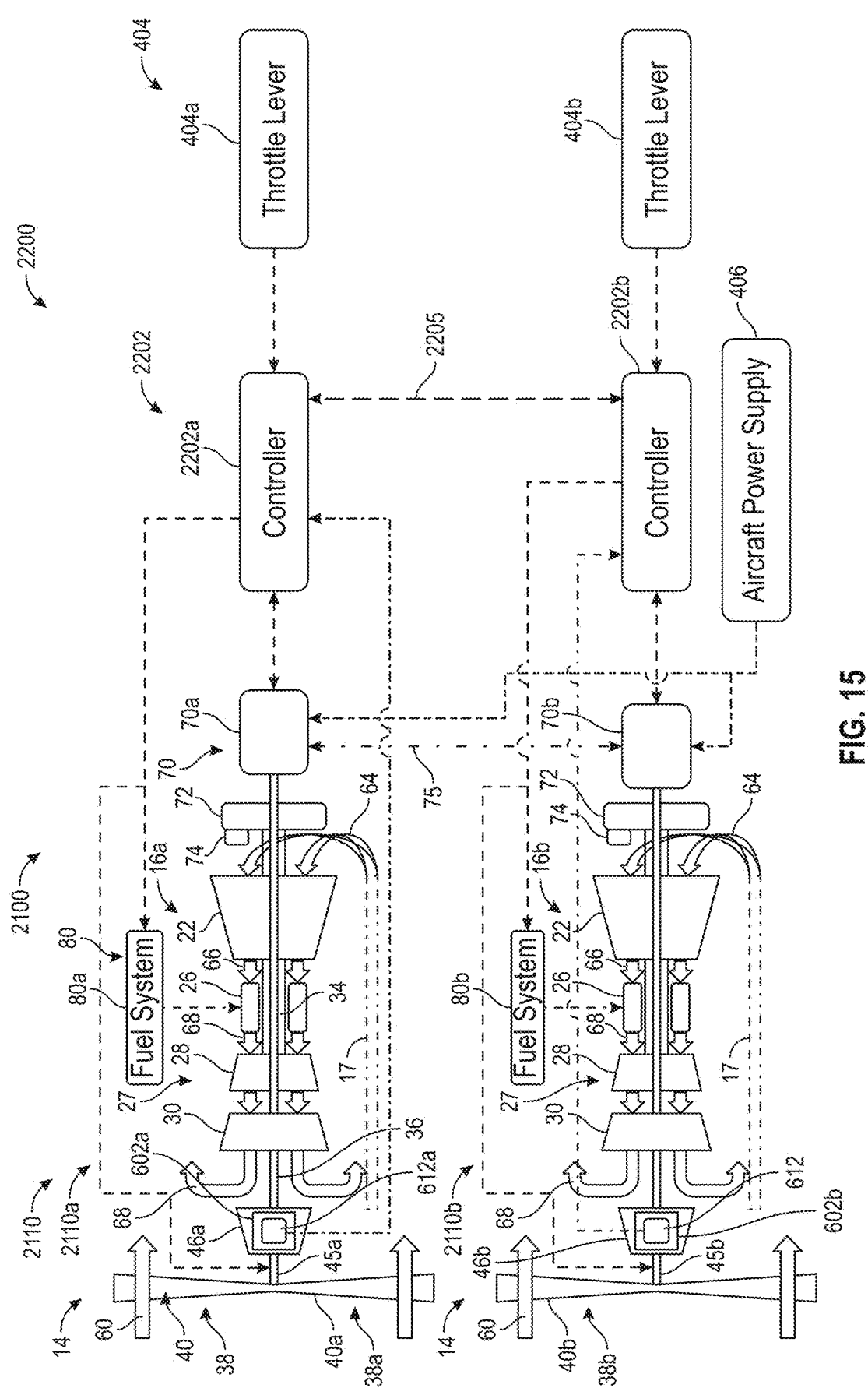
FIG. 15 is a schematic view of a propulsion system, according to another embodiment.

FIG. 15 is a schematic view of a propulsion system 2100, according to another embodiment. The propulsion system 2100 is substantially similar to the propulsion system 300 of FIG. 4. The same or similar reference numerals will be used for components of the propulsion system 2100 that are the same as or similar to the components of the propulsion system 300 discussed above, unless stated otherwise. The description of these components above also applies to this embodiment, and a detailed description of these components is omitted here.

The propulsion system 2100 includes a plurality of turbine engines 2110 including a first turbine engine 2110a and a second turbine engine 2110b. The first turbine engine 2110a includes a first gearbox assembly 46a including first gearbox lubrication system 602a having one or more lubricant sensors 612. The second turbine engine 2110b includes a second gearbox assembly 46b including second gearbox lubrication system 602b having one or more lubricant sensors 612.

The propulsion system 2100 includes a turbine engine control system 2200 that is substantially similar to the turbine engine control system 400 of FIG. 4. The turbine engine control system 2200 includes one or more controllers 2202 and includes a first controller 2202a for the first turbine engine 2110a and a second controller 2202b for the second turbine engine 2110b. The first controller 2202a is in communication with the second controller 2202b via a data communication bus 2205.

The first controller 2202a is in communication with the lubricant sensors 612 of the first gearbox lubrication system 602a. In particular, the first controller 2202a is a dual channel controller and the lubricant sensors 612 of the first gearbox lubrication system 602a include two communication outputs. Each communication output of the lubricant sensors 612 of the first gearbox lubrication system 602a is in communication with a respective channel of the first controller 2202a. In this way, the lubricant sensors 612 are dual redundant sensors (e.g., sensors having two channels to the first controller 2202a).

Similarly, the second controller 2202b is in communication with the lubricant sensors 612 of the second gearbox lubrication system 602b. In particular, the second controller 2202b is a dual channel controller and the lubricant sensors 612 of the second gearbox lubrication system 602b include two communication outputs. Each communication output of the lubricant sensors 612 of the second gearbox lubrication system 602b is in communication with a respective channel of the second controller 2202b. In this way, the lubricant sensors 612 are dual redundant sensors (e.g., sensors having two channels to the second controller 2202b). Each lubricant sensor 612 includes discrete outputs that are electrically isolated from each other such that no single failure can occur in a loss of thrust control.

Figure 16:
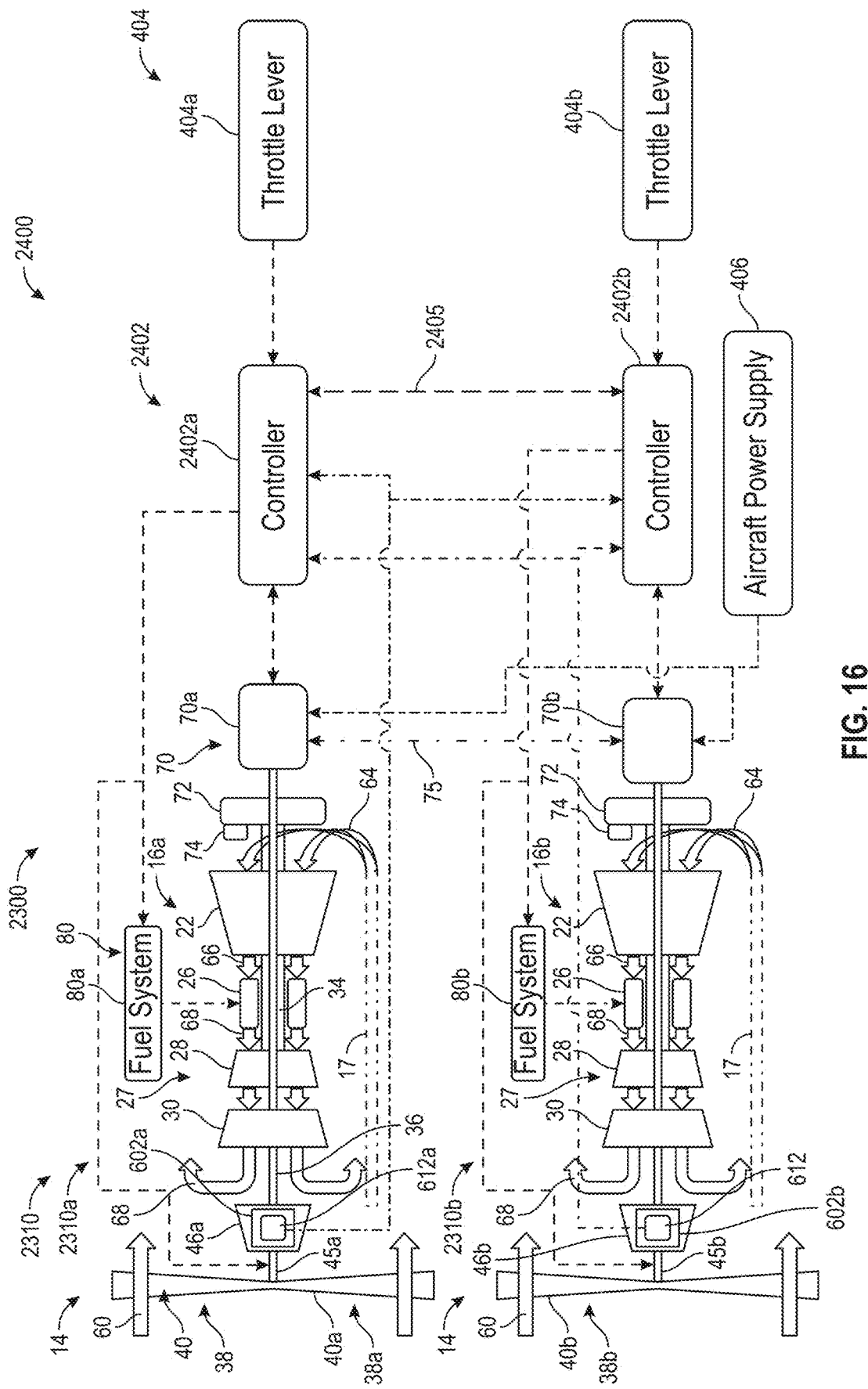
FIG. 16 is a schematic view of a propulsion system, according to another embodiment.

FIG. 16 is a schematic view of a propulsion system 2300, according to another embodiment. The propulsion system 2300 is substantially similar to the propulsion system 2100 of FIG. 15. The same or similar reference numerals will be used for components of the propulsion system 2300 that are the same as or similar to the components of the propulsion system 2100 discussed above, unless stated otherwise. The description of these components above also applies to this embodiment, and a detailed description of these components is omitted here.

The propulsion system 2300 includes a plurality of turbine engines 2310 including a first turbine engine 2310a and a second turbine engine 2310b. The first turbine engine 2310a includes a first gearbox assembly 46a including first gearbox lubrication system 602a having one or more lubricant sensors 612. The second turbine engine 2310b includes a second gearbox assembly 46b including second gearbox lubrication system 602b having one or more lubricant sensors 612.

The propulsion system 2300 includes a turbine engine control system 2400 that is substantially similar to the turbine engine control system 2200 of FIG. 15. The turbine engine control system 2400 includes one or more controllers 2402 and includes a first controller 2402a for the first turbine engine 2310a and a second controller 2402b for the second turbine engine 2310b. The first controller 2402a is in communication with the second controller 2402b via a data communication bus 2405.

The first controller 2402a and the second controller 2402b are each dual channel controllers. The lubricant sensors 612 are quad redundant sensors (e.g., sensors having four channels) with individual outputs to the first controller 2402a and the second controller 2402b. In particular, the lubricant sensors 612 of the first gearbox lubrication system 602a are in communication with the first controller 2402a and the second controller 2402b. The lubricant sensors 612 of the second gearbox lubrication system 602b are in communication with the second controller 2402b and the first controller 2402a. Each lubricant sensor 612 includes discrete outputs that are electrically isolated from each other such that no single failure can occur in a loss of thrust control. In this way, the lubricant sensors 612 of the first gearbox lubrication system 602a include two channels to the first controller 2402a and two channels to the second controller 2402b. Similarly, the lubricant sensors 612 of the second gearbox lubrication system 602b include two channels to the second controller 2402b and two channels to the first controller 2402a. Accordingly, each lubricant sensor 612 is a quad redundant sensor having four channels.

Figure 17:
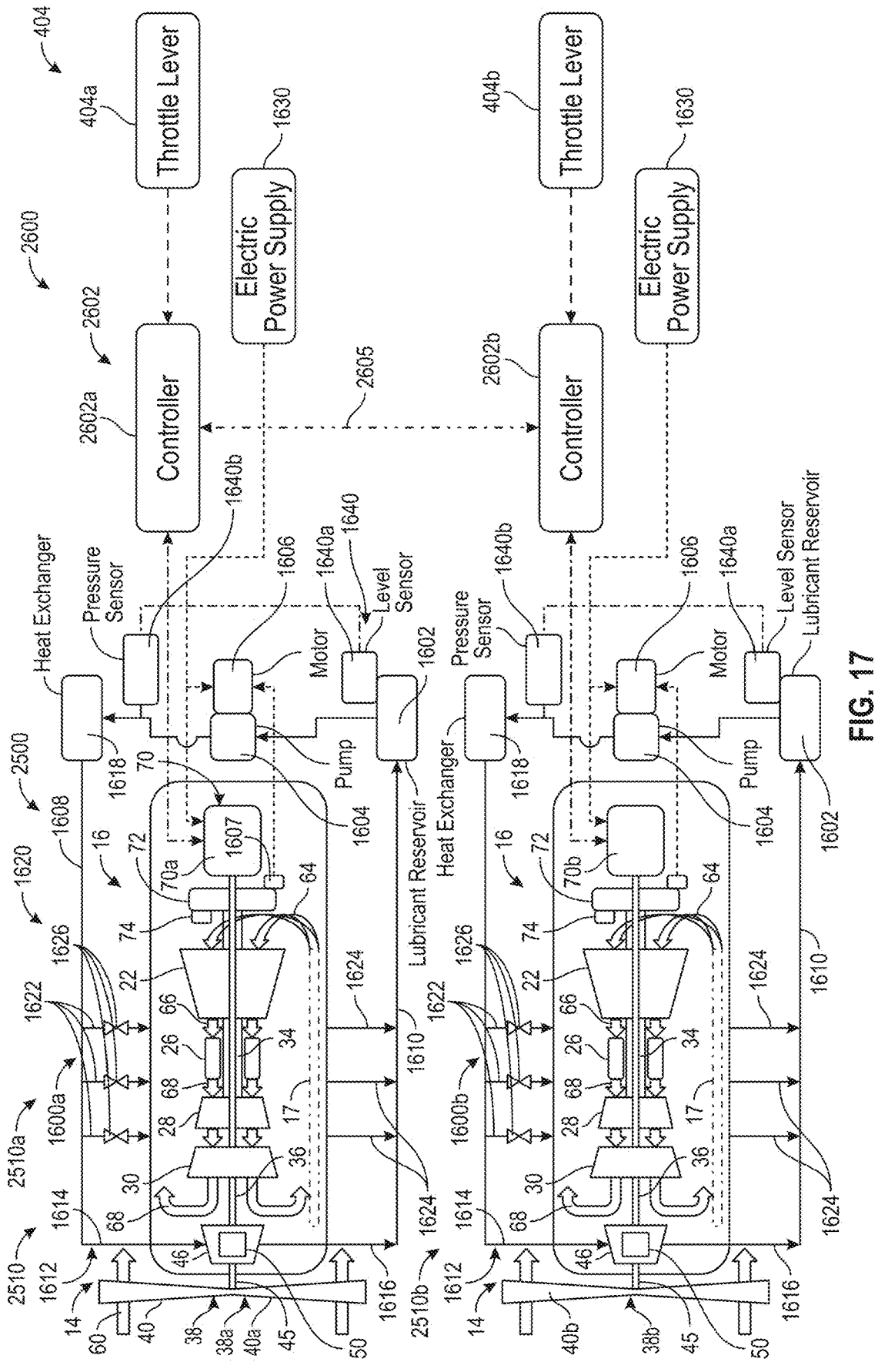
FIG. 17 is a schematic view of a propulsion system, according to another embodiment.

FIG. 17 is a schematic view of a propulsion system 2500, according to another embodiment. The propulsion system 2500 is substantially similar to the propulsion system 1500 of FIG. 12. The same or similar reference numerals will be used for components of the propulsion system 2500 that are the same as or similar to the components of the propulsion system 1500 discussed above, unless stated otherwise. The description of these components above also applies to this embodiment, and a detailed description of these components is omitted here.

The propulsion system 2500 includes a plurality of turbine engines 2510 including a first turbine engine 2510a and a second turbine engine 2510b. The first turbine engine 2510a includes a first lubrication system 1600a, and the second turbine engine 2510b includes a second lubrication system 1600b. The propulsion system 2500 also includes a turbine engine control system 2600 that is substantially similar to the turbine engine control system 2200 of FIG. 15. The turbine engine control system 2600 includes one or more controllers 2602 includes a first controller 2602a for the first turbine engine 2510a and a second controller 2602b for the second turbine engine 2510b. The first controller 2602a is in communication with the second controller 2602b via a data communication bus 2605.

The first controller 2602a and the second controller 2602b are each dual channel controllers. The lubricant sensors 1640 are dual redundant sensors (e.g., sensors having two channels) with individual outputs. In particular, the lubricant sensors 1640 of the first lubrication system 1600a are in communication with the first controller 2602a. The lubricant sensors 1640 of the second lubrication system 1600b are in communication with the second controller 2602b. Each lubricant sensor 1640 includes discrete outputs that are electrically isolated from each other such that no single failure can occur in a loss of thrust control. In this way, the lubricant sensors 1640 of the first lubrication system 1600a include two channels to the first controller 2602a. Similarly, the lubricant sensors 1640 of the second lubrication system 1600b include two channels to the second controller 2602b. Accordingly, each lubricant sensor 1640 is a dual redundant sensor having two channels.

Figure 18:
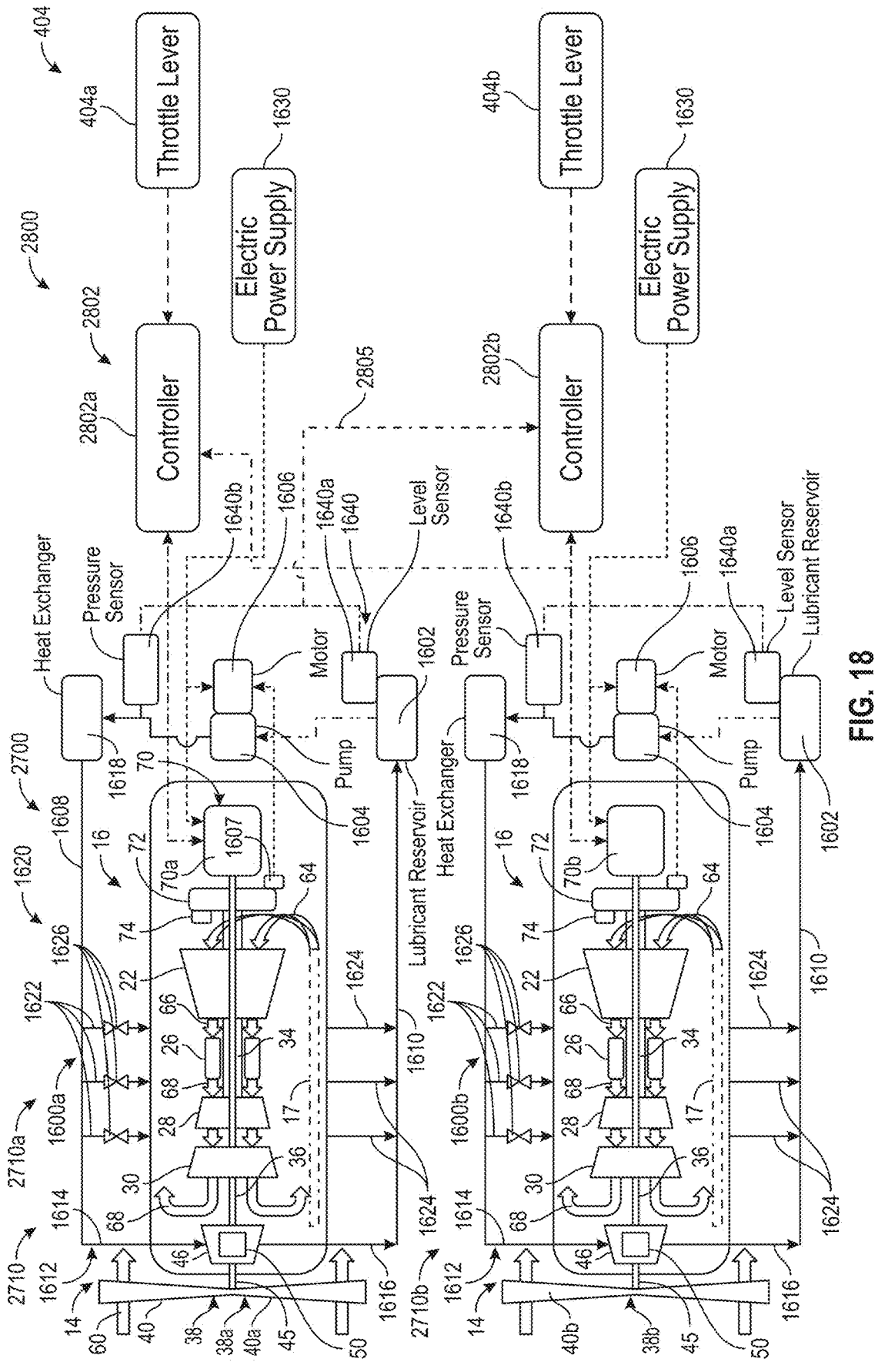
FIG. 18 is a schematic view of a propulsion system, according to another embodiment.

FIG. 18 is a schematic view of a propulsion system 2700, according to another embodiment. The propulsion system 2700 is substantially similar to the propulsion system 2500 of FIG. 17. The same or similar reference numerals will be used for components of the propulsion system 2700 that are the same as or similar to the components of the propulsion system 2500 discussed above, unless stated otherwise. The description of these components above also applies to this embodiment, and a detailed description of these components is omitted here.

The propulsion system 2700 includes a plurality of turbine engines 2710 including a first turbine engine 2710a and a second turbine engine 2710b. The first turbine engine 2710a includes a first lubrication system 1600a having one or more lubricant sensors 1640. The second turbine engine 2710b includes a second lubrication system 1600b having one or more lubricant sensors 1640.

The propulsion system 2700 includes a turbine engine control system 2800 that is substantially similar to the turbine engine control system 2400 of FIG. 16. The turbine engine control system 2800 includes one or more controllers 2802 and includes a first controller 2802a for the first turbine engine 2710a and a second controller 2802b for the second turbine engine 2710b. The first controller 2802a is in communication with the second controller 2802b via a data communication bus 2805.

The first controller 2802a and the second controller 2802b are each dual channel controllers. The lubricant sensors 1640 are quad redundant sensors (e.g., sensors having four channels) with individual outputs to the first controller 2802a and the second controller 2802b. In particular, the lubricant sensors 1640 of the first lubrication system 1600a are in communication with the first controller 2802a and the second controller 2802b. The lubricant sensors 1640 of the second lubrication system 1600b are in communication with the second controller 2802b and the first controller 2802a. Each lubricant sensor 1640 includes discrete outputs that are electrically isolated from each other such that no single failure can occur in a loss of thrust control. In this way, the lubricant sensors 1640 of the first lubrication system 1600a include two channels to the first controller 2802a and two channels to the second controller 2802*b*. Similarly, the lubricant sensors 1640 of the second lubrication system 1600*b* include two channels to the second controller 2802*b* and two channels to the first controller 2802*a*. Accordingly, each lubricant sensor 1640 is a quad redundant sensor having four channels.

Figure 19A:
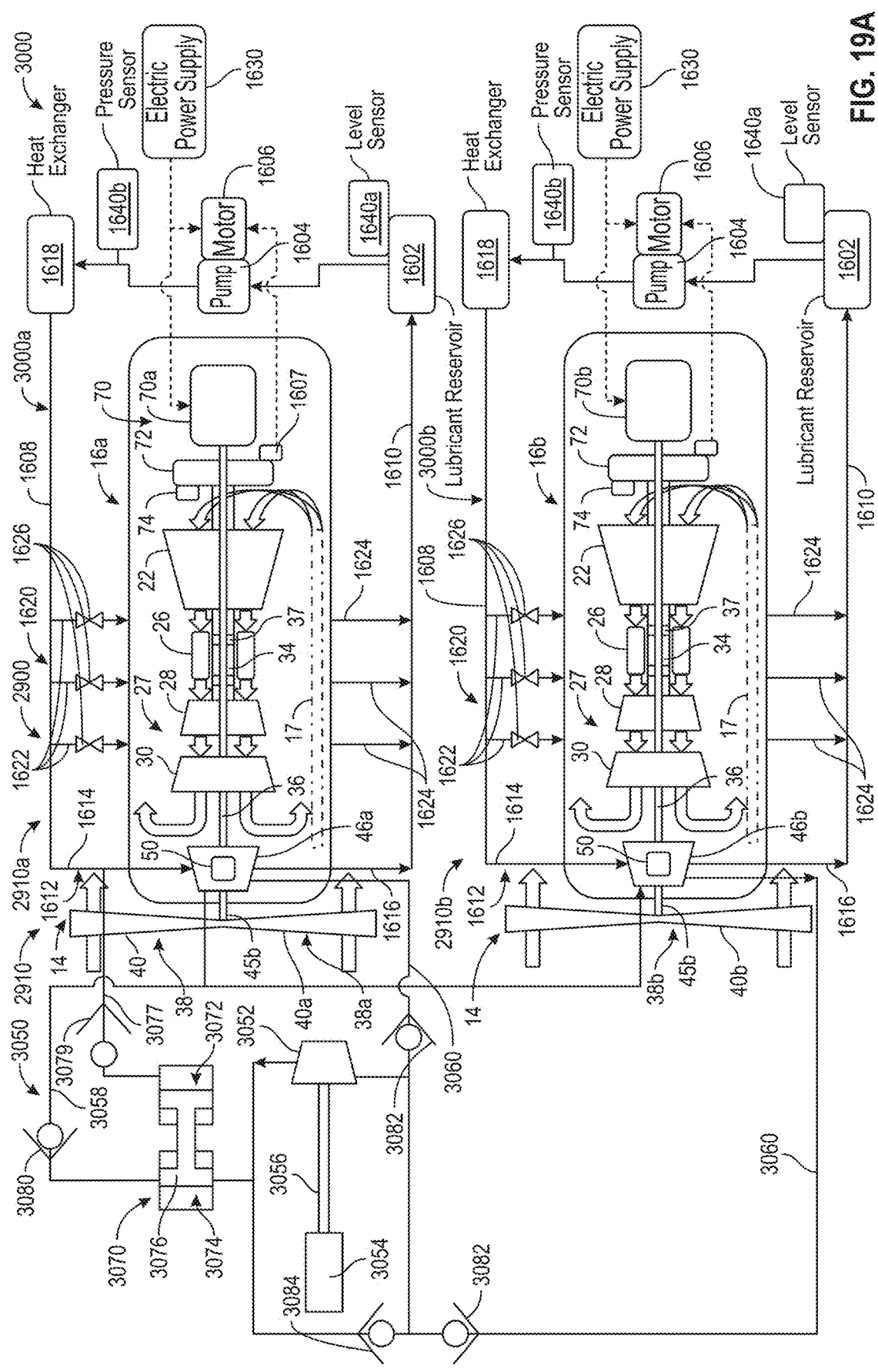
FIG. 19A is a schematic view of a propulsion system with a lubrication system in a normal operation mode, according to another embodiment.
Figure 19B:
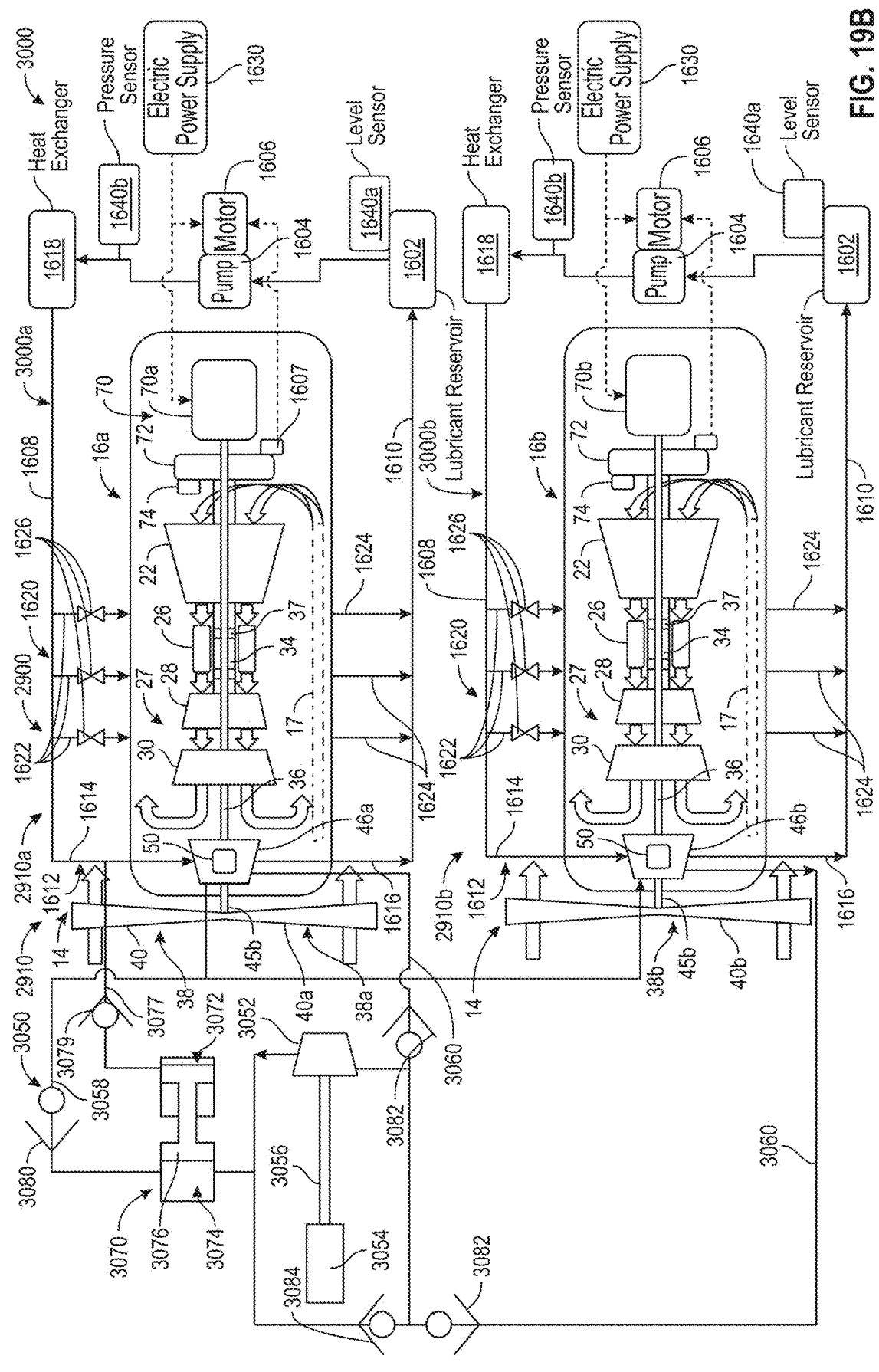
FIG. 19B is a schematic view of the propulsion system of FIG. 19A with the lubrication system in a failure operation mode, according to the present disclosure.

FIG. 19A is a schematic view of a propulsion system 2900 with a lubrication system 3000 in a normal operation mode, according to another embodiment. FIG. 19B is a schematic view of the propulsion system 2900 with the lubrication system 3000 in a failure operation mode, according to another embodiment. The propulsion system 2900 is substantially similar to the propulsion system 1500 of FIG. 12. The same or similar reference numerals will be used for components of the propulsion system 2900 that are the same as or similar to the components of the propulsion system 300 discussed above, unless stated otherwise. The description of these components above also applies to this embodiment, and a detailed description of these components is omitted here.

The propulsion system 2900 includes a plurality of turbine engines 2910 including a first turbine engine 2910*a* and a second turbine engine 2910*b*. The lubrication system 3000 includes a first lubrication system 3000*a*, a second lubrication system 3000*b*, and an auxiliary lubrication system 3050. The first lubrication system 3000*a* and the second lubrication system 3000*b* are substantially similar to the lubrication system 1600.

The auxiliary lubrication system 3050 includes an auxiliary pump 3052, an auxiliary motor 3054 that is drivingly coupled to the auxiliary pump 3052 by a pump shaft 3056, an auxiliary lubricant supply line 3058, and an auxiliary lubricant return line 3060. The auxiliary pump 3052 is in fluid communication with auxiliary lubricant supply line 3058 and the auxiliary lubricant return line 3060. The auxiliary lubricant supply line 3058 is in fluid communication with auxiliary pump 3052 and the first gearbox assembly 46*a* and the second gearbox assembly 46*b* for supplying the lubricant to the gear assembly 50 of the first gearbox assembly 46*a* and the second gearbox assembly 46*b*. The auxiliary lubricant return line 3060 is in fluid communication with the first gearbox assembly 46*a* and the second gearbox assembly 46*b*, and the auxiliary pump 3052 for returning the lubricant from the first gearbox assembly 46*a* and the second gearbox assembly 46*b* to the auxiliary pump 3052.

The auxiliary lubrication system 3050 includes an auxiliary lubricant valve 3070 in fluid communication with the auxiliary pump 3052 and the auxiliary lubricant supply line 3058. The auxiliary lubricant valve 3070 is a shuttle valve, but can include any type of valve for allowing the lubricant to flow, or preventing the lubricant from flowing, through the auxiliary lubricant supply line 3058 based on a pressure of the lubricant in the engine lubrication system 1620. The auxiliary lubricant valve 3070 includes a lubricant pressure flowpath 3072, an auxiliary lubricant flowpath 3074, and a valve element 3076. The lubricant pressure flowpath 3072 is in fluid communication with a lubricant pressure signal line 3077 of the engine lubrication system 1620 for sending a lubricant pressure signal to the auxiliary lubricant valve 3070. The auxiliary lubricant flowpath 3074 is in fluid communication with the auxiliary lubricant supply line 3058. The valve element 3076 is disposed within the lubricant pressure flowpath 3072 and the auxiliary lubricant flowpath 3074, and moves to allow or to block the lubricant in the lubricant pressure flowpath 3072 and the auxiliary lubricant flowpath 3074, as detailed further below.

The lubricant pressure signal line 3077 includes a lubricant pressure signal line check valve 3079 disposed therein. The auxiliary lubricant supply line 3058 includes a supply line check valve 3080 disposed therein. The auxiliary lubricant return line 3060 includes one or more return line check valves 3082 disposed therein. In particular, the auxiliary lubricant return line 3060 includes a return line check valve 3082 in fluid communication with the first lubrication system 3000*a*. The auxiliary lubricant return line 3060 includes a return line check valve 3082 in fluid communication with the second lubrication system 3000*b*. The lubrication system 3000 also includes a pump check valve 3084 in fluid communication with the auxiliary lubricant return line 3060 and the auxiliary pump 3052.

With reference to FIG. 19A, the lubrication system 3000 operates the same as the lubrication system 1600 of FIG. 12. During normal operation, the lubrication system 3000 supplies the lubricant to the gear assembly 50 or the engine bearings 37 of the first turbine engine 2910*a* and the second turbine engine 2910*b*. The lubricant pressure signal line 3077 communicates the pressure of the lubricant in the lubrication system 3000 to the auxiliary lubricant valve 3070. During the normal operation, the pressure of the lubricant in the lubrication system 3000 opens the lubricant pressure signal line check valve 3079 and forces the valve element 3076 to close the auxiliary lubricant flowpath 3074 to prevent the lubricant from flowing through the auxiliary lubrication system 3050 (e.g., through the auxiliary lubricant supply line 3058).

With reference to FIG. 19B, the auxiliary lubrication system 3050 supplies the lubricant to the lubrication system 3000 when the lubrication system 3000 fails or one of the plurality of turbine engines 2910 shuts down. In such instances, the pressure of the lubricant in the lubrication system 3000 reduces below a threshold such that the valve element 3076 overcomes the pressure in the lubricant pressure signal line 3077. In this way, the valve element 3076 moves to open the auxiliary lubricant flowpath 3074. The auxiliary motor 3054 powers the auxiliary pump 3052 to pump the lubricant through the auxiliary lubricant supply line 3058. Thus, the pressure of the lubricant in the auxiliary lubricant supply line 3058 opens the supply line check valve 3080 and the auxiliary lubrication system 3050 supplies the lubricant to at least one of the gear assembly 50 or the engine bearings 37 through the auxiliary lubricant supply line 3058. As the auxiliary pump 3052 continues to pump the lubricant, the lubricant drains from the at least one of the gear assembly 50 or the engine bearings 37 and flows through the auxiliary lubricant return line 3060. Thus, the pressure of the lubricant in the auxiliary lubricant return line 3060 opens the one or more return line check valves 3082 open to allow the lubricant to flow back to the inlet of the auxiliary pump 3052. The pressure of the lubricant from the auxiliary pump 3052 closes the pump check valve 3084 such that the lubricant flows through the auxiliary lubricant valve 3070 into the auxiliary lubricant supply line 3058 and the pump check valve 3084 prevents the lubricant from flowing from the auxiliary pump 3052 into the auxiliary lubricant return line 3060.

Figure 20:
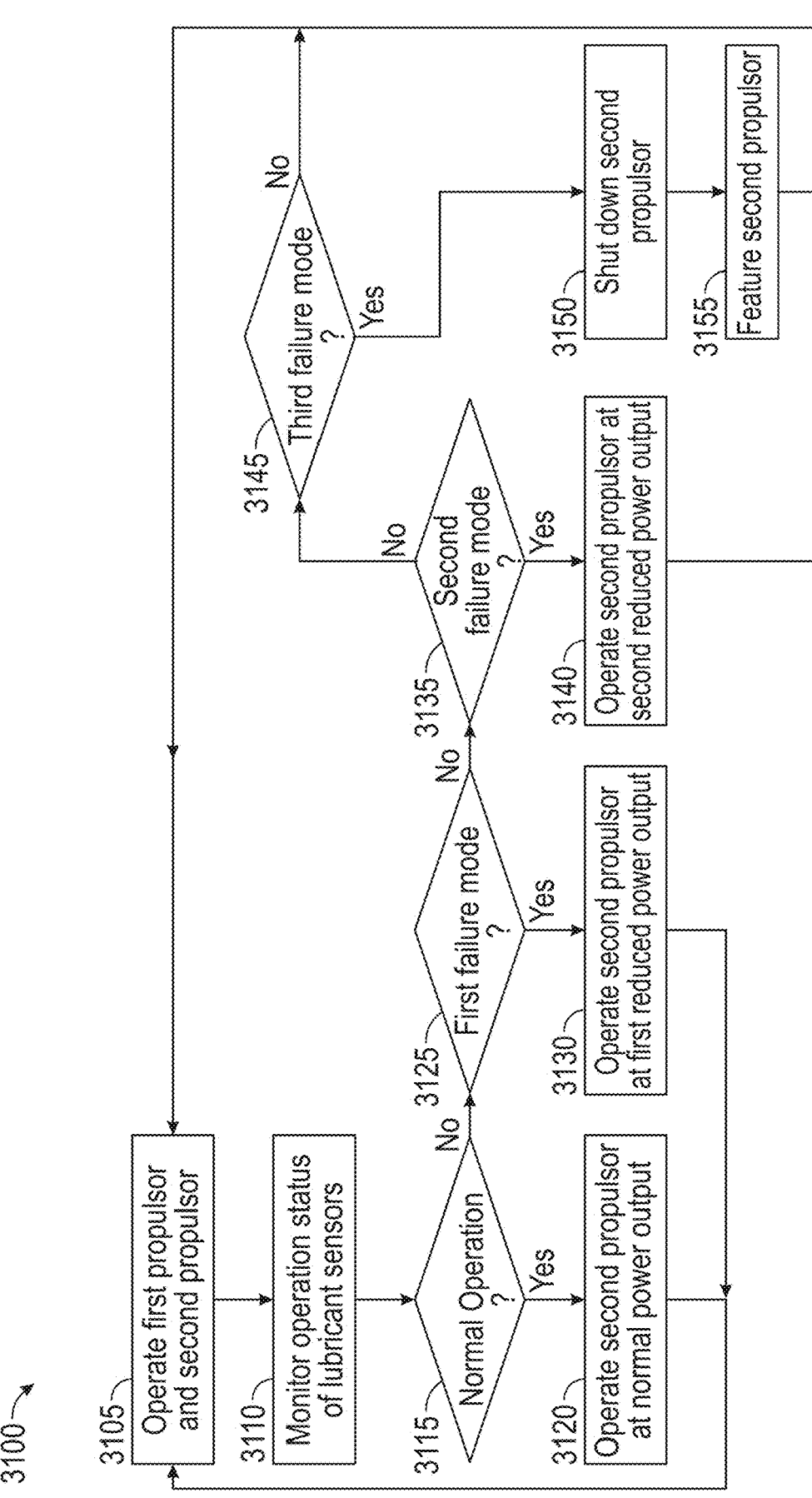
FIG. 20 is a flowchart of a method of operating the lubrication system of the propulsion system of FIG. 17, according to the present disclosure.

FIG. 20 is a flowchart of a method 3100 of operating the lubrication system 1600 of the propulsion system 2500 of FIG. 17, according to the present disclosure. While reference is made to the lubrication system 1600 and the propulsion system 2500, the method 3100 can be utilized for any of the lubrication systems detailed herein. The method 3100 can be performed by the one or more controllers 2602 (e.g., at least one of the first controller 2602*a* or the second controller 2602*b*). Further, while reference is made the second propulsor 38*b*, the method 3100 can also be utilized for the first propulsor 38*a*.

In step 3105, the method 3100 includes operating the first propulsor 38*a* and the second propulsor 38*b*. In particular, the method 3100 includes operating the first turbine engine 2910*a* and the second turbine engine 2910*b*. For example, the first controller 2602*a* operates the first turbine engine 2510*a*, and the second controller 2602*b* operates the second turbine engine 2510*b*. During the normal operation, the lubrication system 1600 supplies the lubricant to the gear assembly 50 and the engine bearings 37, as detailed above.

In step 3110, the method 3100 includes monitoring an operation status of the lubricant sensors 1640 of the second turbine engine 2510*b*. Monitoring the operation status of the lubricant sensors 1640 of the second turbine engine 2510*b* includes at least one of comparing inputs from the dual channels of each lubricant sensor 1640 or comparing inputs from a plurality of the lubricant sensors 1640. For example, comparing normal flow and normal pressure with a low lubricant level may indicate the lubricant level sensor 1640*a* has failed. In another example, normal flow and normal temperature with a low pressure may indicate the lubricant pressure sensor 1640*b* has failed.

In step 3115, the method 3100 includes determining whether the operating status of the lubricant sensors 1640 of the second turbine engine 2510*b* indicate a normal operation.

In step 3120, the method 3100 includes operating the second propulsor 38*b* (e.g., the second turbine engine 2510*b*) at a normal power output for a particular operating mode (e.g., idle, taxi, takeoff, cruise, landing) if the operating status of the lubricant sensors 1640 of the second turbine engine 2510*b* indicates the normal operation (step 3115: YES). Operating the second propulsor 38*b* at the normal power output includes at least one of a normal fuel flow rate, a normal power output from the second electric machine 70*b*, or a normal pitch angle of the second propulsor blades 40*b*. The normal operation includes operating the first turbine engine 2510*a* and the second turbine engine 2510*b* at the same power output level (or substantially equal power output levels). The method 3100 then proceeds back to step 3105. If the operating status of the lubricant sensors 1640 is not normal (step 3115: NO), the method 3100 proceeds to step 3125.

In step 3125, the method 3100 includes determining whether the operating status of the lubricant sensors 1640 of the second turbine engine 2510*b* indicate a first failure mode. The first failure mode includes at least one of the lubricant temperature, the lubricant pressure, the lubricant level, or the lubricant flow rate to be greater than or less than a first threshold. For example, the first failure mode includes at least one of the lubricant temperature greater than a first lubricant temperature threshold, the lubricant pressure less than a first lubricant pressure threshold, the lubricant level less than a first lubricant level threshold, or the lubricant flow rate less than a first lubricant flow rate threshold.

In step 3130, the method 3100 includes operating the second propulsor 38*b* (e.g., the second turbine engine 2510*b*) at a first reduced power output if the operating status indicates the first failure mode. The first reduced power output is less than the normal power output for the particular operating mode (e.g., idle, taxi, takeoff, cruise, landing). Operating the second propulsor 38*b* at the first reduced power output includes at least one of a first reduced fuel flow rate, a first reduced power output from the second electric machine 70*b*, or a first adjusted pitch angle of the second propulsor blades 40*b*. A reduced power output level is such that the heat imparted to the lubricant (primarily by the gearbox gear mesh) is reduced in magnitude (e.g., a 10% reduction, a 20% reduction, or a 40% reduction in thrust or output power. The method 3100 then proceeds back to step 3105. If the operating status of the lubricant sensors 1640 does not indicate the first failure mode (step 3125: NO), the method 3100 proceeds to step 3135.

In step 3135, the method 3100 includes determining whether the operating status of the lubricant sensors 1640 of the second turbine engine 2510*b* indicate a second failure mode. The second failure mode occurs when at least one of the lubricant temperature, the lubricant pressure, the lubricant level, or the lubricant flow rate is greater than or less than a second threshold. For example, the second failure mode includes at least one of the lubricant temperature is greater than a second lubricant temperature threshold, the lubricant pressure is less than a second lubricant pressure threshold, the lubricant level is less than a second lubricant level threshold, or the lubricant flow rate is less than a second lubricant flow rate threshold. The second lubricant temperature threshold is greater than the first temperature threshold. The second lubricant pressure threshold is less than the first lubricant pressure threshold. The second lubricant level threshold is less than the first lubricant level threshold. The second lubricant flow rate threshold is less than the first lubricant flow threshold.

In step 3140, the method 3100 includes operating the second propulsor 38*b* (e.g., the second turbine engine 2510*b*) at a second reduced power output if the operating status indicates the second failure mode. The second reduced power output is less than the first reduced power output for the particular operating mode (e.g., idle, taxi, takeoff, cruise, landing). Operating the second propulsor 38*b* at the second reduced power output includes at least one of a second reduced fuel flow rate, a second reduced power output from the second electric machine 70*b*, or a second adjusted pitch angle of the second propulsor blades 40*b*. The second reduced power output corresponds to a fail-safe level of operation at which the second reduced power output is a minimum power output of the second propulsor 38*b* for supplying the lubricant from the second lubrication system 1600*b* to the first lubrication system 1600*a*. The method 3100 then proceeds back to step 3105. If the operating status of the lubricant sensors 1640 does not indicate the second failure mode (step 3135: NO), the method 3100 proceeds to step 3145.

In step 3145, the method 3100 includes determining whether the operating status of the lubricant sensors 1640 of the second turbine engine 2510*b* indicate a third failure mode. The third failure mode includes at least one of the lubricant temperature, the lubricant pressure, the lubricant level, or the lubricant flow rate to be greater than or less than a third threshold. For example, the third failure mode occurs when at least one of the lubricant temperature is greater than a third lubricant temperature threshold, the lubricant pressure is less than a third lubricant pressure threshold, the lubricant level is less than a third lubricant level threshold, or the lubricant flow rate is less than a third lubricant flow rate threshold. The third lubricant temperature threshold is greater than the second temperature threshold. The third lubricant pressure threshold is less than the second lubricant pressure threshold. The third lubricant level threshold is less than the second lubricant level threshold. The third lubricant flow rate threshold is less than the second lubricant flow threshold. In some embodiments, the third failure mode includes at least one of the lubricant pressure, the lubricant level, or the lubricant flow rate being zero. In some embodiments, the third failure mode is indicated by a chip detector fault in one or more of the lubricant sensors 1640. In such embodiments, the method 3100 includes setting a maintenance indicator flag in response to the chip detector fault, and outputting the maintenance indicator flag to a computing device. The computing device can include, for example, a display, a speaker, or the like, for outputting the maintenance indicator flag. For example, the maintenance indicator flag can include at least one of a visual alert on a display or an audio alert through a speaker. In some embodiments, the computing device is located on the aircraft (e.g., in the cockpit). In some embodiments, the computing device is located remote from the aircraft (e.g., on the ground).

In step 3150, the method 3100 includes shutting down the second propulsor 38*b* (e.g., the second turbine engine 2510*b*). When the second propulsor 38*b* is shut down, the power output is zero.

In step 3155, the method 3100 includes feathering the second propulsor 38*b* when the second propulsor 38*b* is shut down. Feathering the second propulsor 38*b* includes adjusting the pitch of the second propulsor blades 40*b* to a feather position (e.g., the chord of the second propulsor blades 40*b* is approximately parallel to the flow of the volume of air 60). Adjusting the pitch of the second propulsor blades 40*b* to the feather position reduces drag on the second propulsor 38*b* as the second propulsor 38*b* continues to move through the air (e.g., during a flight). In some embodiments, the method 3100 includes applying a brake to the second propulsor 38*b* when the second propulsor 38*b* is shut down and the second propulsor blades 40*b* are in the feather position. In this way, applying the brake prevents the second propulsor blades 40*b* from rotating when the second propulsor 38*b* is shut down. In some embodiments, applying the brake includes applying the brake on the second propulsor shaft 45*b*. The method 3100 then proceeds back to step 3105. If the operating status of the lubricant sensors 1640 does not indicate the third failure mode (step 3145: NO), the method 3100 proceeds back to step 3105.

Figure 21:
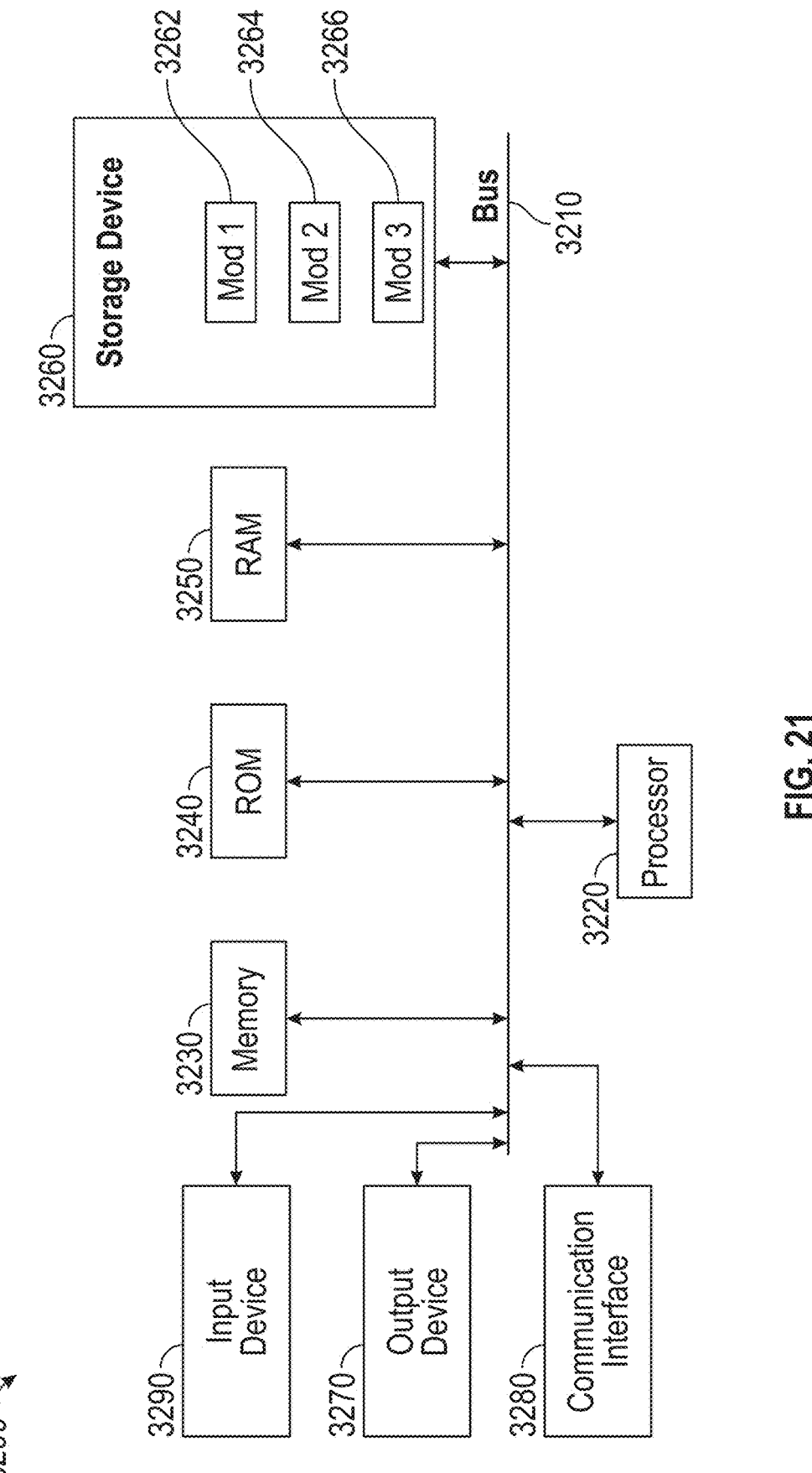
FIG. 21 is an exemplary computing system, according to the present disclosure.

FIG. 21 shows a computing system 3200, according to the present disclosure. The computing system 3200 may carry out any of the methods or systems described herein. The controllers described previously herein may be according to the computing system 3200. The computing system 3200 includes a general-purpose computing device, including a processing unit (CPU), or processor 3220, and a system bus 3210 that couples various system components including a system memory 3230 such as a read-only memory (ROM) 3240 and a random-access memory (RAM) 3250 to the processor 3220. The computing system 3200 can include a cache of high-speed memory connected directly with, in close proximity to, or integrated as part of the processor 3220. The computing system 3200 copies data from the system memory 3230 or the storage device 3260 to the cache for quick access by the processor 3220. In this way, the cache provides a performance boost that avoids the processor 3220 delays while waiting for data. These and other modules can control or be configured to control the processor 3220 to perform various actions. Other system memory 3230 may be available for use as well. The system memory 3230 can include multiple different types of memory with different performance characteristics. The disclosure may operate on a computing system 3200 with more than one processor 3220 or on a group or cluster of computing devices networked together to provide greater processing capability. The processor 3220 can include any general-purpose processor and a hardware module or software module, such as module 1 3262, module 2 3264, and module 3 3266 stored in the storage device 3260, configured to control the processor 3220 as well as a special-purpose processor where software instructions are incorporated into the actual processor design. The processor 3220 may essentially be a completely self-contained computing system, containing multiple cores or processors, a bus, memory controller, cache, etc. A multi-core processor may be symmetric or asymmetric.

The system bus 3210 may be any of several types of bus structures including a memory bus or memory controller, a peripheral bus, and a local bus using any of a variety of bus architectures. A basic input/output (BIOS) stored in the ROM 3240 or the like, may provide the basic routine that helps to transfer information between elements within the computing system 3200, such as during start-up. The computing system 3200 further includes one or more storage devices 3260 such as a hard disk drive, a magnetic disk drive, an optical disk drive, a tape drive, or the like. The storage devices 3260 can include software modules 3262, 3264, and 3266 for controlling the processor 3220. Other hardware or software modules are contemplated. The storage device 3260 is connected to the system bus 3210 by a drive interface. The drives and the associated computer-readable storage media provide nonvolatile storage of computer-readable instructions, data structures, program modules and other data for the computing system 3200. In one aspect, a hardware module that performs a particular function includes the software component stored in a tangible computer-readable storage medium in connection with the necessary hardware components, such as the processor 3220, the system bus 3210, the output device 3270, and so forth, to carry out the function. In another aspect, the computing system 3200 can use a processor and a computer-readable storage medium to store instructions which, when executed by a processor (e.g., one or more processors), cause the processor to perform a method or other specific actions. The basic components and appropriate variations are contemplated depending on the type of device, such as whether the computing system 3200 is a small, handheld computing device, a desktop computer, or a computer server.

Although the exemplary embodiment described herein employs the storage device 3260, other types of computer-readable media which can store data that are accessible by a computer, such as magnetic cassettes, flash memory cards, digital versatile disks, cartridges, random-access memories (RAMs) 3250, and a read-only memory (ROM) 3240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 3200, an input device 3290 represents any number of input mechanisms, such as a microphone for speech, a touch-sensitive screen for gesture or graphical input, keyboard, mouse, motion input, speech and so forth. An output device 3270 can also be one or more of a number of output mechanisms known to those of skill in the art. In some instances, multimodal systems enable a user to provide multiple types of input to communicate with the computing system 3200. The communications interface 3280 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Accordingly, the present disclosure provides for propulsion systems that include hybrid electric turboprop engines. The turbine engine control systems herein can control the turbine engine and the remote propulsor based on a single throttle lever input. In this way, the propulsion systems of the present disclosure require only a single throttle lever to be actuated by the pilot to control both the turbine engine and the remote propulsor, thus, reducing pilot workload, allowing the pilot to better focus attention on other needs. The present disclosure also provides for a propulsion system that incorporates a gearbox assembly with a gearbox lubrication system that is separate from the engine lubrication system. The gearbox lubrication system can be powered by the electric machine or by the remote propulsor. In this way, the propulsion system can lubricate the gearbox assembly even when the turbine engine is shut down and the turbine shaft is no longer powering the pump of the engine lubrication system. The present disclosure also provides for a propulsion system having an electrically powered lubrication system that allows the turbo-engine to be shut down, while still providing lubrication the propulsor. The lubrication system sensors provide data to the remote engine as well as the local engine so as to allow for safe control of the local engine by the remote engine. Lastly, the present disclosure provides a plurality of lubricant sensors (e.g., temperature sensors, pressure sensors, level sensors, or flow rate sensors) associated with the lubrication system that enable fault monitoring by the remote turbine engine. The turbine engine control system identifies failure modes of the lubricant sensors and operates the remote turbine engine at a reduced power or shutting down the propulsor based on the failure modes.

Further aspects of the present disclosure are provided by the subject matter of the following clauses.

A turbine engine control system for a propulsion system including a turbine engine having a turbo-engine and a first propulsor drivingly coupled to the turbo-engine, and a second propulsor that is remote from the turbine engine, the turbine engine control system comprising a single throttle lever, and a controller that receives an input from the single throttle lever, and controls the turbine engine and the second propulsor based on the input from the single throttle lever.

The turbine engine control system of the preceding clause, wherein the controller controls at least one of a rotational speed of the turbo-engine, a rotational speed of the first propulsor, a pitch of a plurality of first propulsor blades of the first propulsor, or a torque of the first propulsor.

The turbine engine control system of any preceding clause, wherein the controller controls at least one of a rotational speed of the second propulsor, a pitch of a plurality of second propulsor blades of the second propulsor, or a torque of the second propulsor.

The turbine engine control system of any preceding clause, wherein the controller receives a position input from the single throttle lever, converts the position input into at least one of a turbo-engine setting, a first propulsor setting, or a second propulsor setting, and controls the second propulsor and at least one of the turbo-engine or the first propulsor based on the at least one of the turbo-engine setting, the first propulsor setting, or the second propulsor setting.

The turbine engine control system of any preceding clause, further comprising an aircraft power supply that powers the second propulsor.

The turbine engine control system of any preceding clause, wherein the turbine engine is a first turbine engine and the turbo-engine is a first turbo-engine, the propulsion system further comprising a second turbine engine having a second turbo-engine, and the second propulsor being drivingly coupled to the second turbo-engine.

The turbine engine control system of the preceding clause, wherein the controller controls the second turbine engine based on the input from the single throttle lever when the second turbine engine is in a standby operating mode or a failure mode.

The turbine engine control system of any preceding clause, wherein the propulsion system includes a first electric machine that is drivingly coupled to the first propulsor, the first electric machine powering the first propulsor when the turbine engine is shut down.

The turbine engine control system of the preceding clause, wherein the propulsion system includes a second electric machine that is drivingly coupled to the second propulsor, the second electric machine powering the second propulsor.

The turbine engine control system of the preceding clause, further comprising a power conduit that provides electrical communication from the first electric machine to the second electric machine, the first electric machine powering the second electric machine through the power conduit.

A method of operating the propulsion system of any preceding clause, the method comprising operating the turbine engine of the propulsion system, operating the second propulsor, and controlling the turbine engine and the second propulsor based on the input from the single throttle lever.

The method of the preceding clause, further comprising controlling at least one of a rotational speed of the turbo-engine, a rotational speed of the first propulsor, a pitch of a plurality of first propulsor blades of the first propulsor, or a torque of the first propulsor.

The method of any preceding clause, further comprising controlling at least one of a rotational speed of the second propulsor, a pitch of a plurality of second propulsor blades of the second propulsor, or a torque of the second propulsor.

The method of any preceding clause, further comprising receiving a position input from the single throttle lever, converting the position input into at least one of a turbo-engine setting, a first propulsor setting, or a second propulsor setting, and controlling the second propulsor and at least one of the turbo-engine or the first propulsor based on the at least one of the turbo-engine setting, the first propulsor setting, or the second propulsor setting.

The method of any preceding clause, wherein the propulsion system includes an aircraft power supply, the method further comprising powering the second propulsor with the aircraft power supply.

The method of any preceding clause, wherein the turbine engine is a first turbine engine and the turbo-engine is a first turbo-engine, the method further comprising driving the second propulsor with a second turbo-engine of a second turbine engine.

The method of the preceding clause, further comprising controlling the second turbine engine based on the input from the single throttle lever when the second turbine engine is in a standby operating mode or a failure mode.

The method of any preceding clause, further comprising powering the first propulsor with a first electric machine when the turbine engine is shut down.

The method of the preceding clause, further comprising powering the second propulsor with a second electric machine.

The method of the preceding clause, further comprising powering the second electric machine with the first electric machine through a power conduit.

A propulsion system comprising a turbine engine comprising a turbo-engine including a low-pressure shaft and one or more engine bearings, a first propulsor having a first propulsor shaft, and a first gearbox assembly having a gear assembly, the first propulsor shaft being drivingly coupled to the low-pressure shaft through the gear assembly, a second propulsor that is remote from the turbine engine, the second propulsor including a second gearbox assembly having a gear assembly, and a lubrication system comprising: a first gearbox lubrication system disposed within the first gearbox assembly, the first gearbox lubrication system being configured to supply lubricant to the gear assembly of the first gearbox assembly, an engine lubrication system that is configured to supply lubricant to the one or more engine bearings, the first gearbox lubrication system being fluidly separate from the engine lubrication system, and a second gearbox lubrication system disposed within the second gearbox assembly, the second gearbox lubrication system being configured to supply lubricant to the gear assembly of the second gearbox assembly.

The propulsion system of the preceding clause, further including one or more valves in fluid communication with the first gearbox lubrication system and the engine lubrication system, the one or more valves configured to open when the turbine engine is shut down such that the first gearbox lubrication system supplies the lubricant to the one or more engine bearings when the turbine engine is shut down.

The propulsion system of any preceding clause, further comprising a first electric machine that is drivingly coupled to the first propulsor, the first electric machine configured to power the first propulsor when the turbine engine is shut down.

The propulsion system of the preceding clause, further comprising a second electric machine that is drivingly coupled to the second propulsor, the second electric machine configured to power the second propulsor.

The propulsion system of any preceding clause, wherein the first gearbox lubrication system includes a pump and a lubricant reservoir that is configured to store the lubricant therein, the pump and the lubricant reservoir being positioned within the first gearbox assembly, and the pump configured to pump the lubricant from the lubricant reservoir to the gear assembly of the first gearbox assembly.

The propulsion system of the preceding clause, wherein the pump is drivingly coupled to at least one of the first propulsor shaft, the low-pressure shaft, or the gear assembly of the first gearbox assembly.

The propulsion system of any preceding clause, wherein the first gearbox lubrication system includes a heat exchanger within the first gearbox assembly, the heat exchanger configured to cool the lubricant as the lubricant flows to the gear assembly of the first gearbox assembly.

The propulsion system of any preceding clause, wherein the first gearbox lubrication system includes one or more lubricant sensors configured to sense information about the lubricant in the first gearbox lubrication system.

The propulsion system of the preceding clause, further including a controller configured to control the turbine engine, the controller configured to receive the information about the lubricant from the one or more lubricant sensors.

The propulsion system of the preceding clause, wherein the turbine engine is a first turbine engine and the controller is a first controller, the propulsion system further comprising a second turbine engine and a second controller, and the second controller configured to receive the information about the lubricant from the one or more lubricant sensors.

A method of operating the propulsion system of any preceding clause, the method comprising operating the turbine engine of the propulsion system, operating the second propulsor that is remote from the turbine engine, supplying the lubricant to the gear assembly of the first gearbox assembly with the first gearbox lubrication system; supplying the lubricant to the one or more engine bearings with the engine lubrication system, the first gearbox lubrication system being fluidly separate from the engine lubrication system, and supplying the lubricant to the gear assembly of the second gearbox assembly with the second gearbox lubrication system.

The method of any preceding clause, further comprising supplying the lubricant to the one or more engine bearings from the first gearbox lubrication system by opening one or more valves when the turbine engine is shut down.

The method of any preceding clause, further comprising powering the first propulsor with a first electric machine when the turbine engine is shut down.

The method of the preceding clause, further comprising powering the second propulsor with a second electric machine.

The method of any preceding clause, further comprising pumping the lubricant from the lubricant reservoir to the gear assembly of the first gearbox assembly with a pump, the lubricant reservoir and the pump being positioned within the first gearbox assembly.

The method of the preceding clause, wherein the pump is drivingly coupled to at least one of the first propulsor shaft, the low-pressure shaft, or the gear assembly of the first gearbox assembly.

The method of any preceding clause, further comprising cooling the lubricant with a heat exchanger as the lubricant flows to the gear assembly of the first gearbox assembly, the heat exchanger being positioned in the first gearbox assembly.

The method of any preceding clause, further comprising sensing information about the lubricant in the first gearbox lubrication system with one or more lubricant sensors.

The method of the preceding clause, further comprising receiving the information about the lubricant from the one or more lubricant sensors at a controller, and controlling the turbine engine with the controller.

The method of the preceding clause, wherein the turbine engine is a first turbine engine and the controller is a first controller, the method further comprising receiving the information about the lubricant from the one or more lubricant sensors at a second controller, and controlling a second turbine engine with the second controller.

A propulsion system comprising a turbine engine comprising a turbo-engine including a low-pressure shaft and one or more engine bearings, a propulsor including a propulsor shaft, a gearbox assembly including a gear assembly, the propulsor shaft being drivingly coupled to the low-pressure shaft through the gear assembly, and an electric machine that powers the propulsor when the turbo-engine is shut down; an electric power supply, and a lubrication system configured to supply a lubricant to at least one of the one or more engine bearings or the gear assembly, the electric power supply configured to power the lubrication system to supply the lubricant when the turbo-engine is shut down.

The propulsion system of any preceding clause, wherein the lubrication system is coupled to the turbo-engine, the turbo-engine configured to power the lubrication system when the turbo-engine is operating.

The propulsion system of any preceding clause, wherein the electric power supply includes an aircraft power supply from an aircraft.

The propulsion system of any preceding clause, wherein the electric power supply is configured to power the lubrication system when the turbo-engine is in a standby operating mode.

The propulsion system of any preceding clause, wherein the turbine engine is a first turbine engine, the propulsor is a first propulsor, the electric machine is a first electric machine, the propulsion system further comprising a second turbine engine having a second propulsor and a second electric machine, and the electric power supply includes the second electric machine.

The propulsion system of the preceding clause, wherein the first turbine engine includes a first controller, the second turbine engine includes a second controller, and the lubrication system includes one or more lubricant sensors that are configured to sense information about the lubricant in the lubrication system, and the first controller and the second controller are configured to receive the information about the lubricant in the lubrication system.

The propulsion system of any preceding clause, wherein the lubrication system includes a pump and a motor that electrically drives the pump, the pump being configured to pump the lubricant to the at least one of the one or more engine bearings or the gear assembly.

The propulsion system of the preceding clause, wherein the lubrication system includes a clutch that is configured to engage the pump to the turbo-engine when the turbo-engine operates, and disengage the pump from the turbo-engine when the turbo-engine is shut down.

The propulsion system of any preceding clause, wherein the lubrication system includes one or more valves configured to close to prevent the lubricant from flowing to the one or more engine bearings when the turbo-engine is shut down.

The propulsion system of the preceding clause, wherein the one or more valves are configured to open to allow the lubricant to flow to the one or more engine bearings when the turbo-engine is operating.

A method of operating the propulsion system of any preceding clause, the method comprising powering the propulsor with the electric machine when the turbo-engine is shut down, supplying the lubricant to the at least one of the one or more engine bearings or the gear assembly, and powering the lubrication system with the electric power supply when the turbo-engine is shut down.

The method of any preceding clause, further comprising powering the lubrication system with the turbo-engine when the turbo-engine is operating.

The method of any preceding clause, wherein the electric power supply includes an aircraft power supply from an aircraft.

The method of any preceding clause, further comprising powering the lubrication system with the electric power supply when the turbo-engine is in a standby operating mode.

The method of any preceding clause, wherein the turbine engine is a first turbine engine, the propulsor is a first propulsor, the electric machine is a first electric machine, the method further comprising powering the first propulsor and the lubrication system with a second electric machine of a second turbine engine having a second propulsor.

The method of the preceding clause, further comprising sensing information about the lubricant in the lubrication system with one or more lubricant sensors, and receiving the information about the lubricant in the lubrication system at a first controller of the first rubine engine and at a second controller of the second turbine engine.

The method of any preceding clause, further comprising pumping the lubricant to the at least one of the one or more engine bearings or the gear assembly with a pump, and electrically driving the pump with a motor.

The method of the preceding clause, further comprising engaging the pump to the turbo-engine with a clutch when the turbo-engine operates, and disengaging the pump from the turbo-engine with the clutch when the turbo-engine is shut down.

The method of any preceding clause, further comprising closing one or more valves to prevent the lubricant from flowing to the one or more engine bearings when the turbo-engine is shut down.

The method of the preceding clause, further comprising opening the one or more valves to allow the lubricant to flow to the one or more engine bearings when the turbo-engine is operating.

A propulsion system comprising a first turbine engine comprising a first turbo-engine; a first propulsor that is drivingly coupled to the first turbo-engine, a first electric machine configured to power the first propulsor when the first turbo-engine is shut down, and a first controller configured to control the first turbine engine, a second turbine engine comprising a second turbo-engine, a second propulsor that is drivingly coupled to the second turbo-engine, a second electric machine configured to power the second propulsor when the second turbo-engine is shut down, and a second controller configured to control the second turbine engine, and a lubrication system configured to supply a lubricant to the first turbine engine and the second turbine engine, the lubrication system including a plurality of lubricant sensors including one or more first lubricant sensors configured to sense information about the lubricant to the first turbine engine and one or more second lubricant sensors configured to sense information about the lubricant to the second turbine engine, wherein the first controller and the second controller are configured to receive the information of the lubricant from the one or more first lubricant sensors and the one or more second lubricant sensors, and the first controller is configured to control the lubrication system to supply the lubricant to the second turbine engine based on the sensed information about the lubricant in the second turbine engine received at the first controller when the second turbine engine is shut down The propulsion system of the preceding clause, wherein each of the plurality of lubricant sensors includes redundant sensing elements and discrete outputs that are electrically isolated from each other.

The propulsion system of any preceding clause, wherein each of the plurality of lubricant sensors includes a chip detector that is configured to detect failures of components in the lubrication system.

The propulsion system of any preceding clause, wherein the one or more first lubricant sensors each includes four communication outputs including two communication outputs to the first controller and two communication outputs to the second controller for sending the information about the lubricant in the first turbine engine to the first controller and the second controller.

The propulsion system of the preceding clause, wherein the one or more second lubricant sensors each includes four communication outputs including two communication outputs to the second controller and two communication outputs to the first controller for sending the information about the lubricant in the second turbine engine to the second controller and the first controller.

The propulsion system of any preceding clause, further comprising an auxiliary lubrication system configured to supply the lubricant to at least one of the first turbine engine or the second turbine engine when a failure occurs in the lubrication system.

The propulsion system of the preceding clause, wherein the auxiliary lubrication system includes an auxiliary pump and an auxiliary lubricant valve, the auxiliary lubricant valve configured to open and the auxiliary pump configured to pump the lubricant through the auxiliary lubricant valve to the at least one of the first turbine engine or the second turbine engine when the failure occurs in the lubrication system.

The propulsion system of any preceding clause, wherein the one or more first lubricant sensors each includes two communication outputs to the first controller for sending the information about the lubricant in the first turbine engine to the first controller.

The propulsion system of the preceding clause, wherein the one or more second lubricant sensors each includes two communication outputs to the second controller for sending the information about the lubricant in the second turbine engine to the second controller.

The propulsion system of the preceding clause, further including a data communication bus configured to provide data communication between the first controller and the second controller, the first controller configured to send the information about the lubricant in the first turbine engine to the second controller.

A method of operating the propulsion system of any preceding clause, the method comprising operating the first turbine engine, the first turbine engine comprising a first turbo-engine, a first propulsor, a first electric machine, and a first controller, operating the second turbine engine, the second turbine engine comprising a second turbo-engine, a second propulsor, a second electric machine, and a second controller, powering the first propulsor with the first electric machine when the first turbo-engine is shut down, powering the second propulsor with the second electric machine when the second turbo-engine is shut down, supplying the lubricant to the first turbine engine and the second turbine engine with the lubrication system, sensing information about the lubricant in the first turbine engine with the one or more first lubricant sensors, receiving the information about the lubricant in the first turbine engine at the first controller, sensing information about the lubricant in the second turbine engine with the one or more second lubricant sensors, and receiving the information about the lubricant in the second turbine engine at the second controller, and controlling the lubrication system with the first controller to supply the lubricant to the second turbine engine based on the sensed information about the lubricant in the second turbine engine received at the first controller when the second turbine engine is shut down.

The method of any preceding clause, wherein each of the plurality of lubricant sensors includes redundant sensing elements and discrete outputs that are electrically isolated from each other.

The method of any preceding clause, further comprising detecting failures of components in the lubrication system with a chip detector of each of the plurality of lubricant sensors.

The method of any preceding clause, wherein the one or more first lubricant sensors each includes four communication outputs including two communication outputs to the first controller and two communication outputs to the second controller, the method further comprising sending the information about the lubricant in the first turbine engine to the first controller and the second controller.

The method of the preceding clause, wherein the one or more second lubricant sensors each includes four communication outputs including two communication outputs to the second controller and two communication outputs to the first controller, the method further comprising sending the information about the lubricant in the second turbine engine to the second controller and the first controller.

The method of any preceding clause, further comprising supplying the lubricant with an auxiliary lubrication system of the lubrication system to at least one of the first turbine engine or the second turbine engine when a failure occurs in the lubrication system.

The method of the preceding clause, further comprising opening an auxiliary lubricant valve of the auxiliary lubrication system, and pumping the lubricant with an auxiliary pump through the auxiliary lubricant valve to the at least one of the first turbine engine or the second turbine engine when the failure occurs in the lubrication system.

The method of any preceding clause, wherein the one or more first lubricant sensors each includes two communication outputs to the first controller, the method further comprising sending the information about the lubricant in the first turbine engine to the first controller via the two communication outputs.

The method of the preceding clause, wherein the one or more second lubricant sensors each includes two communication outputs to the second controller, the method further comprising sending the information about the lubricant in the second turbine engine to the second controller via the two communication outputs.

The method of the preceding clause, further including a data communication bus that provides data communication between the first controller and the second controller, the method further comprising sending the information about the lubricant in the first turbine engine from the first controller to the second controller.

A propulsion system comprising a turbine engine comprising a turbo-engine, a first propulsor that is drivingly coupled to the turbo-engine, and a first electric machine configured to power the first propulsor. The propulsion system comprises a second propulsor that is remote from the turbine engine. The second propulsor is drivingly coupled to a second electric machine configured to power the second propulsor, the second electric machine including one or more electric machine bearings. The propulsion system comprises an electric machine lubrication system disposed within the second electric machine, the electric machine lubrication system configured to supply a lubricant to the one or more electric machine bearings.

The propulsion system of the preceding clause, wherein the electric machine lubrication system is self-contained within the second electric machine.

The propulsion system of any preceding clause, wherein the electric machine lubrication system includes an electric machine pump and a lubricant reservoir that stores the lubricant therein, and the electric machine pump is configured to pump the lubricant from the lubricant reservoir to the one or more electric machine bearings.

The propulsion system of the preceding clause, the electric machine pump and the lubricant reservoir being positioned within the second electric machine.

The propulsion system of any preceding clause, wherein the second propulsor includes a second propulsor shaft, and the electric machine pump is drivingly coupled to the second propulsor shaft.

The propulsion system of any preceding clause, wherein the electric machine lubrication system includes a heat exchanger within the second electric machine, the heat exchanger is configured to cool the lubricant as the lubricant flows to the electric machine bearings.

The propulsion system of any preceding clause, further comprising a fluid conduit that fluidly couples the second electric machine to the first electric machine, the second electric machine is configured to receive the lubricant from the first electric machine through the fluid conduit.

The propulsion system of the preceding clause, wherein the fluid conduit includes a power conduit, the first electric machine is configured to power the second electric machine through the power conduit.

The propulsion system of any preceding clause, wherein the second electric machine includes a rotor that is coupled to second propulsor shaft and a stator that includes one or more electrical coils, the stator is configured to generate electrical power when the rotor rotates with respect to the stator.

The propulsion system of the preceding clause, wherein the electric machine lubrication system includes one or more lubricant injectors configured to inject the lubricant onto the one or more electric machine bearings.

A method of operating the propulsion system of any of the preceding clauses. The method comprising operating the turbine engine, powering the first propulsor with the first electric machine, powering the second propulsor with the second electric machine, and supplying the lubricant to the one or more electric machine bearings with the electric machine lubrication system.

The method of the preceding clause, wherein the electric machine lubrication system is self-contained within the second electric machine.

The method of any preceding clause, further comprising pumping the lubricant with an electric machine pump of the electric machine lubrication system from the lubricant reservoir to the one or more electric machine bearings.

The method of the preceding clause, the electric machine pump and the lubricant reservoir being positioned within the second electric machine.

The method of any preceding clause, wherein the second propulsor includes a second propulsor shaft, and the electric machine pump is drivingly coupled to the second propulsor shaft.

The method of any preceding clause, further comprising cooling the lubricant with a heat exchanger within the second electric machine as the lubricant flows to the electric machine bearings.

The method of any preceding clause, further comprising supplying the lubricant from the first electric machine to the second electric machine through a fluid conduit.

The method of the preceding clause, method further comprising powering the second electric machine with the first electric machine through a power conduit.

The method of any preceding clause, further comprising generating electrical power when a rotor of the second electric machine rotates with respect to a stator of the second electric machine, the rotor coupled to the second propulsor shaft and the stator including one or more electrical coils.

The method of the preceding clause, further comprising injecting the lubricant with one or more lubricant injectors onto the one or more electric machine bearings.

A propulsion system comprising a first turbine engine having a first propulsor and a first electric machine, and a second turbine engine having a second propulsor and a second electric machine. The propulsion system comprises a lubrication system configured to supply a lubricant to the first turbine engine and the second turbine engine. The lubrication system includes one or more lubricant sensors configured to sense information about the lubricant in the second turbine engine. The propulsion system comprises one or more controllers configured to monitor an operation status of the one or more lubricant sensors, operate the second turbine engine at a normal power output if the operating status indicates a normal operation of the second turbine engine, and operate the second turbine engine at a first reduced power output if the operating status indicates a first failure mode, the first reduced power output being less than the normal power output.

The propulsion system of the preceding clause, wherein the normal power output includes at least one of a normal fuel flow rate, a normal power output from the second electric machine, or a normal pitch angle of a plurality of second propulsor blades of the second propulsor.

The propulsion system of any preceding clause, wherein the one or more controllers are configured to operate the second turbine engine at a second reduced power output if the operating status indicates a second failure mode, the second reduced power output being less than the first reduced power output.

The propulsion system of the preceding clause, wherein the one or more controllers are configured to operate the second turbine engine at a third reduced power output if the operating status indicates a third failure mode, the third reduced power output being less than the second reduced power output.

The propulsion system of the preceding clause, wherein the third reduced power output is zero.

The propulsion system of the preceding clause, wherein the one or more controllers are configured to shut down the second turbine engine if the operating status indicates the third failure mode.

The propulsion system of any preceding clause, wherein the one or more controllers are configured to monitor the operation status of the one or more lubricant sensors by comparing inputs from dual channels of the one or more lubricant sensors.

The propulsion system of any preceding clause, wherein the one or more controllers are configured to monitor the operation status of the one or more lubricant sensors by comparing inputs from a plurality of lubricant sensors.

The propulsion system of any preceding clause, wherein the one or more controllers are configured to control the second propulsor to a feather position when the second turbine engine is shut down.

The propulsion system of any preceding clause, wherein the one or more controllers are configured to set a maintenance indicator flag in response to the third failure mode and output the maintenance indicator flag to a computing device.

A method of operating the propulsion system of any preceding clause, the method comprising monitoring an operation status of the one or more lubricant sensors, operating the second turbine engine at a normal power output if the operating status indicates a normal operation of the second turbine engine, and operating the second turbine engine at a first reduced power output if the operating status indicates a first failure mode, the first reduced power output being less than the normal power output.

The method of the preceding clause, wherein the normal power output includes at least one of a normal fuel flow rate, a normal power output from the second electric machine, or a normal pitch angle of a plurality of second propulsor blades of the second propulsor.

The method of any preceding clause, further comprising operating the second turbine engine at a second reduced power output if the operating status indicates a second failure mode, the second reduced power output being less than the first reduced power output.

The method of the preceding clause, further comprising operating the second turbine engine at a third reduced power output if the operating status indicates a third failure mode, the third reduced power output being less than the second reduced power output.

The method of the preceding clause, wherein the third reduced power output is zero.

The method of the preceding clause, further comprising shutting down the second turbine engine if the operating status indicates the third failure mode.

The method of any preceding clause, further comprising monitoring the operation status of the one or more lubricant sensors by comparing inputs from dual channels of the one or more lubricant sensors.

The method of any preceding clause, further comprising monitoring the operation status of the one or more lubricant sensors by comparing inputs from a plurality of lubricant sensors.

The method of any preceding clause, further comprising adjusting the second propulsor to a feather position when the second turbine engine is shut down.

The method of any preceding clause, further comprising setting a maintenance indicator flag in response to the third failure mode and output the maintenance indicator flag to a computing device.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A propulsion system comprising:
a first turbine engine comprising:
    a first turbo-engine including a first low-pressure shaft and one or more first engine bearings;
    a first propulsor including a first propulsor shaft;
    a first gearbox assembly including a first gear assembly, the first propulsor shaft being drivingly coupled to the first low-pressure shaft through the first gear assembly; and a first electric machine that powers the first propulsor when the first turbo-engine is shut down;
a first electric power supply; and
a first lubrication system configured to supply a lubricant to at least one of the one or more first engine bearings or the first gear assembly, the first electric power supply configured to power the first lubrication system to supply the lubricant;
a second turbine engine comprising:
    a second turbo-engine including a second low-pressure shaft and one or more second engine bearings;
    a second propulsor including a second propulsor shaft;
    a second gearbox assembly including a second gear assembly, the second propulsor shaft being drivingly coupled to the second low-pressure shaft through the second gear assembly; and
a second electric machine that powers the second propulsor when the second turbo-engine is shut down, the second electric machine in direct electrical communication with the first lubrication system, and the second electric machine configured to directly power the first lubrication system to supply the lubricant when the first turbo-engine is shut down.

2. The propulsion system of claim 1, wherein the first lubrication system is coupled to the first turbo-engine, the first turbo-engine configured to power the first lubrication system when the first turbo-engine is operating.

3. The propulsion system of claim 1, wherein the first electric power supply includes an aircraft power supply from an aircraft.

4. The propulsion system of claim 1, wherein the first electric power supply is configured to power the first lubrication system when the first turbo-engine is in a standby operating mode.

5. The propulsion system of claim 1, wherein the first turbine engine includes a first controller, the second turbine engine includes a second controller, and the first lubrication system includes one or more lubricant sensors that are configured to sense information about the lubricant in the first lubrication system, and the first controller and the second controller are configured to receive the information about the lubricant in the first lubrication system.

6. The propulsion system of claim 1, wherein the first lubrication system includes a pump and a motor that electrically drives the pump, the pump is configured to pump the lubricant to the at least one of the one or more first engine bearings or the first gear assembly.

7. The propulsion system of claim 6, wherein the first lubrication system includes a clutch that is configured to engage the pump to the first turbo-engine when the first turbo-engine operates, and disengage the pump from the first turbo-engine when the first turbo-engine is shut down.

8. The propulsion system of claim 6, wherein the first lubrication system includes one or more valves that are configured to close to prevent the lubricant from flowing to the one or more first engine bearings when the first turbo-engine is shut down.

9. The propulsion system of claim 8, wherein the one or more valves are configured to open to allow the lubricant to flow to the one or more first engine bearings when the first turbo-engine is operating.

10. A method of operating a propulsion system including a first turbine engine, a second turbine engine, a first electric power supply, and a first lubrication system, the method comprising:
    powering a first propulsor of the first turbine engine with a first electric machine of the first turbine engine when a first turbo-engine of the first turbine engine is shut down, the first turbine engine including a first gearbox assembly including a first gear assembly, the first propulsor coupled to the first turbo-engine through the first gear assembly;

supplying a lubricant to at least one of one or more first engine bearings of the first turbo-engine or the first gear assembly;

powering the first lubrication system with the first electric power supply;

powering a second propulsor of the second turbine engine with a second electric machine of the second turbine engine when a second turbo-engine of the second turbine engine is shut down, the second turbine engine including a second gearbox assembly including a second gear assembly, the second propulsor coupled to the second turbo-engine through the second gear assembly; and directly powering the first lubrication system with the second electric machine when the first turbo-engine is shut down.

11. The method of claim 10, further comprising powering the first lubrication system with the first turbo-engine when the first turbo-engine is operating.

12. The method of claim 10, wherein the first electric power supply includes an aircraft power supply from an aircraft.

13. The method of claim 10, further comprising powering the first lubrication system with the first electric power supply when the first turbo-engine is in a standby operating mode.

14. The method of claim 10, further comprising sensing information about the lubricant in the first lubrication system with one or more lubricant sensors, and receiving the information about the lubricant in the first lubrication system at a first controller of the first turbine engine and at a second controller of the second turbine engine.

15. The method of claim 10, further comprising pumping the lubricant to the at least one of the one or more first engine bearings or the first gear assembly with a pump, and electrically driving the pump with a motor.

16. The method of claim 15, further comprising engaging the pump to the first turbo-engine with a clutch when the first turbo-engine operates, and disengaging the pump from the first turbo-engine with the clutch when the first turbo-engine is shut down.

17. The method of claim 15, further comprising closing one or more valves to prevent the lubricant from flowing to the one or more first engine bearings when the first turbo-engine is shut down.

18. The method of claim 17, further comprising opening the one or more valves to allow the lubricant to flow to the one or more first engine bearings when the first turbo-engine is operating.

* * * * *